United States Patent [19]
Wang et al.

[11] Patent Number: 6,161,134
[45] Date of Patent: Dec. 12, 2000

[54] METHOD, APPARATUS AND COMMUNICATIONS SYSTEM FOR COMPANION INFORMATION AND NETWORK APPLIANCES

[75] Inventors: Peter Si-Sheng Wang, Cupertino, Calif.; Ismail Dalgic, Mountain View, Calif.

[73] Assignee: 3Com Corporation, Santa Clara, Calif.

[21] Appl. No.: 09/181,431

[22] Filed: Oct. 30, 1998

[51] Int. Cl.$^7$ .................................................. G06F 13/00
[52] U.S. Cl. ............................................................ 709/220
[58] Field of Search .................................... 709/200, 205, 709/212, 218, 220, 222; 708/109; 455/550

[56] References Cited

U.S. PATENT DOCUMENTS 5,497,339  3/1996  Bernard ................................... 708/109
5,606,594  2/1997  Register et al. ........................ 455/550

*Primary Examiner*—Robert B. Harrell
*Attorney, Agent, or Firm*—David J. Weitz; Wilson Sonsini Goodrich & Rosati

[57] ABSTRACT

The invention provides an information appliance and a network appliance (or telephone) that function independently as well as with each other as companion appliances. The information appliance stores user information corresponding to a particular user. The telephone is linked to network. In some embodiments, the companion appliances are capable of simultaneously exchanging voice and data messages with devices connected to the network. The appliances are connected to each other physically through a communications port, and exchange data link layer formatted data corresponding to user personalized information, commands from the user, and responses including message status information corresponding to action of the network connected devices. The user information enables the telephone to perform network communications according to user specified settings, and enables the telephone to assume the user specific information appliance network identification. The information appliance is typically a portable computer and in some embodiments is a palm-sized computer. In some embodiments, the telephone is an Ethernet telephone. One aspect of the invention provides a method for transmitting data from a portable computer to a telephone. Other aspects of the invention include: a method for exchanging voice and data messages between a telephone and devices connected to a network, a portable computer adapted for connection to a telephone, a telephone adapted for connection to a portable computer, and a communications system including the telephone connected to the portable computer.

75 Claims, 26 Drawing Sheets

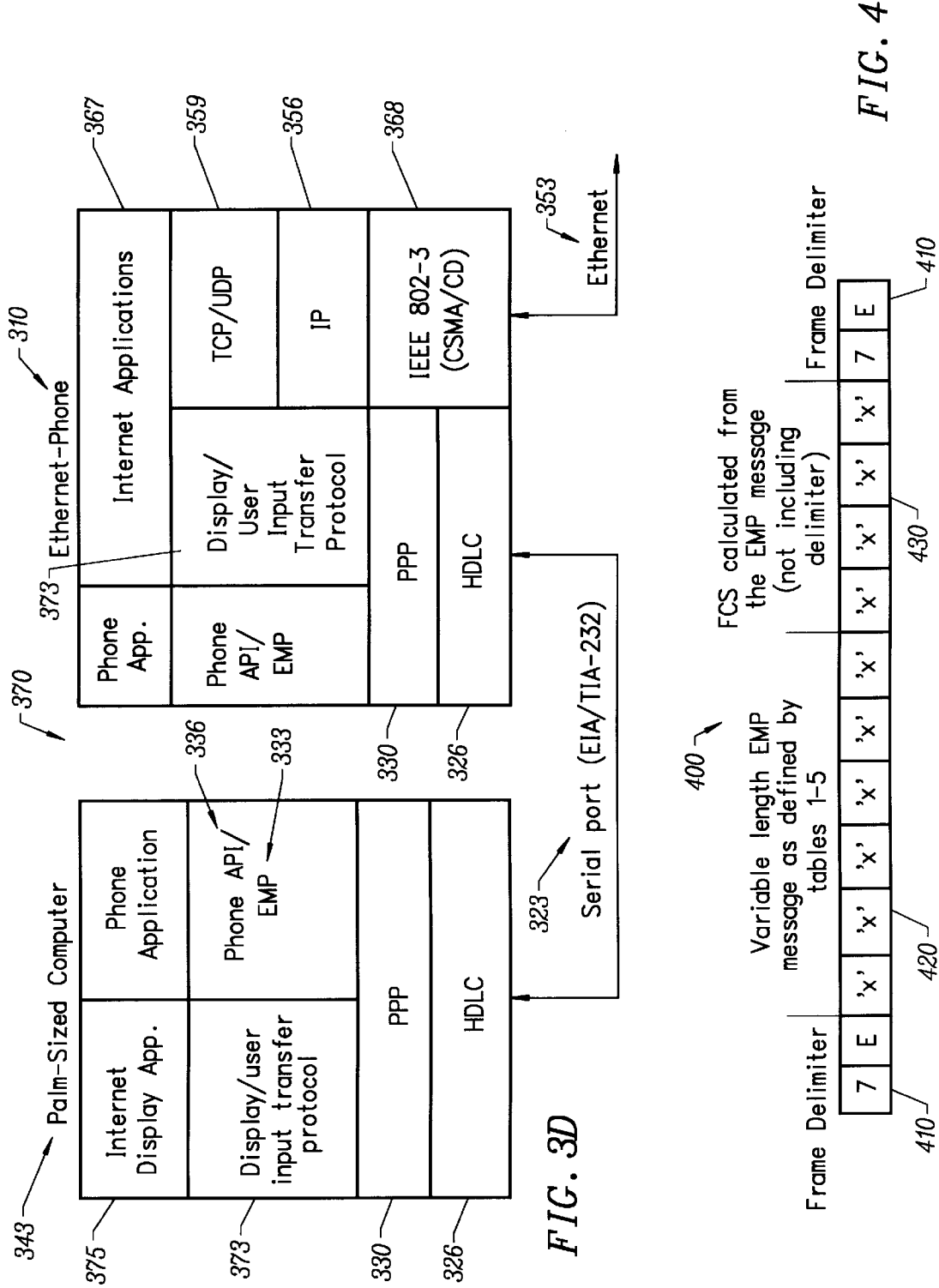

531
| Byte Description | Seq. No. | Tel. Numbers (varying length) | EOT |
|---|---|---|---|
| x x | 'x' 'x' | x x x x | 0 0 |
| 505 | 507 | 517 | 512 |

FIG. 5G

533
| Byte Description | Seq. No. | Digit Pressed | Duration |
|---|---|---|---|
| x x | 'x' 'x' | x x | 'x' 'x' 'x' 'x' |
| 505 | 507 | 535 | 537 |

FIG. 5H

539
| Byte Description | Seq. No. |
|---|---|
| x x | 'x' 'x' |
| 505 | 507 |

FIG. 5I

541
| Byte Description | Seq. No. | Tel. Nos. (varying length) | EOT | Caller Name (varying length) | EOT |
|---|---|---|---|---|---|
| x x | 'x' 'x' | x x x x | 0 0 | x x x x | 0 0 |
| 505 | 507 | 517 | 512 | 543 | 545 |

FIG. 5J

547
| Byte Description | Error Code | Error Seq. No. |
|---|---|---|
| x x | x x | 'x' 'x' |
| 505 | 549 | 551 |

FIG. 5K

Initializing
in Progress

Initialization
Completed

Call Placement

User Dialing

Telephone Dialing

Connected Line

Connected Line with Pop-Up Menu

Transfer Dialog

Transfer Waiting

Transfer Completed

Active Call Summary

First Forwarding

Second Forwarding

History

Detailed Single Call History

Incomming Call

Features Menu Bar

Options Menu Bar

Dial Screen

Copyright Information

Phone Settings

User Settings

Change Password

Enter Password

Conferencing Screen

Conference Options

METHOD, APPARATUS AND COMMUNICATIONS SYSTEM FOR COMPANION INFORMATION AND NETWORK APPLIANCES

BACKGROUND OF THE INVENTION

1. Field of Invention

The invention generally relates to network communications devices. More specifically, the invention relates to the combination of a portable computer with a communications device to form a more capable compound network apparatus.

2. Description of Related Art

Recent advances in the manufacture and design of integrated circuits have enabled technology producers to provide portable instruments with ever-increasing processing capabilities. Advances in liquid crystal diode displays, stylus based input devices, and handwritten character recognition have also resulted in the availability of palm-sized computers [or personal digital assistants (PDAs)], such as the Palm III and PalmProfessional from Palm Computing, Inc., Mountain View, Calif. The primary advantage of these devices is the combination of small size, lightweight, and stored information that can be customized for a particular user. These computers provide functions such as note taking, data retrieval and storage, application program execution, and interfacing with external devices. The palm-sized computers have been very successful in calendar and telephone directory utilities, and also enable users to have access to e-mail, and to even play games.

The prior art includes accessories that allow a portable computer to become part of a telecommunications device. One such accessory is described in U.S. Pat. No. 5,606,594, granted to Register et al. on Feb. 25, 1997, entitled "Communication Accessory and Method of Telecommunicating for a PDA". A top-edge view of the PDA 100 adapted for insertion into the accessory is provided in FIG. 1A. The PDA 100 has one or more buttons 110 and an electronic link connector 120. As shown in FIG. 1B, the accessory 150 is specially adapted to receive a particular PDA. The PDA 100 can be releasably inserted into the accessory 150. The PDA 100 electronic link connector 120 mates with the accessory 150 electronic link connector 160. The external surfaces of the PDA 100 fit within the retaining wall 170, and concave surface 180 of the accessory 150. The retention ridges 190 are disposed to cover the top and bottom portion of the exterior of the PDA 100 by rotating the rotatable body extensions 195 of the accessory 150.

The accessory 150 allows the PDA to play a part in managing voice communications for the user, and to send and receive data. Similarly, U.S. Pat. No. 5,497,339, granted to Bernard on Mar. 5, 1996 provides for PDA that mounts within a communications device. However, none of the communications devices in the prior art provide methods for software implementation of telephone call processing functions. Also missing from the prior art is the method for storing the phone number and user parameters in the PDA and then deploying the communications device with the PDA/user phone number and user characteristics.

Accordingly, what is needed in the art is a method and apparatus for companion information and network appliances that incorporates software implementation of telephone call processing functions, and storage of phone number and user parameters in the PDA for network appliance deployment.

SUMMARY OF THE INVENTION

The invention provides an information appliance and a network appliance that function independently as well as with each other. The information appliance stores information corresponding to a particular user. The network appliance is linked to a local area network and is capable of simultaneously exchanging voice and data messages with devices connected to the local area network.

The appliances are connected to each other physically through a communications port, and exchange specially formatted data corresponding to user personalized information, commands from the user, and responses including message status information from the network connected devices. The user personalized information enables the network appliance to perform network communications according to user specified settings and enables the network appliance to assume the user specific information appliance identification. The information appliance is typically a portable computer and in some embodiments is a palm-sized computer. The network appliance is typically a network attached phone and in some embodiments is an Ethernet telephone.

A first aspect of the invention provides a communications system comprising a telephone having capabilities, a portable computer connected to the telephone, and a network link connecting the telephone to network connected devices. The portable computer includes a port for connecting to the telephone, a memory storing user information corresponding to a user; and processing resources adapted to exchange data with the telephone. The data includes the user information and data corresponding to the telephone capabilities. The exchange of the data enables the portable computer to: discover capabilities of the telephone; provide the user information to the telephone; and establish telephone operating parameters for telephone communications with devices connected to the telephone based on the user information and the telephone capabilities.

In some embodiments, the communications system includes a gateway server connected to the network link, and switched circuit network devices connected to the gateway server.

In some embodiments, the communications system includes a router connected to the network link, and packet based network devices connected to the router. For some of these embodiments, the portable computer includes processing resources for Internet access, and the telephone includes processing resources for Internet access.

For some of the embodiments with Internet access capability, the portable computer includes processing resources for Internet access including Internet applications, transmission control software, and Internet protocol software. The telephone includes processing resources for Internet access including an Internet access application, transmission control software, Carrier Sense Multiple Access/Collision Detection software, and Internet protocol software.

For some of the embodiments with Internet access capability, the portable computer includes processing resources for Internet access including Internet display applications and display/user input transfer software. The telephone includes processing resources for Internet access including Internet applications, display/user input transfer software, transmission control software, Internet protocol software, and Carrier Sense Multiple Access/Collision Detection software.

In some embodiments, the portable computer comprises a palm-sized computer; and the telephone comprises an Ethernet telephone. In some embodiments, the data exchanged with the telephone corresponding to the telephone capabilities and the user information are formatted according to an applications layer protocol. The applications layer protocol has frame formats for telephony functions.

In some embodiments, the portable computer includes processing resources for user interface support of video data. The telephone includes a display, and processing resources for video display and capture. In some embodiments, the portable computer includes processing resources for user interface support of video data, video data decoding, and video display. In some embodiments, the portable computer includes processing resources for user interface support of video data, video data decoding, video display, and video camera image data.

A second aspect of the invention provides a method for transmitting data from a portable computer to a telephone. The telephone has operating capabilities. The telephone is connected to network connected devices. The method comprises connecting the portable computer with the telephone, supplying the portable computer with telephone operating data, the portable computer exchanging the telephone operating parameter data and the operating capabilities with the telephone, and the portable computer establishing telephone operating parameters for a communications sessions. In some embodiments, the method includes the user starting a telephony program with the portable computer controlling execution of the telephony program.

The telephone operating parameter data is for a communications session including an exchange of messages with one or more of the network connected devices. In some embodiments, the communications session includes simultaneous exchanges of voice and packet data messages.

The telephone operating parameters for the communications session are based on the telephone operating parameter data and the operating capabilities. The telephone operating parameters provide options and features for the communications session. In some embodiments, the operating parameter data comprises constructs formatted according to an applications layer protocol, the applications layer protocol having frame formats for telephony functions.

In some embodiments, prior to connecting the portable computer with the telephone, the portable computer stores user information. The user information can include an identification corresponding to the portable computer, user access parameters, and user characteristics corresponding to the telephone operating parameter data. For some of these embodiments, establishing telephone operating parameters includes the user selecting user setting inputs. The user setting inputs corresponding to the portable computer identification, user access parameters, and user characteristics, the user selecting change the corresponding telephone operating parameter data. In one embodiment, the user setting inputs include the network address of the telephone, so that the user can change the network address provided by the telephone to be the network address of the portable computer.

In some embodiments, after the establishing step, the method includes one or more of the following programs: conferencing, dialing, receiving an incoming call, forwarding, transferring, and placing a call. For some of these embodiments, the telephone receives input data from the portable computer. The input data is formatted according to a data link layer protocol. The data link layer protocol encapsulates frames formatted according to an application layer protocol adapted for telephony functions. The telephone transforms the input data into transport data formatted according to a transport protocol for a packet switched network. The telephone transmits the transport data to a gateway server. The gateway server is connected by a local area network link to at least one switched circuit network including a public switched telephone network.

In some embodiments, the network connected devices include a gateway server. The gateway server provides access for the user to a public switched telephone network. For some of these embodiments, the telephone is also connected to a gatekeeper and a directory server by a local area network link. Communications between the telephone and the gatekeeper, gateway server, and directory server are formatted according to a soft private branch exchange telephony application layer protocol.

In some embodiments, the telephone is connected by a local area network link to a router. The router is connected to at least one packet based network including an Internet source. Communications between the router and the telephone are formatted according to packet based network application protocols.

A third aspect of the invention includes a method for exchanging voice and data messages between a telephone and devices connected to a network. The telephone is connected to the network. The method starts by connecting the telephone with a portable computer. The portable computer then exchanges telephone operating parameter data with the telephone. The operating parameter data provides options for communications between the telephone and the network connected devices.

Then, in response to a user indication of a desired communication, the portable computer exchanges call data with the telephone. The call data corresponds to the desired communication. The call data is formatted according to an application layer protocol, and the underlying transport, network, and data link layer protocols. The application layer protocol has frame formats for telephony functions.

The telephone then exchanges messages with an addressed network connected device. The messages correspond to the desired communication. The addressed network connected device has a network address. The message includes data corresponding to the address of the addressed network connected device.

In some embodiments, the method includes, prior to connecting the portable computer with the telephone, the portable computer storing user information. The operating parameter data comprises the user information. The user information comprises an identification corresponding to the portable computer and user access parameters. For some of these embodiments, the telephone has an identification. The method includes the telephone presenting and the identification corresponding to the portable computer to the network connected devices in place of the telephone identification.

In some embodiments, the telephone comprises an Ethernet telephone, and the portable computer comprises a palm-sized computer.

In some embodiments, the telephone is connected to a gatekeeper, a directory server and a gateway server by a local area network link. Communications between the telephone and the gatekeeper, the gateway server, and the directory server are formatted according to a soft private branch exchange telephony application layer protocol.

In some embodiments, the telephone is connected by a local area network link to a router. The router is connected to at least one packet based network including an Internet source. Communications between the router and the telephone are formatted according to packet based network application protocols.

In some embodiments, the exchange of messages includes simultaneous exchanges of voice and packet data messages.

A fourth aspect of the invention provides a portable computer adapted for connection to a telephone. The telephone has capabilities. The portable computer comprises a port for connecting to the telephone, a memory storing user information corresponding to a user; and processing resources adapted to exchange data with the telephone. The data exchanged with the telephone includes the user information and data corresponding to the telephone capabilities. The exchange of the data enables the portable computer to discover capabilities of the telephone, provide the user information to the telephone; and establish telephone operating parameters for telephone communications with devices connected to the telephone based on the user information and the telephone capabilities.

In some embodiments, the portable computer includes a display providing user interface graphic elements corresponding to data exchanged with the telephone, and a user interface enabling the user to input data supplementing the user information provided to the telephone. For some of these embodiments, the data exchanged with the telephone includes data corresponding to portable computer control of telephony programs, and data corresponding to the status of the devices connected to the telephone.

In some embodiments, the user information comprises an identification corresponding to the portable computer, user characteristics, and user access parameters. For some of these embodiments, the telephone has an identification, and the identification corresponding to the portable computer is presented by the telephone instead of the telephone identification to devices connected to and communicating with the telephone.

In some embodiments, the data exchanged with the telephone corresponding to portable computer control of the execution of the telephony programs, the telephone capabilities, and the user information are formatted according to an applications layer protocol. The applications layer protocol has frame formats for telephony functions.

In some embodiments, the portable computer comprises a palm-sized computer. In some embodiments, the portable computer is adapted to provide data processing and user interface functions without connection to the telephone. In some embodiments, the exchange of the data enables the portable computer to control execution of telephony programs.

In some embodiments, the portable computer includes processing resources for Internet access. The processing resources for Internet access can include Internet applications, transmission control software, and Internet protocol software. Alternatively, the processing resources for Internet access can include Internet display applications and display/user input transfer software.

In some embodiments, the portable computer includes processing resources for user interface support of video data. The processing resources for user interface support of video data can include video data decoding, and video display. Alternatively, the processing resources for user interface support of video data, video data decoding, video display, and video camera image data.

A fifth aspect of the invention provides a telephone adapted for connection to a portable computer. The portable computer has user information corresponding to a user. The telephone comprises a port for connecting to the portable computer, network communication capabilities, portable computer companion capabilities, and processing resources adapted to exchange data with the portable computer. The network communication capabilities include a communication port. The data includes the user information, data corresponding to the network communication capabilities; and the portable computer companion capabilities. The exchange of data enables the telephone to: discover user information and capabilities of the portable computer, provide the network communication capabilities and the portable computer companion capabilities to the portable computer, and indicate the network communication capabilities to devices connected to the telephone via a network.

In some embodiments, the portable computer is adapted to control execution of telephony programs. The data exchanged with the portable computer includes data corresponding to portable computer control of the telephony programs. Responsive to commands from the portable computer, the exchange of the data enables the telephone to communicate with devices connected to the telephone.

In some embodiments, the telephone has an identification and the portable computer has an identification. The portable computer identification is presented by the telephone in place of the telephone identification to devices connected to and communicating with the telephone.

In some embodiments, the telephone comprises an Ethernet telephone.

In some embodiments, the data exchanged with the portable computer corresponding to the telephone capabilities and the user information are formatted according to an applications layer protocol, the applications layer protocol having frame formats for telephony functions.

In some embodiments, the telephone includes processing resources adapted to receive incoming call data from a gateway server indicating that a first network connected device is waiting to start a call with a user, and processing resources adapted to transform the incoming call data into an incoming call message formatted in a data link layer protocol for transmission to the portable computer. The data link layer protocol encapsulates frames formatted according to the application layer protocol.

In some embodiments, the telephone provides the network communication capabilities to a user without connection to the portable computer.

In some embodiments, the telephone includes processing resources for Internet access. The processing resources for Internet access can include Internet applications, display/user input transfer software, transmission control software, Internet protocol software, and Carrier Sense Multiple Access/Collision Detection software. Alternatively, the processing resources for Internet access can include an Internet access application, transmission control software, Carrier Sense Multiple Access/Collision Detection software, and Internet protocol software.

In some embodiments, the telephone includes a display; and processing resources for video display and capture.

BRIEF DESCRIPTION OF THE FIGURES

FIG. 3D is a protocol stack for the companion appliances for an embodiment where the Ethernet telephone is running the Internet applications protocol stack.

FIG. 4 illustrates a frame format according to one embodiment of the invention, referred to as the Data Link Layer Protocol.

FIGS. 5A, 5B, 5C, 5D, 5E, 5F, 5G, 5H, 5I, 5J, and through 5K illustrate a plurality of Ethernet Telephone Management Protocol (EMP) frame body formats according to one embodiment of the invention.

DETAILED DESCRIPTION

Connection Scheme for Communications System

Figure 1:
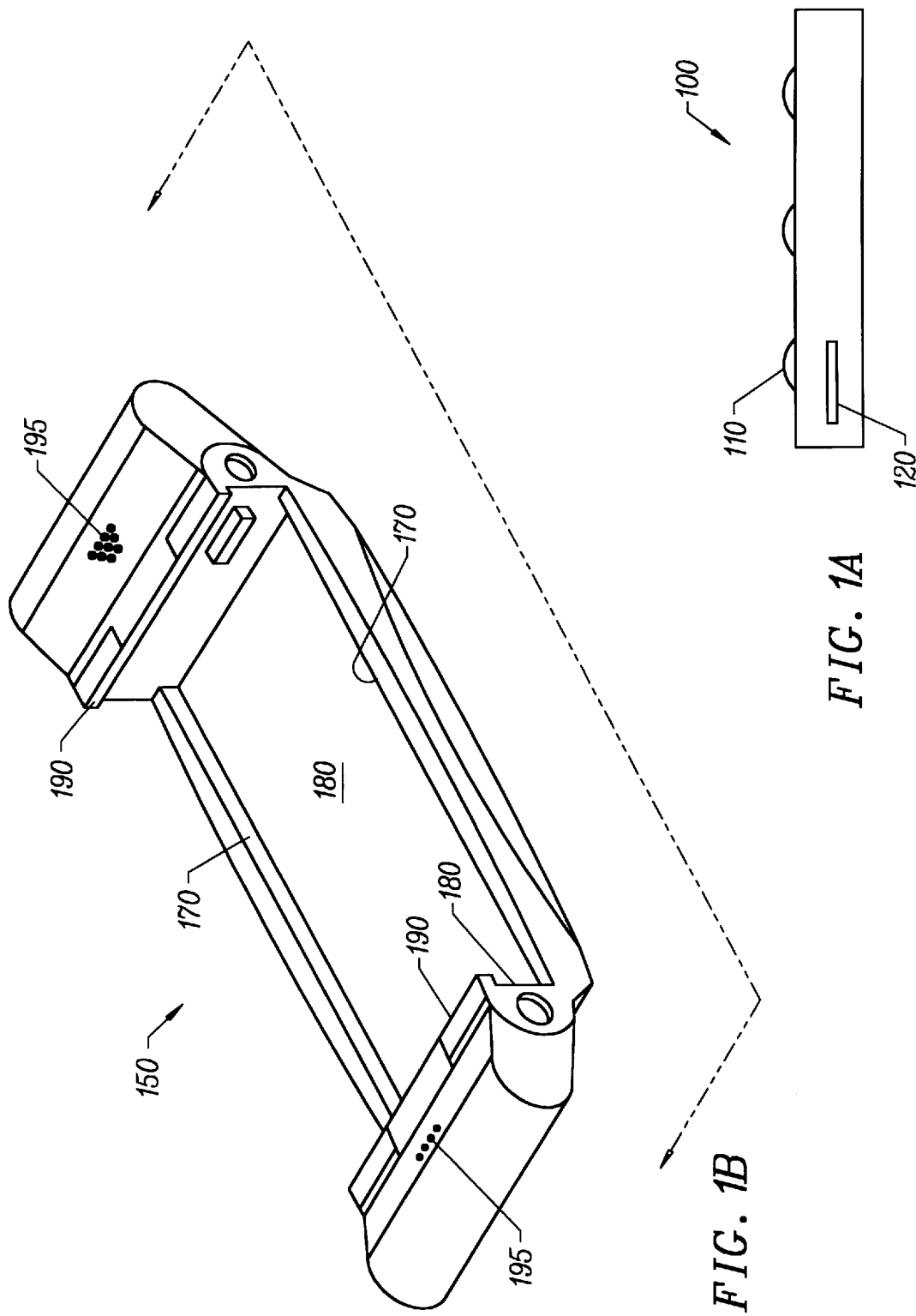
FIG. 1A is a top-edge view of a portable computer adapted for insertion into a prior art telephone accessory.
FIG. 1B is a perspective view of a prior art telephone accessory adapted to receive a portable computer.
Figure 2:
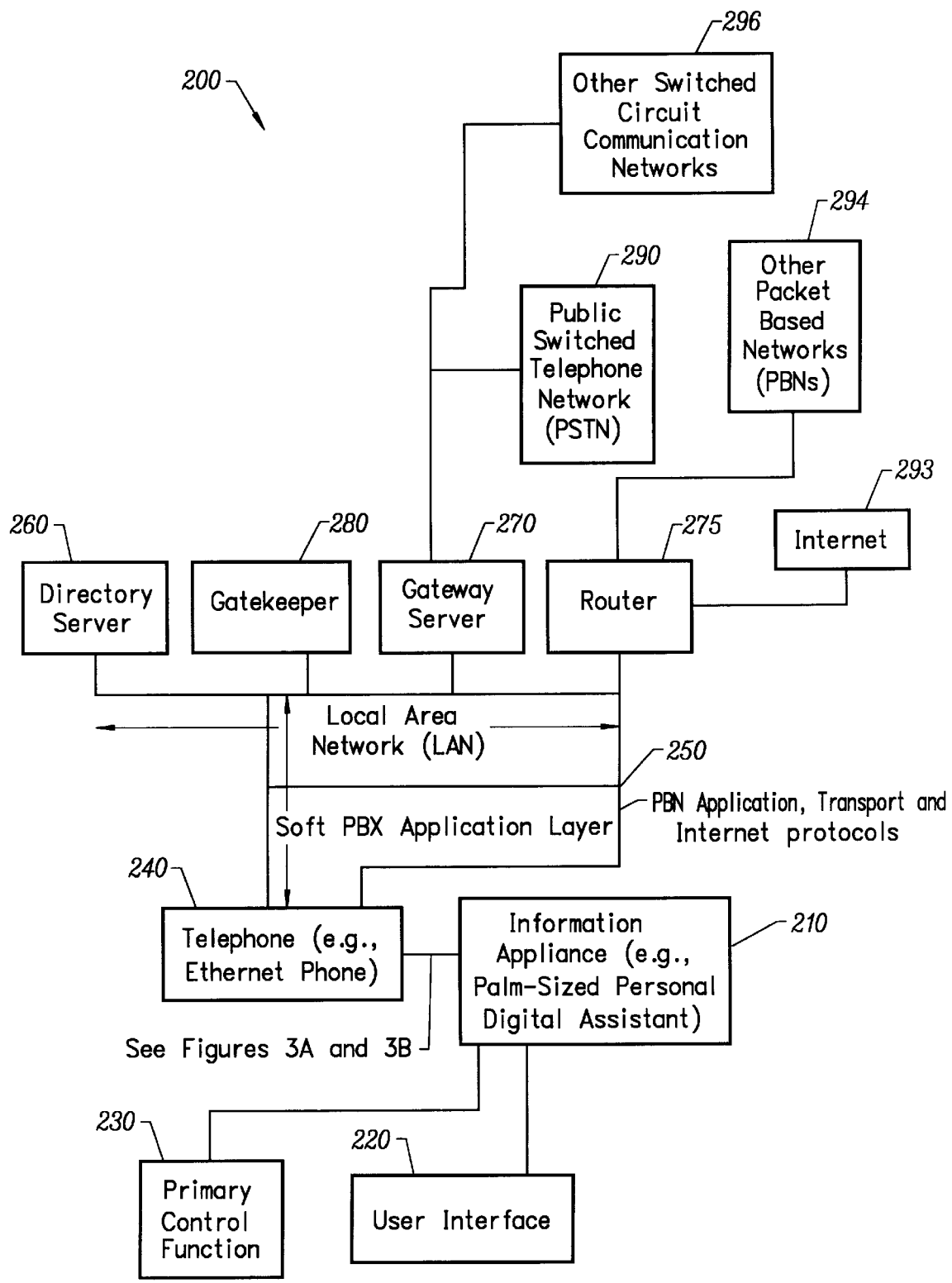
FIG. 2 is a schematic diagram illustrating the connections between the telephone, the portable computer, the local area network, and services connected to the local area network.

A first aspect of the invention provides a communications system for companion information and network appliances. The information appliance is typically a portable computer (shown in FIG. 3A as reference number 320), and the network appliance is typically a network attached, or connected telephone 240. A connection scheme 200 for one embodiment of the communications system is shown in FIG. 2. The communications system includes a network appliance shown in FIG. 2 as a telephone 240, a information appliance 210 (e.g., a portable computer) connected to the telephone 240, and a network link connecting the telephone 240 to network connected devices.

The network appliance is typically a network connected or attached telephone 240, and can be an Ethernet telephone (shown in FIG. 3A as reference number 310), a cable television set top box, a personal computer, a workstation, or any other network connected device that communicates with other network connected devices providing telephony communications. The telephone 240 has capabilities such as a maximum number of connected lines, and a maximum number of conference lines.

The network link is shown in FIG. 2 as a local area network link 250. The portable computer 320 includes a physical layer communications port [shown in FIG. 3A through FIG. 3D as an Electronic Industries Association/Telecommunications Industry Association (EIA/TIA) 232 serial port 323] for connecting to the telephone 240, a memory storing user information corresponding to a user; and processing resources adapted to exchange data with the telephone 240.

The data includes the user information and data corresponding to the telephone 240 capabilities. The exchange of the data enables the portable computer 320 to discover capabilities of the telephone 240, provide the user information to the telephone 240, and establish telephone 240 operating parameters for telephone communications with devices connected to the telephone 240 based on the user information and the telephone capabilities. The telephone 240 capabilities are typically transferred from the telephone 240 to the information appliance 210 during initialization of the companion appliances. Initialization typically occurs upon connecting and power-up of the companion appliances.

The different types of data exchanged between the telephone 240 and the information appliance 210 of the communications system are discussed in greater detail below in the Data Link Layer Protocol section in conjunction with FIG. 4, and in the Ethernet Telephone Management Protocol Frame Descriptions section in conjunction with FIGS. 5A through 5K. State diagrams illustrating selected exchanges are provided in FIGS. 6 through 9 and are discussed below in the Interactions between the Telephone and the Information Appliance section. In some embodiments of the communication system, the data exchanged between the telephone 240 and the information appliance corresponds to the telephone 240 capabilities and the user information, and is formatted according to an applications layer protocol having frame formats for telephony functions.

FIG. 2 illustrates the connections between the telephone, the portable computer 320, the telephone, the local area network, and services connected to the local area network. The connection scheme 200 illustrates that for some embodiments, the information appliance 210 provides a user interface 220 and a primary control function 230.

The information appliance 210 can be any device capable of storing user information and exchanging information with a network connected appliance according to the communications protocol hierarchy with Application Program Interface (API), Point to Point protocol (PPP), and High-level Data Link Control (HDLC) layers for telephony applications 300 described in conjunction with FIG. 3A below. More typically the information appliance 210 is a portable computer 320 (such as a palm-sized computer shown in FIG. 3B as reference number 343) or a desktop computer.

The user interface 220 typically comprises a display, however any device, or element thereof, that can provide sensory cues adapted for perception by the user can be used as a user interface according to the invention. The user can provide inputs for the display by tapping a user interface graphic element image on the screen with a stylus, pressing a button or key on the information appliance 210, or by any other means known in the art. Details of the display and certain user interface graphical elements and user inputs related thereto for some embodiments are illustrated in FIGS. 10 through 35 below and are discussed in the User Interface Graphical Elements and Inputs section below.

In some embodiments the telephone 240 provides simultaneous data and telephony communications. In order for the telephone 240 to act simultaneously as an Internet access device and a telephone 240, the information appliance provides multiprocessing.

While the telephony application is running in the foreground, a packet data communications program runs in the background to check if any packets have been received on the telephone 240 communications port. If any packets have been received, the packet data communications program forwards the packets to the appropriate application depending on whether the packets are formatted according to the Ethernet Telephone Management Protocol (EMP) 333 (discussed below with reference to FIGS. 3 through 5) or IP. If the received packet is an Internet Protocol (IP) packet, then the program forwards it to the appropriate network application corresponding to the application protocol, such as simple mail transfer protocol (SMTP) for email packets, or hyper text transfer protocol (HTTP) for packets received from the World Wide Web.

The primary control function 230 enables the user of the information appliance 210 to establish telephone operating parameters for the telephone 240, and to control the execution of telephony programs with network connected devices. The advantages of placing the primary control function 230 a portable information appliance 210, such as a palm-sized computer 343 (sometimes referred to as personal digital assistant, or a PDA) are commensurate with the portability of the palm-sized computer 343 and the personalization of the telephone operating parameters that can be accomplished for a palm-sized computer 343 that is used by a single user. The information appliance 210 communicates user settings for telephony operations to the telephone 240 during initialization of the companion appliances. The user settings established during initialization can be supplemented by the user entering user settings for an upcoming session before beginning a particular set of communications with network connected devices using the telephone 240.

Figure 3A:
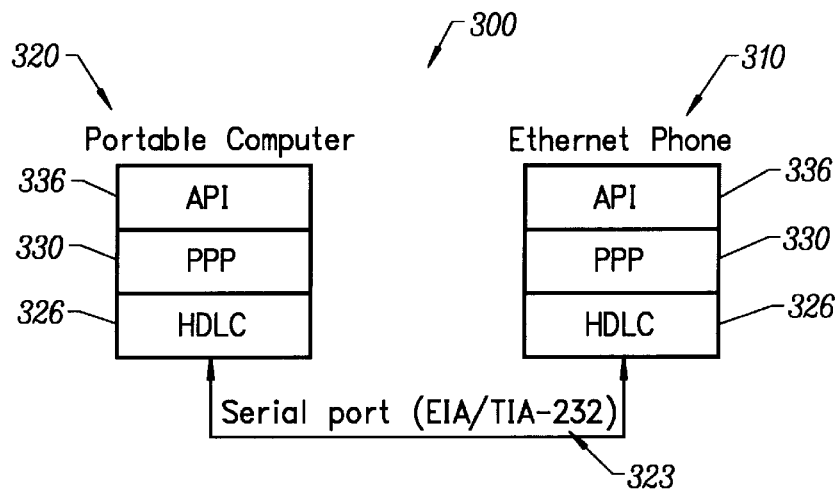
FIG. 3A is communications protocol hierarchy for an embodiment of the invention with Application Program Interface (API), Point to Point protocol (PPP), and High-level Data Link Control (HDLC) layers for telephony applications.
Figure 3B:
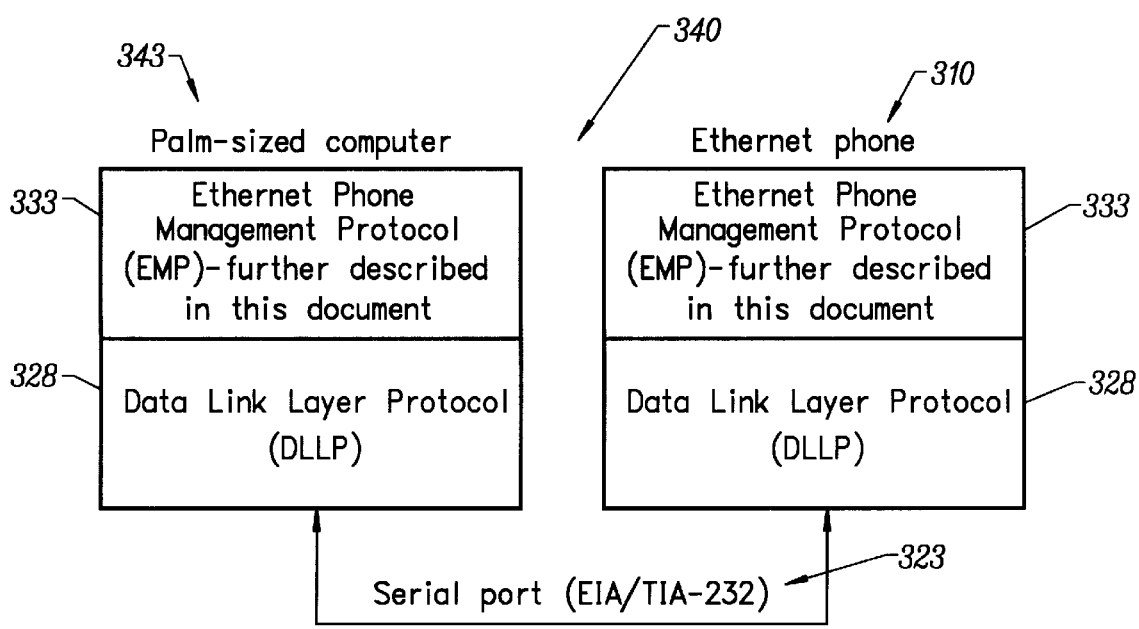
FIG. 3B is a communications protocol hierarchy for an embodiment of the invention with Ethernet Telephone Management Protocol (EMP) and data link layer protocol (DLLP) layers for telephony applications.

The communications protocols used for data exchanged between the information appliance 210 and the telephone 240 are discussed in more detail in the "protocol design" and "protocol layer scheme" sections of this application, in conjunction with FIGS. 3A and 3B.

In some embodiments, the communications system includes a gateway server 270 connected to the network link, and switched circuit network devices connected to the gateway server 270. In some embodiments, as shown in FIG. 2, the telephone 240 is connected to network services and network connected devices through a local area network (LAN) link 250. The LAN link 250 connects the telephone 240 to a directory server 260, a gateway server 270, a router 275, and a gatekeeper 280.

The LAN link can be through a digital subscriber line (DSL), a twisted-pair cable, an integrated services digital network (ISDN) link, or any other link that supports packet switched communications with a LAN, including Internet Protocol (IP)/Transmission Control Protocol (TCP) communications using an Ethernet. The gateway server 270 is connected to regional, national, and global services across wide area network links to public switched telephone networks (PSTN) 290, and other switched circuit networks (SCNs), included in the other communications networks 296 shown in FIG. 2. The other communications networks 296 can include, broadband distribution channels, wireless networks, restricted access government and corporate networks, or any other communications network capable of transmitting data formatted for SCNs or packet based networks (PBNs).

In some embodiments, the telephone 240 is an Ethernet telephone (shown in FIG. 3A as reference number 310) and the gateway server 270 transforms the data formatted for a packet based network received from the telephone 240 (or any other gateway server 270 client or terminal), to data formatted for a switched circuit network for transmission to the PSTN 290 or any other SCN. The gateway server 270 also transforms the data formatted for switched circuit network devices, such as the data received from the PSTN 290 or any other SCN, to data formatted for a packet based network device such as the telephone 240.

In some embodiments, the communications system includes a router connected to the network link, and packet based network (PBN) devices connected to the router. For the PBN connected devices no gateway server 270 data transformation is needed. Therefore, data transmitted from the telephone 240 proceeds from the LAN link 250 to a router 275, and then to the desired PBN such as an Internet source 293 or other PBN 294 and then to network connected devices accessible therefrom. The telephone 240 can also transmit the data directly through the router 275 to devices connected directly to the router 275. Network and transmission layer formats for these communications can be according to the IP/TCP protocols.

The Ethernet telephone 310 communicates with the gatekeeper 280, the directory server 260, the gateway server 270, and other Ethernet telephones using a telephony application layer protocol, otherwise referred to as a soft private branch exchange (PBX), for example an protocol compliant with the International Telecommunication Union ITU-T recommendation H.323 "Packet-based multimedia communication systems", or a Session Initiation Protocol (SIP).

The information appliance 210 stores address information according to a particular user database. The address information stored in the user database and address information entered by the information appliance 210 user is provided to the telephone 240 as an alias (or high-level) address such as a telephone number using the protocols discussed in the protocol design section below. The telephone 240 transmits the alias address to the gatekeeper 280 using a registration, admission and status (RAS) compliant protocol. Certain details of an RAS protocol are provided by the International Telecommunication Union (ITU) in the ITU-T recommendation H.323 and for transmission formats in the ITU-T recommendation H.225 "Media stream packetization and synchronization on non-guaranteed quality of service LANs". The RAS signaling function performs registration, admission, bandwidth changes, status and disengagement procedures between endpoints (e.g., the telephone 240) and the Gatekeeper 280.

For embodiments operating according to the H.323 recommendation, a gatekeeper 280 can service endpoints such as gateways (such as the gateway server 270), terminals (also referred to as client terminals, e.g., the telephone 240), and multipoint control units. Each multipoint control unit supports conferences between three or more endpoints. The collection of all terminals, gateways, and multipoint control units managed by a single gatekeeper 280 operating according to the H.323 protocol is referred to as an H.323 zone. The gatekeeper 280 acts as the central point for all calls within its zone and provides call control services to a plurality of registered endpoints.

Call control function communications between the telephone 240 and the gatekeeper 280 include control messages governing operation of the telephone 240. These messages address capabilities exchange, opening and closing of logical channels, preference requests, flow control messages, and general commands and indications and are transmitted over a reliable ITU H.245 control channel. The companion appliances enable the user to provide appropriate inputs into the control channel messages using communications from the information appliance 210 to the telephone 240 in messages formatted according to the data link layer protocol (DLLP 328) and EMP discussed below.

For H.323 embodiments, the telephone 240 uses an ITU Q.931 call signaling channel to establish a connection with another network connected device through the gatekeeper 280.

The gatekeeper 280 performs two important call control functions. The first is address translation from LAN aliases, such as those provided by the telephone 240, to Internet Protocol (IP) or Internet Packet Exchange (IPX) addresses, as defined in the RAS specification. The gatekeeper 280 transmits a message including the LAN alias addresses provided by the telephone 240 to the directory server 260.

The directory server 260 includes a registry table having alias addresses and corresponding network (e.g., SCN, IP or IPX) addresses for the registered network connected devices. In response to the message from the gatekeeper, the directory server 260 accesses the registry table and transmits a message including the corresponding network addresses to the gatekeeper 280. The gatekeeper 280 then provides the network addresses to the telephone 240. The telephone 240 then places the network address in the message to be sent to the network connected device and transmits the message to the device through the gateway server 270 or router 275.

The directory server 260 also enables the user to properly address messages sent to network connected device addresses that are not included in the address information stored in the information appliance 210. The user can retrieve and store such addresses in the information appliance 210 for future use. Similarly, the user can provide new address information for inclusion in the directory server 260 registry table, so that other users can determine the corresponding network addresses for network connected devices that were not previously included in the directory server 260 database.

Method for Transmitting Data from a Portable Computer to a Telephone

The second aspect of the invention provides a method for transmitting data from a portable computer 320 to a telephone 240. The telephone 240 has operating capabilities. The telephone 240 is connected to network connected devices. The method comprises connecting the portable computer 320 with the telephone 240, supplying the portable computer with telephone operating data, the portable computer exchanging the telephone operating parameter data and the operating capabilities with the telephone, and the portable computer establishing telephone operating parameters for a communications session.

In some embodiments, the method includes the user starting a telephony program with the portable computer 320 controlling execution of the telephony program. In some embodiments, the telephone 240 accepts the telephone operating parameters after the establishing step. In other embodiments, the telephone 240 can accept or reject the telephone operating parameters after the establishing step, depending on network conditions or whether more than one portable computer 320 is connected to the telephone.

The telephone 240 operating parameter data is for a communications session including an exchange of messages with one or more of the network connected devices. In some embodiments, the communications session includes simultaneous exchanges of voice and packet data messages.

The telephone 240 operating parameters for the communications session are based on the telephone operating parameter data and the operating capabilities. The telephone 240 operating parameters provide options and features for the communications session. In some embodiments, the operating parameter data comprises constructs formatted according to an applications layer protocol, the applications layer protocol having frame formats for telephony functions. In some embodiments, the operating parameter data comprises constructs formatted according to a high-level data link control protocol (shown in FIG. 3A as reference number 326).

In some embodiments, prior to connecting the portable computer 320 with the telephone 240, the portable computer stores user information. The user information can include an identification corresponding to the portable computer 320, user access parameters, and user characteristics corresponding to the telephone 240 operating parameter data. For some of these embodiments, establishing telephone 240 operating parameters includes the user selecting user setting inputs. The user setting inputs corresponding to the portable computer 320 identification, user access parameters, and user characteristics, the user selecting change the corresponding telephone 240 operating parameter data. In one embodiment, the user setting inputs include the network address of the telephone, so that the user can change the network address provided by the telephone to be the network address of the portable computer.

In some embodiments, after the establishing step, the method includes one or more of the following programs: conferencing, dialing, receiving an incoming call, forwarding, transferring, and placing a call. For some of these embodiments, the telephone 240 receives input data from the portable computer 320.

The input data is formatted according to a data link layer protocol (shown in FIG. 3B as reference number 328). The data link layer protocol 328 encapsulates frames formatted according to an application layer protocol adapted for telephony functions, i.e., the Ethernet telephone management protocol (EMP) shown in FIG. 3B as reference number 333. The telephone 240 transforms the input data into transport data formatted according to a transport protocol for a packet switched network. The telephone 240 transmits the transport data to a gateway server 270. The gateway server 270 is connected by a local area network link 250 to at least one switched circuit network including a public switched telephone network 290.

In some embodiments, the network connected devices include a gateway server 270. The gateway server 270 provides access for the user to a public switched telephone network 290. For some of these embodiments, the telephone 240 is also connected to a gatekeeper 280 and a directory server 260 by a local area network link 250. Communications between the telephone 240 and the gatekeeper 280, gateway server 270, and directory server 260 are formatted according to a soft private branch exchange telephony application layer protocol.

In some embodiments, the telephone 240 is connected by a local area network link 250 to a router 275. The router 275 is connected to at least one packet based network including an Internet source 293. Communications between the router 275 and the telephone 240 are formatted according to packet based network application protocols.

In some embodiments the method includes a user placing a phone call after the establishing telephone 240 operating parameters step. Placing the phone call includes the user starting a dialing program and the user inputting values to the portable computer 320. The values correspond to a recipient network connected device. The portable computer 320 displays the values and phone call status information. The portable computer 320 transforms the values into input data formatted according to a data link layer protocol 328. The data link layer protocol 328 encapsulates frames formatted according to an application layer protocol (such as the EMP 333). The application layer protocol is adapted for telephony functions. The portable computer 320 transmits the input data to the telephone 240.

For some of the embodiments including a dialing program, the user enters text data to form a memo corresponding to the telephone 240 call after the transmitting step. The portable computer 320 creates a data record corresponding to the telephone 240 call, and the portable computer attaching the memo to data record.

Figure 10:
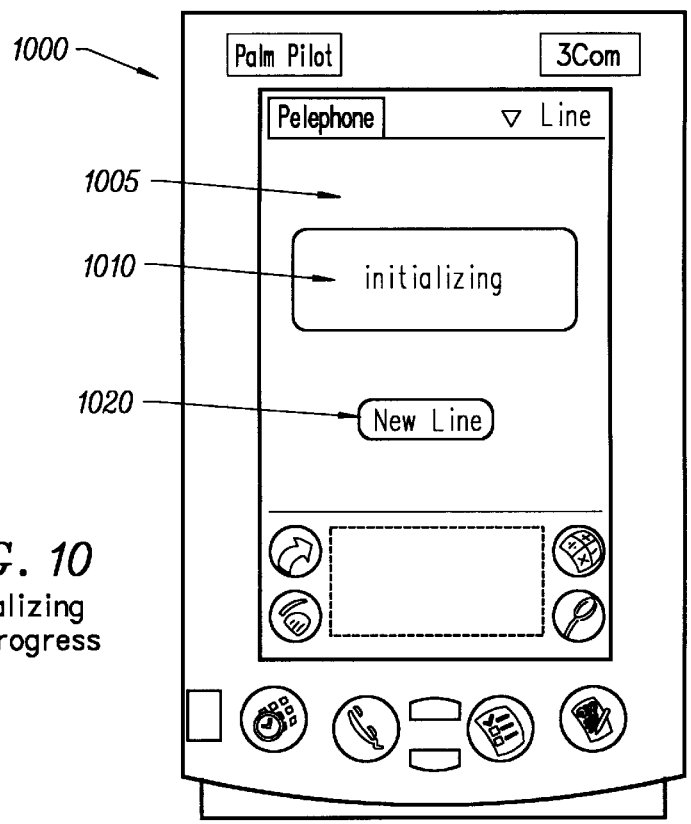
FIG. 10 shows an initialization in progress screen for a palm-sized computer according to one embodiment of the invention.

For some of the embodiments including a dialing program, the portable computer 320 includes a user interface 220 and a display (such as the palm-sized computer 343 display 1005 shown in FIG. 10). The inputting is accomplished through the user interface 220. The portable computer 320 displays a telephone number entry field in which the user inputs the values.

In some embodiments the method includes a user placing a conference call after the establishing telephone 240 operating parameters step. Placing the conference call includes the user starting a conferencing program and the user inputting values to the portable computer 320. The values correspond to a plurality of conference participant network connected devices. The portable computer 320 displays the values and conference call status information. As for placing the call, the portable computer 320 transforms the values into input data formatted according to a data link layer protocol 328. The data link layer protocol 328 encapsulates frames formatted according to an application layer protocol. The application layer protocol is adapted for telephony functions. The portable computer 320 transmits the input data to the telephone 240.

For some of the embodiments including a conferencing program, the portable computer 320 includes a display 1005. The starting includes a user selection of a user interface element for a conferencing feature (such as the "conference option" element shown in FIG. 26 as reference number 2640). The user interface element is disposed on the display 1005. In response to the user selection, the portable computer 320 displays a list of conference actions (such as those shown in FIG. 34) for subsequent user selection.

In some embodiments the method includes a user forwarding a call after the establishing telephone operating parameters step. The forwarding includes the user starting a forwarding program, and the user inputting a number to the portable computer 320. The number corresponds to a forwarding destination network connected device. The portable computer 320 displays the number and forwarding status information. The portable computer 320 transforms the values into input data formatted according to a data link layer protocol 328. The data link layer protocol 328 encapsulates frames formatted according to an application layer protocol. The application layer protocol is adapted for telephony functions. The portable computer 320 transmits the input data to the telephone 240.

In some embodiments the method includes connecting a user to a first network connected device after the establishing telephone 240 operating parameters step. The first network connected device having a first number. The user transfers a call from the first network connected device to a second network connected device. The transferring includes the user inputting a second number into the portable computer 320 corresponding to the second network connected device. The portable computer 320 then displays the first and second numbers, and status information corresponding to the first network connected device and the second network connected device. The portable computer 320 then transforms into input data formatted according to a data link layer protocol 328. The data link layer protocol 328 encapsulates frames formatted according to an application layer protocol. The application layer protocol is adapted for telephony functions. The portable computer 320 transmits the input data to the telephone 240.

Figure 6:
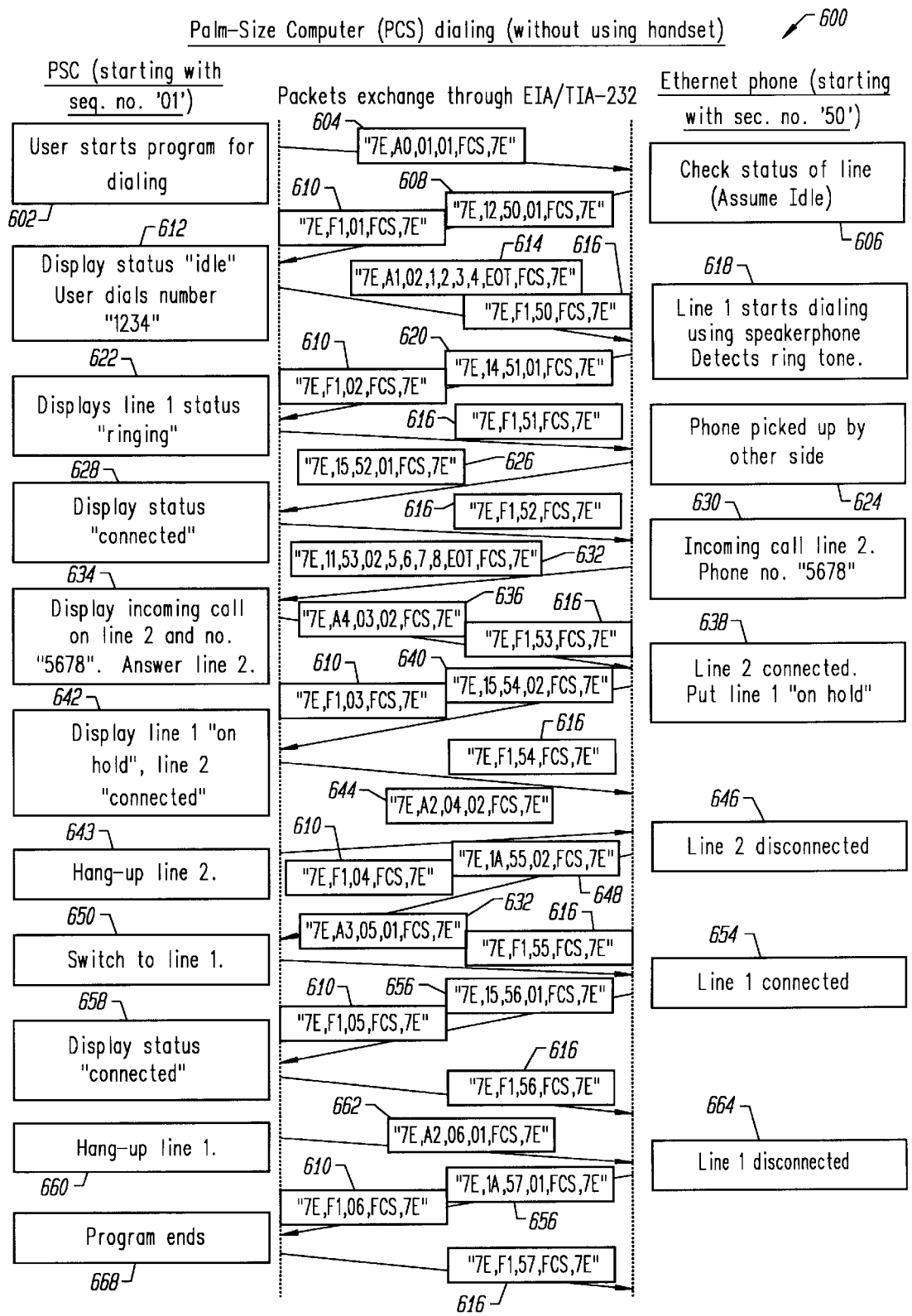
FIG. 6 provides a state diagram for a palm-sized computer dialing a phone number according to one embodiment of the invention.

In some embodiments, the portable computer 320 corresponds to a user and has a display 1005. After the establishing telephone operating parameters step, the method includes the portable computer 320 receiving an incoming call. Receiving the incoming call includes the portable computer 320 receiving an incoming call message from the telephone 240, the incoming call message (such as the incoming call message 632 for the second 02 line, as shown in FIG. 6) indicating that a first network connected device is waiting to start a call with the user. The portable computer 320 displays an incoming call screen (such as the call incoming window shown in FIG. 25 as reference number 2500) on the display 1005. For some of these incoming call embodiments, the portable computer 320 includes an address database. The incoming call message includes a caller name, and a caller identification. The incoming call screen includes a user selection for saving the caller name and the caller identification to the address database (such as the "save" button shown in FIG. 25 as reference number 2530). For some of these incoming call embodiments, the incoming call screen includes user selections for processing the incoming call. The user selections include rejecting the incoming call (shown in FIG. 25 as the "reject" button 2550), answering the incoming call (shown in FIG. 25 as the "answer" button 2540), and answering the call at a later time (shown in FIG. 25 as the "OK" button 2560).

In some embodiments, after the establishing telephone 240 operating parameters step, the method includes a user placing a phone call. Placing the phone call includes the telephone 240 receiving input data from the portable computer 320. In some embodiments, after the establishing telephone 240 operating parameters step, the method includes a user placing a conference call. Placing the conference call includes the telephone 240 receiving input data from the portable computer 320. In some embodiments, after the establishing telephone 240 operating parameters step, the method includes a user forwarding a call. Forwarding the call includes the telephone 240 receiving input data from the portable computer 320. In some embodiments, after the establishing telephone 240 operating parameters step, the method includes connecting a user to a first line, the first line having a first number. The user then transfers a call from the first line to a second line. The transferring includes the telephone 240 receiving input data from the portable computer 320.

For the embodiments described in the preceding paragraph, the input data is formatted according to a data link layer protocol 328. The data link layer protocol 328 encapsulates frames formatted according to an application layer protocol. The application layer protocol is adapted for telephony functions. The telephone 240 transform is the input data into transport data formatted according to a transport protocol for a packet switched network. The telephone 240 transmits the transport data to a gateway server 270. The gateway server 270 is connected to at least one switched circuit network including a public switched telephone network 290.

In some embodiments, after the establishing telephone 240 operating parameters step, the method includes the telephone 240 receiving an incoming call from a first network connected device. The receiving includes the telephone 240 receiving data from a gateway server 270 indicating that a first network connected device is waiting to start a call with a user. The telephone 240 transforms the data into an incoming call message formatted in the data link layer protocol 328. The data link layer protocol 328 encapsulates frames formatted according to an application layer protocol. The application layer protocol is adapted for telephony functions. The telephone 240 transmits the incoming call message to the portable computer 320.

In some embodiments, after the connecting, the method includes powering up the portable computer 320. In response to the powering up of the portable computer 320, the portable computer and the telephone 240 are initialized. The initializing include the exchanging and establishing steps.

In some embodiments, the portable computer includes a display 1005. After the establishing step, the method includes a user starting a telephony program. The starting includes the portable computer displaying a user interface element corresponding to a first menu (such as the line pop-up menu shown in FIG. 16 as reference number 1610) on the display 1005. The first menu includes a list of telephony programs available for a particular connected line. The user selects the first menu user interface element (such as the "line" prompt in FIG. 16). The portable computer 320 displays a first (line pop-up) menu 1610 list, the first menu list including user interface elements corresponding to the telephony programs. The user selects a program from the list. For some of these embodiments, the portable computer 320 simultaneously displays information corresponding to the connected line and the connection thereto on the display 1005 with the first (line pop-up) menu 1610 list.

In some embodiments, the portable computer 320 includes a display 1005. After the establishing step, the method includes the user starting a telephony program. The starting includes the user selecting a button corresponding to a second menu. In one embodiment, the second menu is the features bar menu (shown in FIG. 26 as reference number 2600) and the button is the features bar. The button is provided on the display 1005. The second menu includes a list of programs. Execution of the programs is controlled by the portable computer 320. The user then selects a user interface element corresponding to the program (such as the "dial" option shown in FIG. 26 as reference number 2610) from the list of programs.

In some embodiments, the method includes prior to connecting the portable computer 320 with the telephone 240, the portable computer 320 storing user information. The user information includes an identification corresponding to the portable computer 320, user access parameters, and user characteristics corresponding to the telephone 240 operating parameter data. Establishing telephone 240 operating parameters includes the user selecting user setting inputs. The user setting inputs corresponding to the portable computer 320 identification, user access parameters, and user characteristics, the user selecting change the corresponding telephone 240 operating parameter data. For some of these embodiments, the portable computer 320 includes a display 1005. The user selecting of user setting inputs includes the portable computer 320 providing user interface elements corresponding to the user setting inputs on the display 1005. The user interface elements include level indicators, selection buttons, and a set button. The user raises and lowers the level indicators, selects the selection buttons; and the set button. For some of these embodiments, the user setting inputs include the network address of the telephone 240.

In some embodiments, establishing telephone 240 operating parameters includes the user selecting phone setting inputs. For some of these embodiments, the portable computer includes a display 1005. The user selecting phone setting inputs includes the portable computer 320 providing user interface elements corresponding to the phone setting inputs on the display 1005. The user interface elements including level indicators, selection buttons, and an OK button. The user raising and lowering the level indicators, selecting the selection buttons, and selecting the OK button.

In some embodiments, the portable computer includes a display 1005. The display 1005 has a features menu bar. In response to user selection of the features menu bar, a selection list having a plurality of features is provided on the display 1005.

In some embodiments, the portable computer includes a display 1005. The display has an options menu bar. In response to user selection of the options menu bar, a selection list having a plurality of options is provided on the display 1005.

In some embodiments, the network connected devices include a gateway server 270, the gateway server provides access to a public switched telephone network 290.

In some embodiments, the method includes, prior to the connecting step, the telephone 240 exchanging voice messages with at least one of the network connected devices.

In some embodiments, the telephone 240 is connected to a gatekeeper 280, a directory server 260 and a gateway server 270 by a local area network link 250. Communications between the telephone 240 and the gatekeeper 280, gateway server 270, and directory server 260 are formatted according to a soft private branch exchange telephony application layer protocol.

In some embodiments, the telephone 240 is connected by a local area network link 250 to a router 275. The router 275 is connected to at least one packet based network including an Internet source 293. Communications between the router 275 and the telephone 240 are formatted according to packet based network application protocols. For some of these embodiments, the portable computer 320 includes processing resources for Internet access and the telephone 240 includes processing resources for Internet access.

Figure 3C:
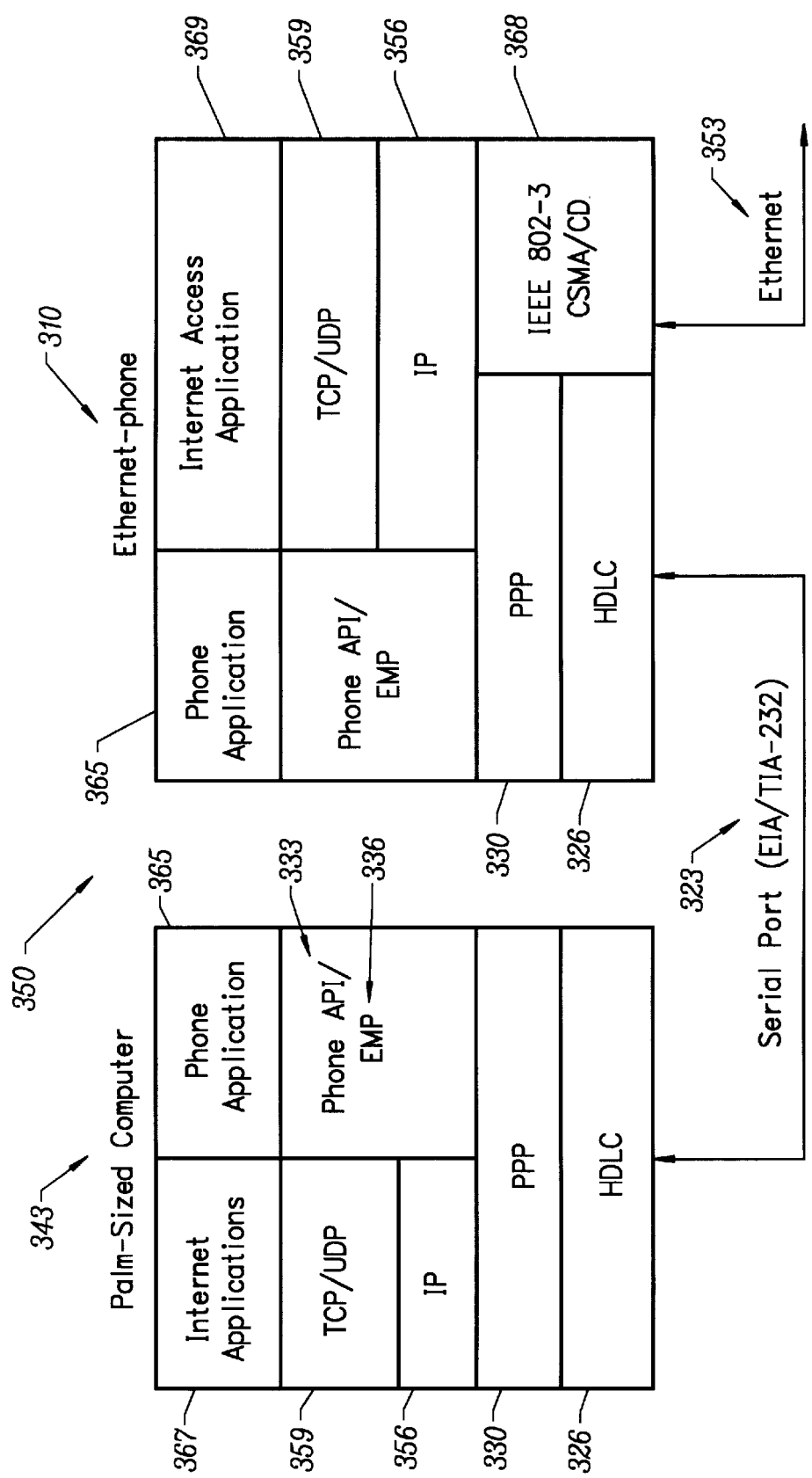
FIG. 3C is a protocol stack for the companion appliances for an embodiment where the palm-sized computer runs the Internet applications protocol stack.

For some of the packet based network connected embodiments as shown in FIG. 3C, the portable computer 320 includes processing resources for Internet access including Internet applications 367, transmission control 359 software, and Internet protocol 356 software. The telephone 240 includes an Internet access application 369, transmission control 359 software, carrier sense multiple access/collision detection 368 software, and Internet protocol 356 software.

For some of the packet based network connected embodiments as shown in FIG. 3D, the portable computer 320 includes processing resources for Internet access including Internet display applications 375 and display/user input transfer software 373. The telephone 240 includes processing resources for Internet access including Internet applications 367, display/user input transfer software 373, transmission control 359 software, Internet protocol 356 software, and carrier sense multiple access/collision detection 368 software.

In some embodiments, the telephone 240 is connected to a gatekeeper 280, a directory server 260 and a gateway server 270 by a local area network link 250. Communications between the telephone 240 and the gatekeeper 280 are formatted according to registration admission and status signaling function control. Communications between the telephone 240 and the gateway server 270 and the directory server 260 are formatted according to an H.323 compliant protocol.

In some embodiments, the method includes the user starting a telephony program. The portable computer 320 controls execution of the telephony program.

Method for Exchanging Voice and Data Messages Between a Companion Telephone and Devices Connected to the Network The third aspect of the invention provides a method for exchanging voice and data messages between a telephone 240 and devices connected to a network. The telephone 240 is connected to the network. The method comprises connecting the telephone 240 with a portable computer 320. The portable computer 320 exchanges telephone 240 operating parameter data with the telephone. The operating parameter data provides options for communications between the telephone 240 and the network connected devices. Responsive to a user indication of a desired communication, the portable computer 320 exchanges call data with the telephone 240. The call data corresponds to the desired communication. The call data is formatted according to an application layer protocol, and the underlying transport, network, and data link layer protocols. The application layer protocol has frame formats for telephony functions. The telephone 240 exchanges messages with an addressed network connected device. The messages corresponding to the desired communication. The addressed network connected device has a network address. The message includes data corresponding to the address of the addressed network connected device.

In some embodiments, the method includes, prior to connecting the portable computer 320 with the telephone 240, the portable computer storing user information. The operating parameter data comprises the user information. The user information comprises an identification corresponding to the portable computer 320 and user access parameters.

In some embodiments, the method includes the telephone 240 requesting a connection to a first network connected device. The first network connected device responds to the connection request. In response to a user input, the message data comprise a phone number corresponding to the first network connected device transmitted from the portable computer 320 to the telephone 240. Upon receipt by the telephone 240 of the first network connected device response to the connection request, the message data comprise a first connection made response transmitted from the telephone 240 to the portable computer 320. For some of these embodiments, the portable computer 320 further comprises a display 1005. The method further comprises, upon receipt of the first connection made response, the portable computer 320 providing on the display 1005 a representation of a date/time connected, and a connected time corresponding to the first network connected device response.

In some embodiments, the telephone 240 comprises an Ethernet telephone 310.

In some embodiments, the telephone 240 is connected to a gatekeeper 280, a directory server 260 and a gateway server 270 by a local area network link 250. Communications between the telephone 240 and the gatekeeper 280, the gateway server 270, and the directory server 260 are formatted according to a soft private branch exchange telephony application layer protocol.

In some embodiments, the telephone 240 connected by a local area network link 250 to a router 275. The router 275 is connected to at least one packet based network including an Internet source 293. Communications between the router 275 and the telephone 240 are formatted according to packet based network application protocols.

In some embodiments, the telephone 240 is connected to a gatekeeper 280, a directory server 260 and a gateway server 270 by a local area network link 250. Communications between the telephone 240 and the gatekeeper 280 are formatted according to a registration admission and status signaling function control. Communications between the telephone 240 and the gateway server 270 and the directory server 260 are formatted according to an H.323 compliant protocol.

In some embodiments, the exchange of messages includes simultaneous exchanges of voice and packet data messages.

In some embodiments, the telephone 240 has an identification, and an identification corresponding to the portable computer 320 is presented to the network connected devices by the telephone in place of the telephone identification.

Protocol Design

A communications protocol hierarchy with API/PPP/HDLC layers for telephony applications 300 for companion information and network appliances is provided below in FIG. 3A. The communications protocol communications protocol hierarchy with API/PPP/HDLC layers for telephony applications 300 can be implemented for any information appliance 210 combined with any telephone 240. The telephone 240 can be an Ethernet telephone 310 as shown in FIG. 3A. The information appliance 210 is typically a portable computer 320 as shown in FIG. 3A. The portable computer 320 can be a laptop, note book, or palm-size computer. Exemplary palm-sized computers 343 for which this invention is particularly well-suited include the PalmPilot Professional, and the Palm III, available from Palm Computing, Mountain View, California.

The communications protocol communications protocol hierarchy with API/PPP/HDLC layers for telephony applications 300 is specially adapted for implementation with a palm-sized computer 343 and an Ethernet telephone 310.

The communications protocol communications protocol hierarchy with API/PPP/HDLC layers for telephony applications 300 enables the telephone 240 and the information appliance 210 to carry out several telephony features, including call forwarding and conferencing. In order to establish the capabilities of the combined companion appliances, the information appliance 210 is connected to the telephone 240 according to a physical layer protocol.

The information appliance 210 exchanges operating parameter data with telephone 240. For some embodiments, the operating parameter data include the portable computer 320 identification and user information. The identification and user access information establish a network address for the combined companion appliances, so that messages transmitted to the user have a network destination address that corresponds to the information appliance 210, not the telephone 240.

As the user moves among many different locations, the use of the information appliance 210 destination address allows network connected devices to contact the user as soon as the information appliance 210 is connected to the telephone 240, and the information appliance 210 exchanges the operating parameter data with the telephone 240. Use of the information appliance 210 destination address is especially useful for embodiments where the information appliance 210 comprises a portable computer 320, or a palm-sized computer 343.

The operating parameter data includes user information that describes other user characteristics. User characteristics can relate to user access, security and service level profiles, smart card functionality for purchases, and/or financial account information. The profiles can be used to determine user access to long distances services, firewall protected data, or user access to secure communication networks. Prior to connecting information appliance 210 the with the telephone 240, the information appliance 210 stores the user information.

Companion Appliance Communications Protocol Hierarchy

The communications protocol communications protocol hierarchy with API/PPP/HDLC layers for telephony applications 300 (or software architecture) for one embodiment of the invention is shown in FIG. 3A. The physical layer communications port connecting the Ethernet telephone 310 and the portable computer 320 is shown in FIG. 3A as an EIA/TIA-232 serial port 323 (formerly RS-232-C) serial port. The invention works with other ports including EIA/TIA-422 and EIA/TIA-423 serial ports, parallel ports, or wireless connections such as infrared ports, connecting the two companion appliances.

For this embodiment, the data link layer protocol comprises the high-level data link control (HDLC) protocol 326 and the Point-to-Point Protocol (PPP) 330. Typically, for the purposes of HDLC the information appliance 210 is designated as the primary station and the network connected telephone 240 is designated as the secondary device. The information appliance is shown in FIG. 3A as a portable computer 320, and the network connected telephone 240 is shown in FIG. 3A as an Ethernet telephone 310. The companion appliances can operate in a normal unbalanced mode, an asynchronous mode, or an asynchronous balanced mode.

The Point-to-Point Protocol (PPP) 330 part of the data link protocol, as described in the Internet Engineering Task Force Request for Comments 1661, provides a method for encapsulating multi-protocol datagrams, a link control protocol for establishing, configuring, and testing the data-link connection, and a family of network control protocols for establishing and configuring different network-layer protocols. PPP 330 supports simultaneous multi-protocol transport of TCP/IP, Internetwork Packet Exchange (IPX), DECnet, and Appletalk traffic on the same connection. The Point to Point protocol (PPP) 330 layer provides a method for connecting the information appliance 210 to an Internet source 293.

An Application Program Interface (API) 336 layer acts as a boundary across which application software available to the companion appliances uses facilities of programming languages to invoke services provided by the network connected servers. The API 336 layer specification provides a mapping of functions that are made available by the network connected service providers into the syntax and semantics of the programming languages used by the application platform. The API 336 layer thereby provides methods enabling the telephone 240 to connect the information appliance 210 to the Internet, or an Internet Source 293 and the other LAN link 250 connected devices, services, and networks.

In one embodiment, the communications protocol hierarchy is as shown in FIG. 3B. In this embodiment's communications protocol hierarchy with EMP/DLLP 328 for telephony applications 340, data link layer protocol (DLLP) 328 communications are formatted as shown in FIG. 4. The DLLP 328 transforms data provided via the communication port into data formatted for processing by the applications layer protocol also referred to herein as the Ethernet Telephone Management Protocol (EMP) 333. The EMP is discussed in detail below.

Internet Access

The combination of the information appliance 210 and the telephone 240 can also be used to provide Internet access. The communications protocol hierarchy for Internet access, otherwise referred to as the software architecture, used to support Internet access depends on the capabilities that exist in the information appliance 210. In one embodiment, the information appliance 210 is a palm-sized computer 343 that includes a Transmission control protocol (TCP)/Internet Protocol (IP)/PPP stack (as is the case for the 3Com Palm III and the PalmPilot Professional). This embodiment is referred to herein as the palm-sized computer 343 Internet access execution option. For the first case, as shown in FIG. 3C, the protocol stack can be represented as a palm-sized computer 343 running the Internet applications protocol stack 350. The protocol stack can be located in any information appliance 210 to provide Internet access according to the invention.

The palm-sized computer 343 running the Internet applications protocol stack 350 includes the following software layers, in descending order, for Internet access for the palm-sized computer 343: an Internet applications 367 layer, a TCP 359/User Datagram Protocol (UDP) layer, an Internet protocol 356 layer, a PPP 330 layer, and an HDLC 326 layer. The Internet applications 367 include electronic mail, web browsing, terminal emulation (telnet), file transfer protocol (ftp) and other applications providing access to data provided by the Internet. The palm-sized computer 343 running the Internet applications protocol stack 350 for the Ethernet telephone 310 is the same as the protocol stack for the palm-sized computer except that: (1) the PPP 330 and HDLC layers are replaced by an IEEE 802-3 Carrier Sense Multiple Access/Collision Detection (CSMA/CD) 368 layer, and (2) the top layer of the Ethernet telephone 310 stack includes only Internet access applications 369.

As before the Ethernet telephone 310 is shown as connected to the palm-sized computer 343 by an EIA/TIA-232 serial port 323. The Ethernet telephone 310 is shown as connected to the network connected devices by an Ethernet link 353. More generally a telephone 240 connected to a switched circuit network (SCN) by any appropriate LAN link will work according to the invention.

The palm-sized computer 343 running the Internet applications 367 protocol stack 350 shown in FIG. 3C also includes the following software layers for access to telephony applications: a phone applications layer 365, a phone API 336/EMP layer, a PPP 330 layer, and an HDLC layer 326. Note that the phone API 336/EMP layer is shown to cover both the communications protocol hierarchy with API/PPP/HDLC for telephony applications 300, and the communications protocol hierarchy with EMP/DLLP 328 for telephony applications 340.

However, the communications protocol hierarchy with EMP/DLLP 328 for telephony applications 340 actually has DLLP 328 replacing the PPP 330 layer and the HDLC layer 326. For Internet access using the DLLP 328, an additional field is added to the DLLP frame format shown in FIG. 4 below, to indicate whether the next upper layer protocol is IP 356, or EMP 333.

Given a palm-sized computer 343 with multitasking capability, the Internet access (or other data communications) and telephony communications (including voice communications) can occur simultaneously using the software provided in the palm-sized computer 343 running the Internet applications 367 protocol stack 350.

Another option for providing Internet access to the user is to have the Ethernet telephone 310 run the Internet applications 367 while the palm-sized computer act as a user interface. This option is referred to herein as the Ethernet telephone 310 Internet access execution option. The Ethernet telephone 310 Internet access execution option arrangement can be advantageous for palm-sized computers having very limited storage capacity to accommodate the TCP 359/IP 356 stack and the Internet applications 367. In one embodiment, the Ethernet telephone 310 Internet access execution option is achieved by providing another protocol next to EMP 333. This protocol is shown in the Ethernet telephone 310 running the Internet applications 367 protocol stack 370 as the display/user input transfer protocol 373. The display/user input transfer protocol 373 sends display information to the palm-sized computer 343 from the telephone 240 and sends user inputs (such as entered text, selected links, selected buttons, etc.) to the Internet application 368 running on the telephone 240. Note also that an Internet display application 375 is the top level software operating on the palm-sized computer 343 for the Ethernet telephone 310 Internet access execution option.

Operations

The EMP 333 and DLLP 328 hierarchy supports a number of operations and features related thereto including those listed below.

1) Placing a phone call: telephone 240 number auto-dialing from the address book;
2) Receiving an incoming call: caller identification (ID) and caller name, interrupt other applications with "HotSync" key, answer, reject, cancel (ignore), save (record to "Address" application);
3) A user interface for PBX-like features such as:
   a) Forwarding a call: when forwarding is set, all calls are automatically diverted to the forwarded phone (both to one or more phone numbers and from another phone, i.e., go to roaming mode), Features: activate/de-activate, forwarded information
   b) Conference calls: Features include conference, add parties, hang up, split conference, hold conference, switch;
   c) Transferring a call (i.e., during a call, after the parties have conversed for a period of time);
4) Keeping a history of past numbers communicated with (both incoming and outgoing calls), which can also be used for redialing;
5) Voice mail user interface;
6) Capability exchange with the network appliance, e.g., the telephone 240 and the subsequent adjustment of the user interface features during initialization, information including the number of lines and conferences supported; speaker, ringer and handset volume; transfer and forward feature support; Ethernet telephone 310 and Palm-sized computer 343 Ids; call restrictions for the user; and line status are exchanged;
7) Changes to the user interface and the telephone 240 operating parameters can also be made by user adjustment of user settings through the information appliance user interface after initialization for earphone/ringer volume levels, etc.;
8) Internet access;

9) Simultaneous transmission of Internet, e-mail, and other non-telephony data with the telephony voice data using the companion appliances; and
10) Incorporating video data in received and transmitted messages.

Feature Sets

A large number of feature sets can be implemented for a variety of voice and data communications using the companion information appliance 210 and the telephone 240. Five of these feature sets are described briefly below for the following telephony operations: placing a phone call, receiving an incoming call, forwarding a call, conference calls, and transferring a call. User interface displays corresponding to the feature sets are described in the "User Interface Description" section of this application.

A first feature set enables the information appliance 210 user to direct the telephone 240 to place a phone call. For one embodiment, as the call is placed, information is transferred from the telephone 240 to the information appliance 210 so images are shown on the information appliance display to inform the user of call status information. The call status information includes dialing, idle, no dial tone, ringing, connected, busy, on hold, disconnected, hang-up, and re-dialing. The user can respond to the status information display and provide input through the information appliance 210 to cause the telephone 240 to re-dial, switch a connected line to on hold, switch calls (e.g., hold to active for line 1 and active to hold for line 2), place a phone call using an address book application data entry, or transmit a memo to the recipient of the phone call over a data network link.

The memo and the phone call can be transmitted simultaneously by the companion information appliance 210 and the telephone 240, thus providing an example of the appliances capability to transmit both voice and data communications. User input to the information appliance 210 communicated to the telephone 240 can cause the telephone to provide connection time and date data, and/or connected time data for display on the information appliance display.

A second feature set enables the information appliance 210 user to respond to incoming calls received by the telephone 240. After the telephone 240 detects an incoming call, the telephone transmits a message to the information appliance 210 indicating that a incoming call has been received. The information appliance 210 then provides the message information to the user on the display. The information provided can include the Caller ID and the Caller Name.

When establishing the telephone 240 operating parameters, the user can establish that any incoming call will result in an interrupt of other applications, or that an incoming call from a particular network connected device will interrupt the other applications. For one embodiment, where the PalmPilot, PalmProfessional or Palm III is the information appliance 210, the incoming call interrupt can be provided through a "HotSync" key.

The user can respond to the incoming call information provided on the information appliance display by entering a response through the information appliance user interface. Such responses include answering the incoming call, rejecting the incoming call, canceling (or ignoring) the incoming call, and saving the incoming call (i.e., recording the alias address information corresponding to the incoming caller to the information appliance address database).

A third feature set enables the information appliance 210 user to put call forwarding (or call diversion) in effect for selected lines on the telephone 240. The call forwarding automatically diverts all calls to the forwarded phone. The forwarding can be to more than one forwarded number, and can continue forwarding from another phone, i.e., go to a roaming mode. Other call diversion services include call forwarding busy, call forwarding unconditional, call forwarding no reply, and call deflection. In one embodiment these services are provided as defined by the ITU H.450 series standards.

A fourth feature set enables the information appliance 210 user to control the execution of conference calls through the telephone 240. The user can add parties to the conference, hang-up on the conference, place connected conference lines on hold, switch from one conference to another, and provide white board type information to conference participants.

A fifth feature set enables the information appliance 210 user to control the transfer of a connected call.

Video Capability

Communications including video data can be exchanged with network connected devices and displayed using the combined information appliance 210 and the telephone 240. If the telephone 240 has video display and capture capabilities, the information appliance 210 can be used as an interface to control the video aspects of the communication.

In one embodiment, the EMP 333 protocol is extended to support video capability exchanges and commands to control the video, such as turning the video on and off, panning, zooming, etc. For this embodiment, the information appliance 210 can be a palm-sized computer 343. The user interface on the palm-sized computer 343 also provides support for such capabilities.

In another embodiment, the palm-sized computer 343 has sufficient computing and display capabilities; as well as sufficient communications capacity on the link (e.g., the EIA/TIA 232 serial port 323 link) between the palm-sized computer 343 and the telephone 240; to decode and display the video on the palm-sized computer's 343 own screen, or a screen corresponding to a peripheral device connected to the palm-sized computer 343. In this embodiment the palm-sized computer's 343 screen provides video display and user interface functionality.

The video camera for sending video information to network connected devices can reside either on the palm-sized computer 343 or the telephone 240. For embodiments where the video camera resides on the palm-sized computer 343, sufficient computing resources are provided in the palm-sized computer 343 to capture and encode the video (e.g., for transmission as an MPEG formatted data stream), and sufficient communications capacity between the palm-sized computer 343 and the telephone 240 to transfer the captured video information.

Data Link Layer Protocol Frame Format

The DLLP 328 frame 400 format is illustrated in FIG. 4. The frame is the unit of transmission at the data link layer. The frame includes a header and/or a trailer, along with some number of units of data. Each box in the frame format represents four binary digits (bits), or a nibble. Basically, DLLP 328 serves the combined roles of the HDLC 326 and PPP 330 layers in the communications protocol communications protocol hierarchy with API/PPP/HDLC layers for telephony applications 300 with respect to the API 336 data. DLLP 328 encapsulates an applications layer EMP frame and provides error detection as described below.

The basic unit of encapsulation that is passed across the interface between the network layer and the data link layer is referred to as a packet. Each packet is typically mapped to a frame. The exceptions to this mapping are when data link layer fragmentation is being performed, or when multiple packets are incorporated in a single frame.

Frame delimiters are flag sequences that indicate the beginning or the end of a frame. The frame delimiters 410 used in the DLLP frame 400 format are hexadecimal 0x7E, or binary 01111110, like those used for Point to Point Protocol (PPP) packets.

A message, or EMP frame 420 having variable length is placed in the DLLP frame 400 after the left, or first, frame delimiter 410. The EMP frame 420 can be according to any of the byte descriptions provided in Tables 1 through 5 below, or any other byte description that corresponds to information exchanged between the companion appliances.

Each transmitted DLLP frame 400 includes a numerical value calculated using a formula applied to the EMP frame 420. The calculated value formatted for the DLLP frame 400, as shown in FIG. 4, is referred to as a frame check sequence (FCS), 430. The FCS 430 is used as checksum for error-detection. The FCS 430 is similar to that used for PPP frames. After calculating the FCS 430 value, the bits are reversed (XOR-ed) and the least significant byte is sent out first. The receiving station then applies the same calculation to the EMP frame 420 and checks to make sure the accompanying numerical value of the FCS 430 is the same. If not, the receiver can assume that the message has been garbled, and proceed to ensure that the transmitting device resends the garbled frame.

For embodiments that use octet stuffing, a control escape octet is defined as hexadecimal 0x7D, or binary 01111101. Also similar to PPP frames, each 0x7D or 0x7E byte in the EMP frame 420 or FCS 430, is replaced by a two byte sequence <0x7D><original byte XOR 0x7E>.

Ethernet Telephone Management Protocol Frame Descriptions

In this section, descriptions of EMP frame 420 formats are provided for the data types listed in each of the following tables. Tables 1–5 provide status titles for operations, information types for capabilities, byte descriptors, and comments for some of the different data types contemplated for the Ethernet Management Protocol.

Duration fields, conference numbers, line numbers, sequence numbers, and other number fields (shown as encapsulated by' 'in the frames shown in FIGS. 4, and 5A through 5K) are formatted as integers. Telephone numbers, passwords, and the command/status are formatted as ASCII codes (shown with no encapsulation). For one embodiment, conference numbers are integers starting from 64, while line numbers start from 1.

Table 1 lists information types corresponding to the exchange of get/set capability information from a palm-sized computer 343 to the Ethernet telephone 310. Table 2 lists information types corresponding to the exchange of send capability information from the Ethernet telephone 310 to a palm-sized computer 343. Table 3 lists status types for data sent from a palm-sized computer 343 to the Ethernet telephone 310. Table 4 lists status types for data sent from the Ethernet telephone 310 to a palm-sized computer 343. Table 5 lists information types corresponding to error codes along with the action taken by one embodiment of the invention.

Different types of information describing some of the get/set capabilities and preferred settings for a palm-sized computer 343 that are exchanged with a connected Ethernet telephone 310 are shown in Table 1. The EMP frame 420 formats for some of the information types are described in the following paragraphs. Other information types corresponding to get/set capabilities not included in Table 1, will have similar formats to those discussed below, and will have differences according the nature of the information required to be exchanged.

Figure 5A:
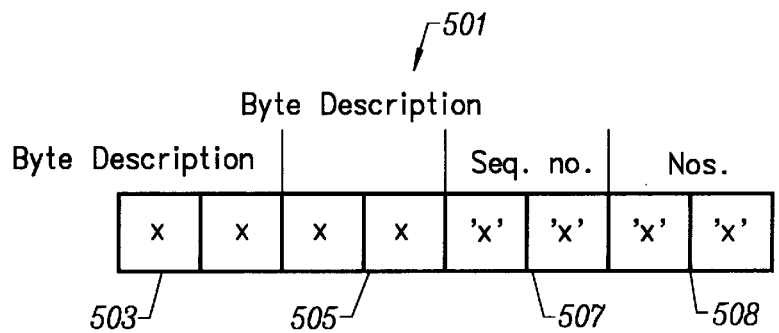

The format of the EMP frame 420 for get/set capability types indicated by a superscript "1", in Table 1 is shown in FIG. 5A, as reference number 501. There are two byte descriptions in each of the EMP frames formatted according to FIG. 5A for the get/set capabilities. The first byte description 503 is provided in the first two EMP frame 420 nibbles and typically corresponds to the get (AC) and set (AB) status byte descriptions shown in Table 3. The second byte description 505 is provided in the third and fourth EMP frame 420 nibbles and corresponds to the byte descriptions provided in Table 1. For example, the first four nibbles for a get number of lines exchange of capabilities from the palm-sized computer are ACC0.

TABLE 1

Capabilities Exchanged from Palm-sized Computer to Ethernet telephone Get/Set (Capabilities)

| Type of Information | Byte Description | Comments | Get | Set |
|---|---|---|---|---|
| Number of lines | C0$^1$ | To get/set number of lines to support. Currently, "Get" is sent to denote initialization. | ✓ | ✓ |
| Speaker | C1$^2$ | To get/set speaker settings of Ethernet telephone. | ✓ | ✓ |
| Conference Call | C2$^1$ | To get/set number of conferences to support. | ✓ | |
| Call Transfer | C3$^1$ | To get/set transfer capability. ('0' for disable, '1' for enable.) | ✓ | ✓ |
| Call Forward | C4$^1$ | To get/set forwarding capability. ('0' for disable, '1' for enable.) | ✓ | ✓ |
| Call Restriction | C5$^1$ | To get/set user's restriction. (Integer '0' for local, '1' for unrestricted access. Internal calls are possible without the password.) | ✓ | ✓ |
| Phone Number | C6$^3$ | For "Get": Gets the Ethernet telephone's 'ID' (phone no). When this packet is sent, phone assumes its own 'ID'. For "Set": Sets the Palm-sized computer's 'ID' on the phone. | ✓ | ✓ |
| Password | C7$^4$ | Sent before some of the settings are possible. Integer '00' for Ethernet telephone password, and '01' for Palm-sized computer's, placed before the ASCII formatted password. "Get": Used for sending original password. "Set": Used for setting new password. | ✓ | ✓ |
| Ringer Volume | C8$^2$ | To get/set ringer volume of Ethernet telephone. | ✓ | ✓ |
| Handset Volume | C9$^2$ | To get/set handset volume of Ethernet telephone. | ✓ | ✓ |

The sequence number (Seq. no.) 507 corresponds to the placement order of a frame in a sequence of frames used for a particular operation, such as dialing by the palm-sized computer 343. A detailed discussion of the frames exchanged in a palm-sized computer 343 dialing operation is provided in conjunction with the dialing state diagram shown in FIG. 6 below. The sequence number 507 is placed as the fifth and sixth nibbles in the get/set capability type 501 EMP frame 420 format.

The EMP frame 420 format for the number of lines (C0) and conference call (C2) capability types includes the number of lines that the user is allowed or that the Ethernet telephone 310 supports, as a one byte integer. These numbers are placed in the numbers ("Nos.") field 508 of the get/set capability type 501 EMP frame 420 format.

The format of the EMP frame 420 for capability types indicated by a superscript "2", in Table 1 is similar to the format for the capability types indicated by a superscript "1". The key difference is that the numbers [i.e., data placed in the numbers ("Nos.") portion 508] are in ASCII code format. A character of "0" means that the speaker, ringer, or handset is off, or the volume adjustment capability is not supported by the Ethernet telephone 310. A character indicating a value in the range of "1" through "9" sets the speaker, ringer, or handset volume.

The format of the EMP frame 420 for capability types indicated by a superscript "3", in Table 1 is similar to the format for the capability types indicated by a superscript "1". The key differences are that the integers representing the phone number in the "Nos." field 508 are in ASCII code format, and the phone number field can be of varying length. Note that for the purposes of the "Nos" field 508, phone numbers are restricted to numerals.

When the "Get" indication is provided for the phone number (C6) information type, the Ethernet telephone 310 will assume its own identification. When this occurs, a single Ethernet telephone 310 can act as the network appliance companion for a plurality of palm-sized computers 343. When the "Set" indication is provided, the palm-sized computer's 343 is used by the Ethernet telephone 310, enabling others to contact the palm-sized computer user using the same identification, or phone number, without concern for the user's actual location, i.e., analogous to a roaming cellular phone.

Figure 5B:
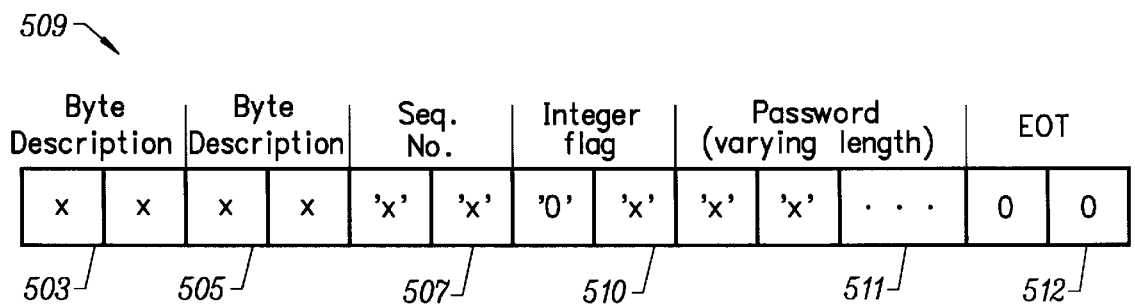

The format of the EMP frame 420 for get/set capability types indicated by a superscript "4", in Table 1 is shown in FIG. 5B, as reference number 509. The FIG. 5B EMP frame 509 format is particularly well-suited for the password capability type (C7) and includes the first byte description 503, followed by the second byte description 505, and the sequence number. After the sequence number 507, an integer flag 510 is provided to indicate which password is included in the FIG. 5B EMP frame 509. An integer flag 510 value of "00" indicates that the Ethernet telephone 310 password is included and a value of "01" indicates that the palm-sized computer 343 password is included. The password is then provided in the password field 511 as a variable length alpha-numeral. After the password field 511, the last field in the FIG. 5B EMP frame 509 is an end of transmission indication 512, shown in FIG. 5B as "00".

Different types of information describing the some of the send capabilities and preferred settings for an Ethernet telephone 310 that are exchanged with a connected palm-sized computer 343 are shown in Table 2. The EMP frame 420 formats for the information types in Table 2 are indicated by the superscripts following the byte descriptions. The formats are essentially the same as for the information types having the same superscripts in Table 1 above.

Some of the different types of data transmitted from a palm-sized computer 343 to an Ethernet telephone 310 for one embodiment of the invention are listed in Table 3. The EMP frame 420 formats for these types of data are discussed in the following paragraphs. Other data types transmitted from a palm-sized computer 343 to an Ethernet telephone 310 not included in Table 3, will have similar formats to those discussed below, and will have differences therefrom according the nature of the transmitted data. Many of the formats that are used for transmitting data from the palm-sized computer 343 to the Ethernet telephone 310, are also used for transmitting similar data from the Ethernet telephone 310 to the palm-sized computer 343. These data types are referred to herein as palm/phone transmitted EMP data types.

Figure 5C:
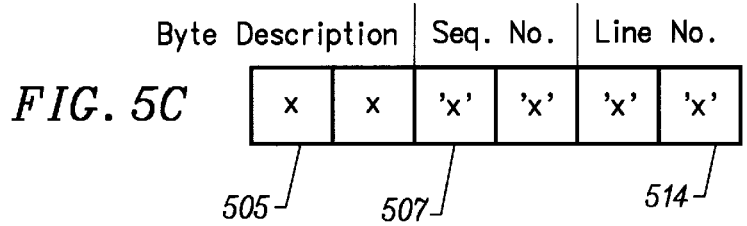

The format of the EMP frame 420 for first types of data transmitted from a palm-sized computer 343 to an Ethernet telephone 310 indicated by a superscript$^1$, in Table 3 is shown in FIG. 5C, as reference number 513. The first palm/phone transmitted EMP data type 513 format includes a second byte description 505, followed by a sequence number 507, and a line number 514. Status types having the first palm/phone transmitted EMP data type 513 format include new line/query (A0), hang-up (A2), switch calls (A3), answer (A4), and put on hold (A5).

Figure 5D:
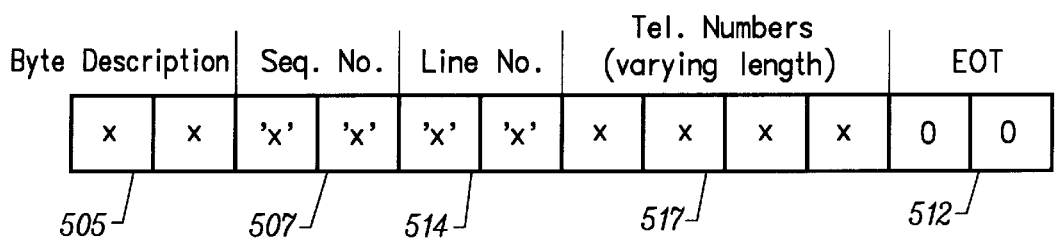

The second palm/phone transmitted EMP data type 515 format, shown in FIG. 5D, is indicated by a superscript$^2$, in Table 3 and includes a second byte description 505, followed by a sequence number 507, a line number 514, a telephone number 517 having variable length, and an end of transmission indication 512. The telephone number 517 field supports the use of numerals and the "#", "*", and "!" characters. The second palm/phone transmitted EMP data type 515 format is used for dialing numbers (A1).

Figure 5E:
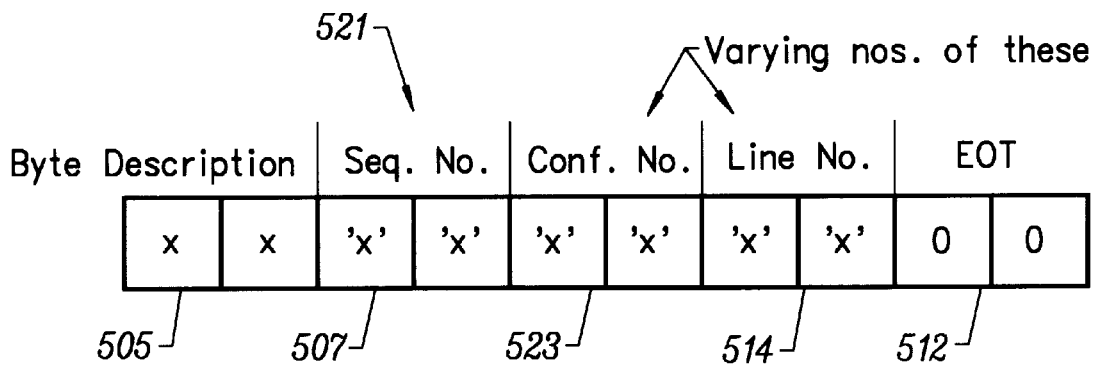

The third palm/phone transmitted EMP data type 521 format, shown in FIG. 5E, is indicated by a superscript$^3$, in Table 3 and includes a second byte description 505, followed by a sequence number 507, one or more conference numbers in a conference number 523 field, one or more line numbers 514, and an end of transmission indication 512. This format is used to split a conference (A8). The first numbers listed in the conference number 523 field are the new conference numbers if another conference is started. The numbers that follow the new conference numbers in the conference number 523 field are the line numbers affected by the split.

TABLE 2

Capabilities exchanged from Ethernet telephone to Palm-sized Computer
Send Capabilities

| Type of Information | Byte Description | Bytes Following |
|---|---|---|
| No. of lines | 30$^1$ | 1 byte integers to give number of lines supported |
| Speaker | 31$^2$ | Character "0" to indicate speaker off, "1"–"9" to indicate speaker volume. ASCII Code NAK (0x15) means no speaker on phone. |
| Conference Call | 32$^1$ | 1 byte integer to give number of conferences supported. |
| Call Transfer | 33$^1$ | To indicate if such feature is supported. (Integer '0' indicates non-support, '1' for supported.) |
| Call Forward | 34$^1$ | To indicate if such capability is supported. (Integer '0' for non-support, '1' for supported, '2' for enabled.) |

TABLE 2-continued

Capabilities exchanged from Ethernet telephone to
Palm-sized Computer
Send Capabilities

| Type of Information | Byte Description | Bytes Following |
|---|---|---|
| Call Restriction | 35[1] | User's restriction of calls (Integer '0' for local, '1' for unrestricted access. Internal calls are possible without the password.) |
| Phone No | 36[3] | For sending the Ethernet telephone's identity to Palm-sized computer. |
| Password | 37[3] | For password requests (Integer '0' indicates request, '1' indicates password error, '2' indicates password is correct.) |
| Ringer Volume | 38[1] | Character "0"–"9" to indicate ringer volume. |
| Handset Volume | 39[1] | Character "0"–"9" to indicate handset volume. |

TABLE 3

Protocol for Data Sent from Palm-sized Computer
to Ethernet telephone
Palm-sized Computer → Ethernet-Phone

| Status | Byte Description | Comments |
|---|---|---|
| New Line/Query Status | A0[1] | To call another party (phone should put the current active line, if any, on hold.) |
| Dial | A1[2] | Supports numerals, "#", "*", "!". |
| Hang-up | A2[1] | |
| Switch calls/line | A3[1] | |
| Answer | A4[1] | |
| Put on hold | A5[1] | |
| Off-Hook | A6 | |
| Conference Call | A7[3] | The numbers that follow the first (new conference number) number can be conference numbers (to combine conferences) or simply line numbers. |
| Split Conference | A8[3] | Split the stated lines from the current conference. Fields that follow include (in the indicated order) new conference numbers (if starting another conference) and line numbers affected. |
| Call Transfer | A9[4] | Two line numbers should be present in the packets transferred. The line to be transferred precedes. |
| Call Forwarding | AA[5] | Negative acknowledgement ASCII code NAK (0x15) signifies disabling the feature. |
| Set | AB[6] | See Table 1 for more information. |
| Get | AC[6] | See Table 1 for more information. |
| Conference Phone Nos. | AD | Getting phone numbers of other parties involved in the conference. |
| Data | AE | Data transfer |
| Dual Tone Multi-Frequency (DTMF) | AF[7] | |
| EOT | 00 | To signify end of message/transmission. |
| Reset | F0 | Effectively resets the phone. |
| Acknowledge | F1[8] | For error control. Packets ID from 1–255(1 byte). Time-out set at approximately 3 seconds. |
| Reject | F2[9] | For error control. See Table 5 for descriptions of the codes. |
| Escape | FF | |

Figure 5F:
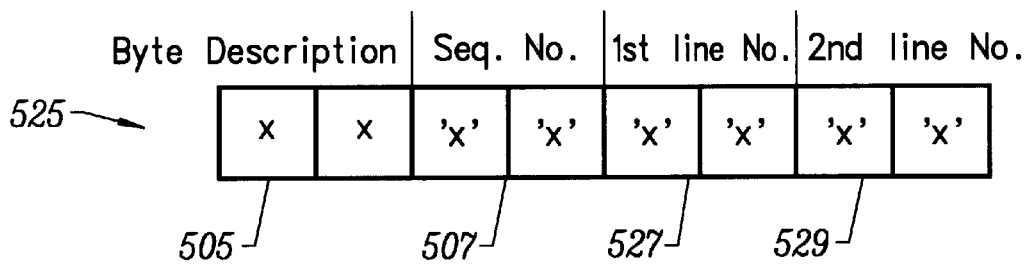

The fourth palm/phone transmitted EMP data type 525 format, shown in FIG. 5F, is indicated by a superscript[4], in Table 3 and includes a second byte description 505, followed by a sequence number 507, a first line number 527, and a second line number 529.

The fifth palm/phone transmitted EMP data type 531 format, shown in FIG. 5G, is indicated by a superscript[5], in Table 3 and includes a second byte description 505, followed by a sequence number 507, one or more telephone numbers 517, and the end of transmission (EOT) indication 00, indicated in FIG. 5G as reference number 512.

The sixth palm/phone transmitted EMP data type is indicated by a superscript[6], in Table 3 and has the format described above for FIG. 5A, i.e. reference number 501.

The seventh palm/phone transmitted EMP data type 533 format, shown in FIG. 5H, is indicated by a superscript[7], in Table 3 and includes a second byte description 505, followed by a sequence number 507, a digit pressed 535, and a duration 537. The digit pressed 535 is a one-byte value, and the duration 537 is a two byte hexadecimal number corresponding to the duration in milliseconds.

The eighth palm transmitted EMP data type 539 format, shown in FIG. 5I, is indicated by a superscript[8], in Table 3 and includes a second byte description 505, followed by a sequence number 507.

The ninth palm/phone transmitted EMP data type is indicated by a superscript[9], in Table 3 and has the format described below in conjunction with FIG. 5K and Table 5. This data type is also referred to as the EMP error code data type 547.

The format of the EMP frame 420 for first palm/phone transmitted EMP data type 513 transmitted from an Ethernet telephone 310 to a palm-sized computer 343 is indicated by a superscript[1] in Table 4, and is shown in FIG. 5C. As discussed above, the EMP frames 420 for the first palm/phone transmitted EMP data type 513 have the same format whether the frame is transmitted from the Ethernet telephone 310 or from the palm-sized computer 343. The key differences associated with source of the message are the byte descriptions and the sequence numbers. The formats for the EMP frames 420 for the second through ninth phone transmitted EMP data types, indicated by superscripts[2-9] in Table 4, are also the same as for the palm/phone transmitted EMP data types having the same superscript designations in Table 3, above.

TABLE 4

Protocol for Data Sent from Ethernet telephone to
Palm-Sized Computer
Ethernet-Phone → Palm-Sized Computer

| Status | Byte Description | Comments |
|---|---|---|
| New Line | 10[1] | |
| Incoming Call | 11[2] | |
| Idle | 12[1] | |
| No Dial Tone | 13[1] | |
| Ringing | 14[1] | |
| Connected | 15[1] | |
| Busy | 16[1] | |
| Speaker Answer | 17 | Answering using Speaker. The palm-sized computer program assumes this automatically unless the "Using Handset" frame is sent. |
| Using Handset | 18 | Answering using the handset. |
| On Hold | 19[1] | |
| Disconnected | 1A[1] | |
| Hang-up | 1B[1] | |
| Re-dial | 1C[1] | |

TABLE 4-continued

Protocol for Data Sent from Ethernet telephone to Palm-Sized Computer
Ethernet-Phone → Palm-Sized Computer

| Status | Byte Description | Comments |
|---|---|---|
| Conference Call | 1D[3] | Procedure is same as for present PBX phone, i.e. multiple conferences are set up individually. |
| Incoming Caller ID | 1E[10] | Unknown number represented by ASCII character NAK (0x15). Line number precedes telephone number in the packet. Caller Name follows the telephone number. |
| Call Transfer | 1F[4] | ASCII code NAK (0x15) indicates canceling. If only one line number is sent, it indicates that the user had pressed the transfer button on the phone - this is to enable the palm-sized computer to go to the transfer screen. |
| Call Forward | 20[5] | ASCII code NAK (0x15) indicates disabling. If no telephone number is sent, it indicates that the user had pressed the forward button on the phone - this is to enable the palm-sized computer to go to the forward screen. |
| Send | 21[6] | See Table 2 for more information |
| Phone No. | 22[5] | Sends telephone numbers of other lines in the conference to the Palm-Sized Computer. |
| Data | 23 | Data Transfer. |
| DTMF | 24[7] | |
| Switch Line | 25[1] | To change to another line. |
| EOT | 00 | End of message. |
| Acknowledge | F1[8] | For error control. Each packet has an ID in the range from 1 to 127. |
| Reject | F2[9] | For error control. See Table 5 for descriptions for the codes. |
| Reset | F0 | |
| Escape | FF | |

TABLE 5

Error codes
Error Specifications

| Type of Information | Byte Description | Current Action Implemented On Palm-Sized Computer |
|---|---|---|
| Default/Unknown | 90 | Warning Message to User |
| Server not ready | 91 | Warning Message to User |
| Capability not supported | 92 | Ignored |
| Packet/Bit Error | 93 | Re-send Packet (and those with Sequence Number after it) |
| Repeated/Duplicate Message | 94 | Check if message was already acknowledged |
| Repeated/Duplicate Acknowledgment | 95 | Ignored |
| Password not set yet | 96 | Ignored |
| Line/Conference already in use | 97 | Warning Message - Recommend Reset of Palm-Sized Computer |
| Missing Sequence No | 98 | Re-send Packet (and those with Sequence Number after it) |

The format of the EMP frame 420 for the tenth phone transmitted EMP data type is indicated by a superscript[10] in Table 4, and is shown in FIG. 5J, as reference number 541. The tenth phone transmitted EMP data type 541 includes a second byte description 505, followed by a sequence number 507, a telephone numbers 517 field, an end of transmission field 512, a caller name field 543, and a second end of transmission field 545. If the caller name is not available, the caller name field will have a zero length, but the "EOT" will still be present, i.e. two "EOT"s will be transmitted next to each other.

The format of the EMP error code data type 547 used for the error messages listed in Table 5 is shown in FIG. 5K. The error code data is typically transmitted from the Ethernet telephone 310 to the palm-sized computer 343. The EMP error code data type 547 format includes a second byte description 505, followed by an error code 549 and an error sequence number 551.

Interactions Between the Telephone and the Information Appliance

Many types of communications between the telephone 240 and the information appliance 210 are possible. Using the EMP frame 420 formats described above, state diagrams describing four types of exchanges between the telephone 240 and the information appliance 210 are provided in FIGS. 6 through 9. Each of these state diagrams is discussed in detail below.

As shown in the dialing state diagram 600, the conferencing state diagram 700, the call forwarding state diagram 800 and the call transfer state diagram 900 below, the packets, formatted according to the EMP and DLLP 328 protocols, are exchanged though a communications port that connects the telephone 240 and the information appliance 210. In FIGS. 6 through 9, the communications port is shown as a serial EIA/TIA-232 port, the information appliance 210 is shown as a palm-sized computer (or PSC) 343, and the telephone 240 is shown as an Ethernet telephone 310. In the descriptions below, the two character values in parenthesis after each message provide the corresponding byte description 503 corresponding to the message. The palm-sized computer 343 sequence numbers for the exchange begin with '01', while the Ethernet telephone 310 sequence numbers begin with '50'.

Palm-Sized Computer Dialing

FIG. 6 provides a state diagram illustrating the DLLP 328 formatted packets of data exchanged between the telephone 240 and the information appliance 210 when the information appliance 210 dials a phone number to place a call through the telephone 240 to a device connected to the LAN link 250.

The dialing session begins when the user starts the dialing program 602. The steps required to start the dialing program 602 are discussed in detail below in conjunction with FIGS. 10–13. The palm-sized computer 343 sends a new line/status query (A0) message for the first line 604 formatted according to FIG. 5C to the Ethernet telephone 310. The new line/status query (A0) message for the first line 604 requests access to line 01 on the Ethernet telephone 310 for communication with a network connected device.

The Ethernet telephone 310 checks the status of the first 01 line 606 and returns an idle (I2) message 608 to the palm-sized computer 343 indicating that line 01 is available for dialing, or other telephony operations controllable by the palm-sized computer 343. The idle (I2) frame body is formatted according to FIG. 5C.

Note that an Ethernet telephone 310 acknowledgement (F1) message 610 indicating receipt by the Ethernet telephone 310 of the previous packet from palm-sized computer is sent in the same data stream as the idle message. The simultaneous acknowledgment is well known in the art as "piggybacking" and reduces the number of message exchanges required for a particular telephony operation. The acknowledgement packet is formatted according to FIG. 5I.

As described in greater detail below in conjunction with FIGS. 13 and 14, the palm-sized computer 343 displays the idle status 612 of line 01 on the palm-sized computer 343 screen, e.g., as "not in use". The palm-sized computer 343 then sends a dial (A1) message 614 to the Ethernet telephone 310. The dial message 614 is formatted according to FIG. 5D, and provides a command to the Ethernet telephone 310 to dial the number corresponding to the desired network connected device, e.g., 1234. Note that a simultaneous palm-sized computer 343 acknowledgement (F1) message 616 indicating receipt by the palm-sized computer 343 of the previous frame from the Ethernet telephone 310 is sent in the same data stream as the dial message.

The Ethernet telephone 310 acknowledgement messages 610 and the palm-sized computer 343 acknowledgement messages 616 are typically sent in a piggyback fashion. However, there are certain exceptions that will be noted herein where the acknowledgement messages are sent by themselves.

In response to the dial message 614, the Ethernet telephone 310 dials the "1234" number 618 indicated therein, i.e., in the telephone numbers 517 field of the second palm/phone-transmitted EMP data type 515 as shown in FIG. 5D, corresponding to the network connected device. Also in the Ethernet telephone 310 dials the "1234" number 618 block, the Ethernet telephone 310 detects that the network-connected device is ringing and then sends a line 01 ringing (14) message 620 to the palm-sized computer 343. The line 01 ringing (14) message 620 is formatted according to the first palm/phone transmitted EMP data type 513 as shown in FIG. 5C. Upon receipt of the line 01 ringing (14) message by the palm-sized computer 343, an indication of the ringing status is provided 622 on the display.

When the network connected device 1234 picks up 624 its phone receiver, or otherwise indicates that the communication can begin, the Ethernet telephone 310 sends a line 01 connected (15) message 626 to the palm-sized computer 343 for network-connected device 1234. The line 01 connected (15) message 626 is formatted according to the first palm/phone transmitted EMP data type 513 as shown in FIG. 5C. Upon receipt of the line 01 connected (15) message 626 by the palm-sized computer 343, an indication of the connected status of line 01 is provided 628 on the display.

Note that two uncoupled palm-sized computer acknowledgement messages 616 are sent back to the Ethernet telephone 310. These uncoupled palm-sized computer acknowledgement messages 616 are sent because there is no intervening "dialing" protocol message from the palm-sized computer 343 upon which they can readily piggyback before the next message is sent by the Ethernet telephone 310.

The Ethernet telephone 310 receives an incoming call 630 for the user on line 02 from a network-connected device having a number 5678. The Ethernet telephone 310 responds to the incoming call by sending an incoming call (11) message 632. The incoming call (11) message 632 is formatted according to the second palm/phone-transmitted EMP data type 515 as shown in FIG. 5D. The number of the network connected device making the call, 5678, is indicated by the telephone number 517 portion of the second palm/phone-transmitted EMP data type 515.

Upon receipt of the incoming call (11) message 632 by the palm-sized computer 343, an indication of the incoming call on line 02 from the network connected device having the 5678 number is provided 634 on the display. The palm-sized computer 343 also sends an answer (A4) message 636 to the Ethernet telephone 310. The answer (A4) message 636 is formatted according to the first palm/phone transmitted EMP data type 513 as shown in FIG. 5C. The Ethernet telephone 310 responds to the answer (A4) message 636 by connecting 638 the 5678 network connected device to line 02. The Ethernet telephone 310 response to the answer (A4) message 636 is set to place line 01 on hold before switching to line 02, because for this embodiment only one Ethernet telephone 310 line can be active at a particular time.

The Ethernet telephone 310 then sends a line 02 connected (15) message 640 to the palm-sized computer 343. The line 02 connected (15) message 640 is formatted according to the first palm/phone transmitted EMP data type 513 as shown in FIG. 5C. Upon receipt of the line 02 connected (15) message 640 by the palm-sized computer 343, an indication of line 02 connected status and the line 01 on hold status are provided 642 on the display.

After completing the conversation or other communication on line 02, the user hangs-up 643 line 02. The palm-sized computer 343 then sends a line 02 hang-up (A2) message 644 to the Ethernet telephone 310. The hang-up (A2) message 644 is formatted according to the first palm/phone transmitted EMP data type 513 as shown in FIG. 5C. In response to the line 02 hang up (A2) message, the Ethernet telephone 310 disconnects 646 the network connected device having the number 5678 from line 02.

The Ethernet telephone 310, then sends a line 02 disconnected (1A) message 648 to the palm-sized computer 343. The line 02 disconnected (1A) message 648 is formatted according to the first palm/phone transmitted EMP data type 513 as shown in FIG. 5C.

The palm-sized computer 343 the switches 650 to line 01 and sends a switch calls/line (A3) message 652 to the Ethernet telephone 310. The switch calls/line (A3) message 652 is formatted according to the first palm/phone transmitted EMP data type 513 as shown in FIG. 5C. The Ethernet telephone 310 the connects 654 line 01, and sends a line 01 connected (15) message 656 to the palm-sized computer 343. The line 01 connected (15) message 656 is formatted according to the first palm/phone transmitted EMP data type 513 as shown in FIG. 5C. Upon receipt of the line 01 connected (15) message 656 by the palm-sized computer 343, an indication of line 01 connected status is provided 658 on the display.

After completing the conversation or other communication on line 01, the user hangs-up 660 line 01The palm-sized computer 343 then sends a line 01 hang-up (A2) message 662 to the Ethernet telephone 310. The hang-up (A2) message 662 is formatted according to the first palm/phone transmitted EMP data type 513 as shown in FIG. 5C. In response to the line 01 hang up (A2) message 662, the Ethernet telephone 310 disconnects 664 the network connected device having the number 1234 from line 01.

The Ethernet telephone 310, then sends a line 01 disconnected (1A) message 666 to the palm-sized computer 343. The line 02 disconnected (1A) message 648 is formatted according to the first palm/phone transmitted EMP data type 513 as shown in FIG. 5C. Then the user ends the "dialing" program 668.

Conferencing

Figure 7:
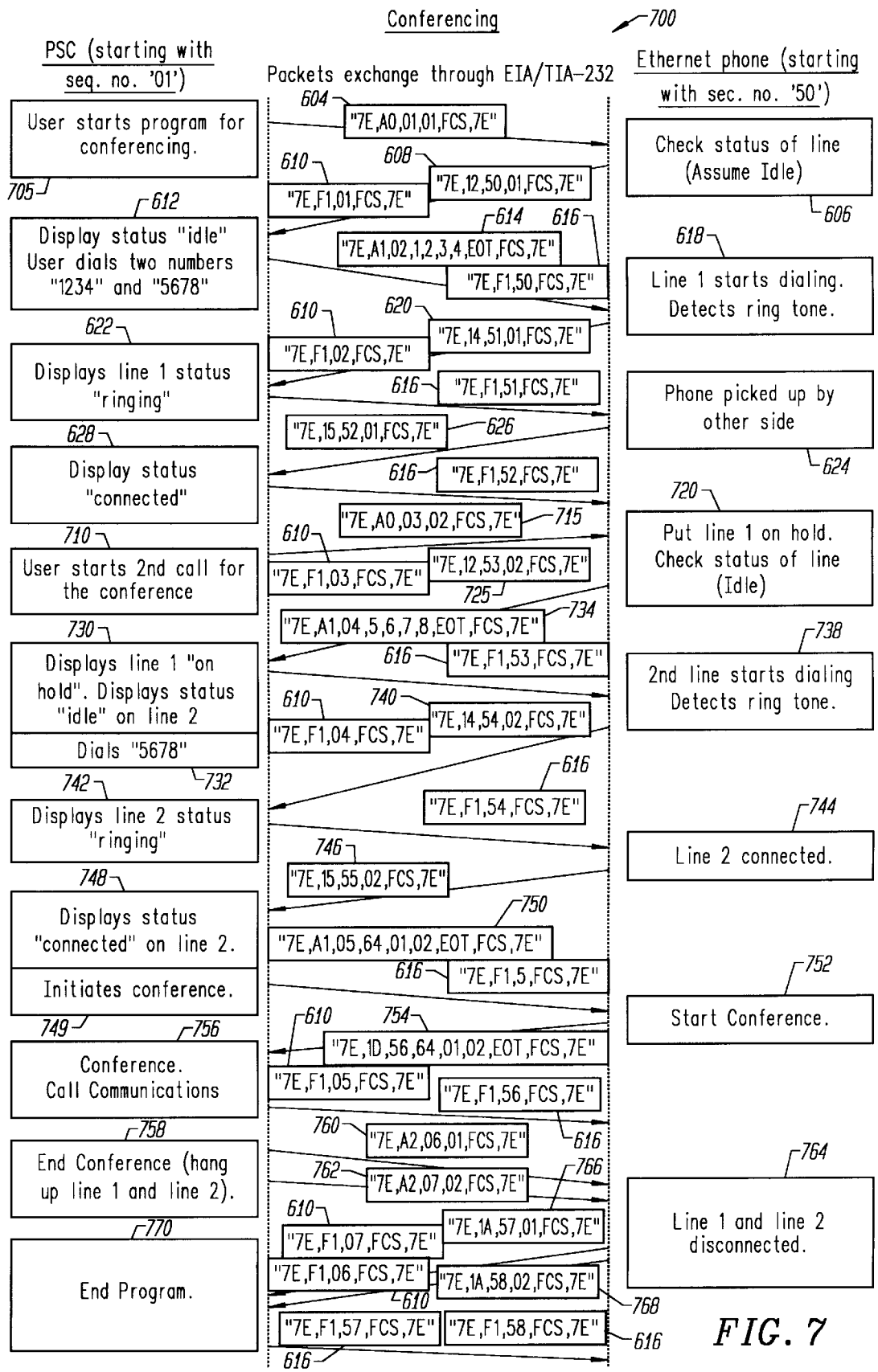
FIG. 7 provides a state diagram for conferencing according to one embodiment of the invention.

FIG. 7 provides a state diagram illustrating the DLLP 328 formatted packets of data exchanged between the Ethernet telephone 310 and the palm-sized computer 343 when the palm-sized computer 343 requests the Ethernet telephone 310 to connect two lines to a conference call. First, the two Ethernet telephone 310 lines are connected to LAN link 250 connected devices.

The conferencing session begins when the user starts the conferencing program 705. The steps required to start the conferencing program 705 are described in detail below in conjunction with FIGS. 16, 26, 34, and 35. The palm-sized computer 343 and the Ethernet telephone 310 then proceed to exchange the same messages as described above for the dialing state diagram 600 including: the new line/Status Query (A0) message for the first line 604, the idle (12) message 608, the dial (A1) message 614, the ringing (14) message 620, and the connected (15) message 626, along with the accompanying Ethernet telephone 310 acknowledgement (F1) messages 610 and the palm-sized computer 343 acknowledgement (F1) messages 616.

The user then starts a second call 710 for the conference by sending a second call new line/Status Query (A0) message 715 formatted according to FIG. 5C to the Ethernet telephone 310. The new line/status query (A0) message 710 requests access to line 02 on the Ethernet telephone 310 for communication with a network connected device.

The Ethernet telephone 310 puts the first 01 line on hold and checks the status of second 02 line 720. Upon finding that line 02 is idle, the Ethernet telephone 310 transmits a line 02 idle (12) message 725 formatted according to FIG. 5C. The palm-sized computer 343 then provides information on the screen informing the user that line 01 is on hold and that line 02 is idle 730. The user then inputs (dials) the number "5678"732 to place a call to the corresponding network connected device on line 02. The palm-sized computer 343 then sends a dial message (A1) corresponding to network connected device "5678" 734 formatted according to FIG. 5D.

The Ethernet telephone 310 dials the 5678 number on the second 02 line 738 and detects a ring tone from the 5678 device. The Ethernet telephone 310 then sends a line 02 ringing (14) message 740 formatted according to FIG. 5C to the palm-sized computer 343. The palm-sized computer 343 then displays the line 02 status as ringing 742.

When the network connected device 5678 picks up its phone receiver, or otherwise connects the second 02 line 744 for communication, the Ethernet telephone 310 sends a line 02 connected (15) message 746. formatted according to FIG. 5C. The palm-sized computer 343 then displays the connected status of second 02 line 748.

Figure 26:
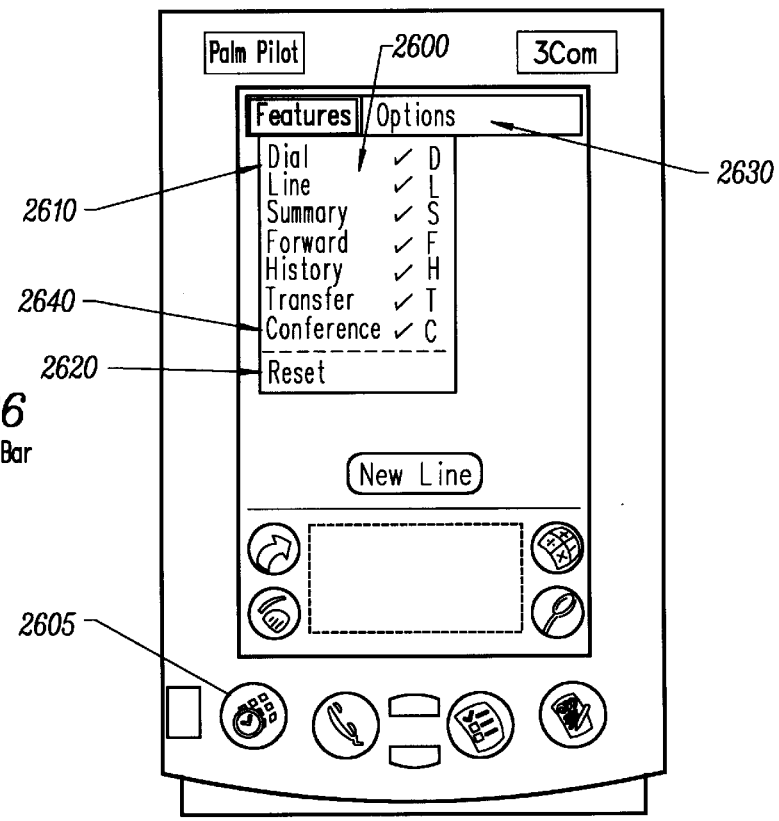
FIG. 26 shows a features menu bar for a palm-sized computer according to one embodiment of the invention.

The user then initiates the conference 749 by tapping either the conference prompt (shown in FIG. 16 as reference number 1650) or the "Conference" option (shown in FIG. 26 as reference number 2640). The palm-sized computer 343 then sends a PSC conference call (A7) message 750 formatted according to FIG. 5E to the Ethernet telephone 310. Note that the first conference number 523 as previously discussed is provided a number of "64" that as shown in both the PSC conference call message 750, and the Ethernet telephone 310 (ET) conference call message 754 discussed below.

The Ethernet telephone 310 then starts the conference 752 and sends an ET conference call (1D) message 754 formatted according to FIG. 5E to the palm-sized computer 343.

The conference call communications progress 756 under the control of the palm-sized computer 343 until the user hangs up both the first 01 line and the second 02 line 758. The palm-sized computer 343 then sends a line 01 hang-up (A2) message 760 and a line 02 hang-up (A2) message 762 to the Ethernet telephone 310. Both of the hang-up messages are formatted according to FIG. 5C.

The Ethernet telephone 310 then disconnects both the first 01 and the second 02 lines 764, and sends a first 01 line disconnected (1A) message 766 and second 02 line disconnected message 768 to the palm-sized computer 343, and the conferencing program is thereby ended 770. Note that the hang-up messages are sent to the Ethernet telephone 310 in response to the user tapping the end conference button 3420.

Call Forwarding

Figure 8:
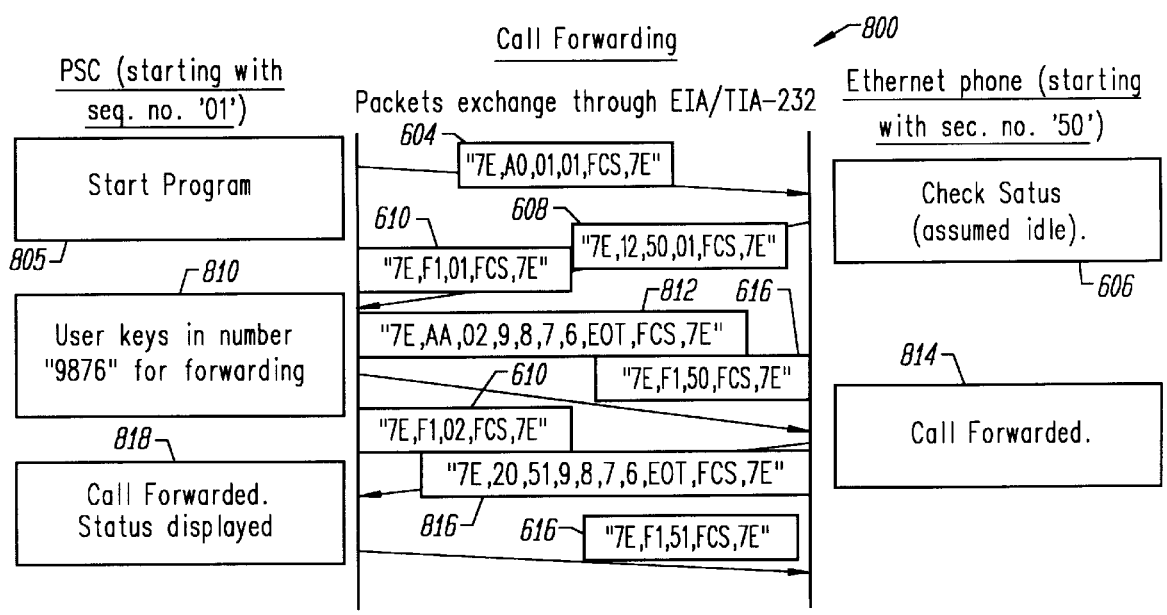
FIG. 8 provides a state diagram for call forwarding according to one embodiment of the invention.

FIG. 8 provides a state diagram illustrating the DLLP 328 formatted packets of data exchanged between the Ethernet telephone 310 and the palm-sized computer 343 when the palm-sized computer 343 requests the Ethernet telephone 310 to forward a call to another device connected to the LAN link 250.

The forwarding begins when the user starts the forwarding program 805. The steps required for the user to start the forwarding program 805 are described in detail below in conjunction with FIGS. 16, 21, 22, and 26. As was done for the previous two exchanges the program begins with the palm-sized computer 343 sending a new line/Status Query (A0) message for the first line 604 to the Ethernet telephone 310. As before for the dialing and conferencing sequences, the Ethernet telephone 310 checks the status of the first 01 line 606 and we assume, for the purposes of this discussion, that line 01 is idle. Therefore, the Ethernet telephone 310 responds by sending an idle (12) message 608 to the palm-sized computer 343.

Figure 21:
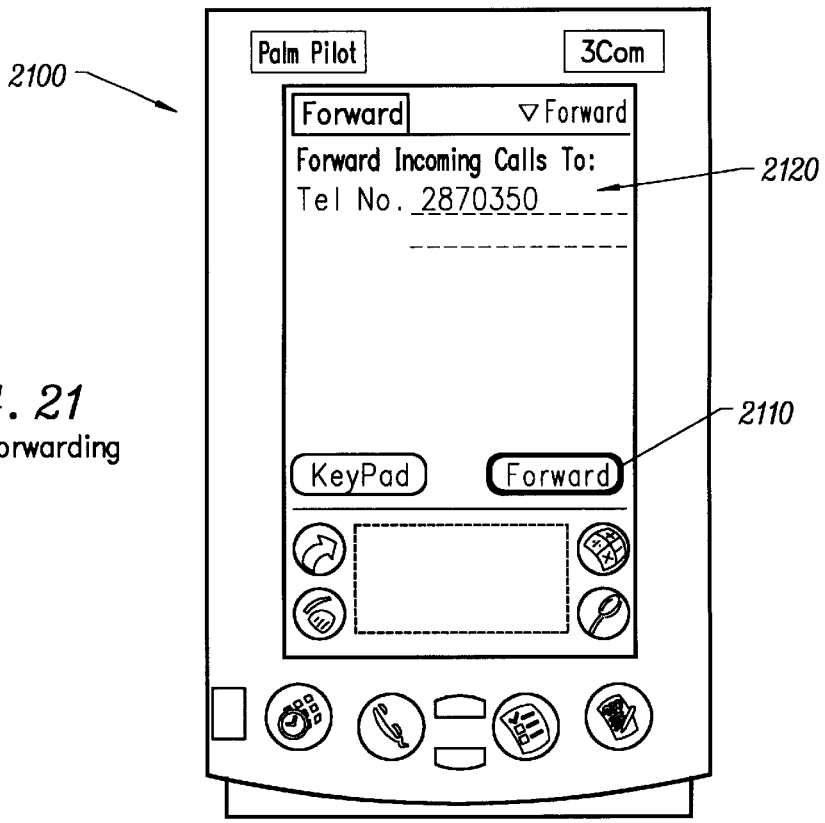
FIG. 21 shows a first forwarding screen for a palm-sized computer according to one embodiment of the invention.

The user then keys in the number "9876" for forwarding 810 in the forward incoming calls line shown in FIG. 21 as reference number 2120. The palm-sized computer 343 then sends a call forwarding (AA) message 812 formatted according to FIG. 5G to the Ethernet telephone 310.

Figure 22:
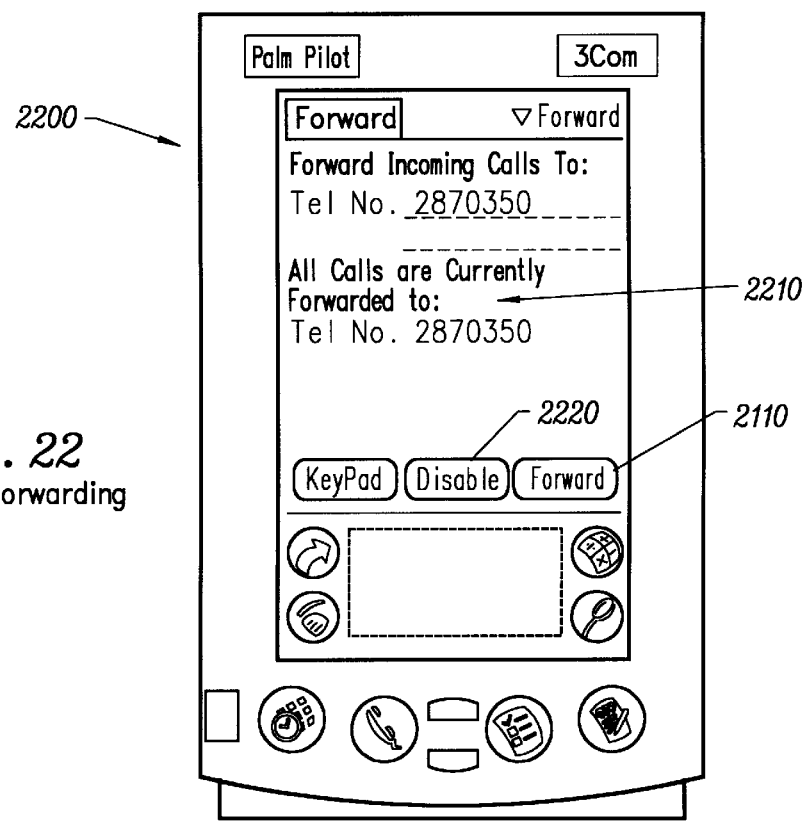
FIG. 22 shows a second forwarding screen for a palm-sized computer according to one embodiment of the invention.

The Ethernet telephone 310 then forwards all calls to the "9876" device 814 through line 01, and sends a call forward (20) message 816 formatted according to FIG. 5G to the palm-sized computer 343. The palm-sized computer 343 then displays the call forwarded status 818 as shown in FIG. 22 including the currently forwarded line 2210.

Call Transfer

Figure 9:
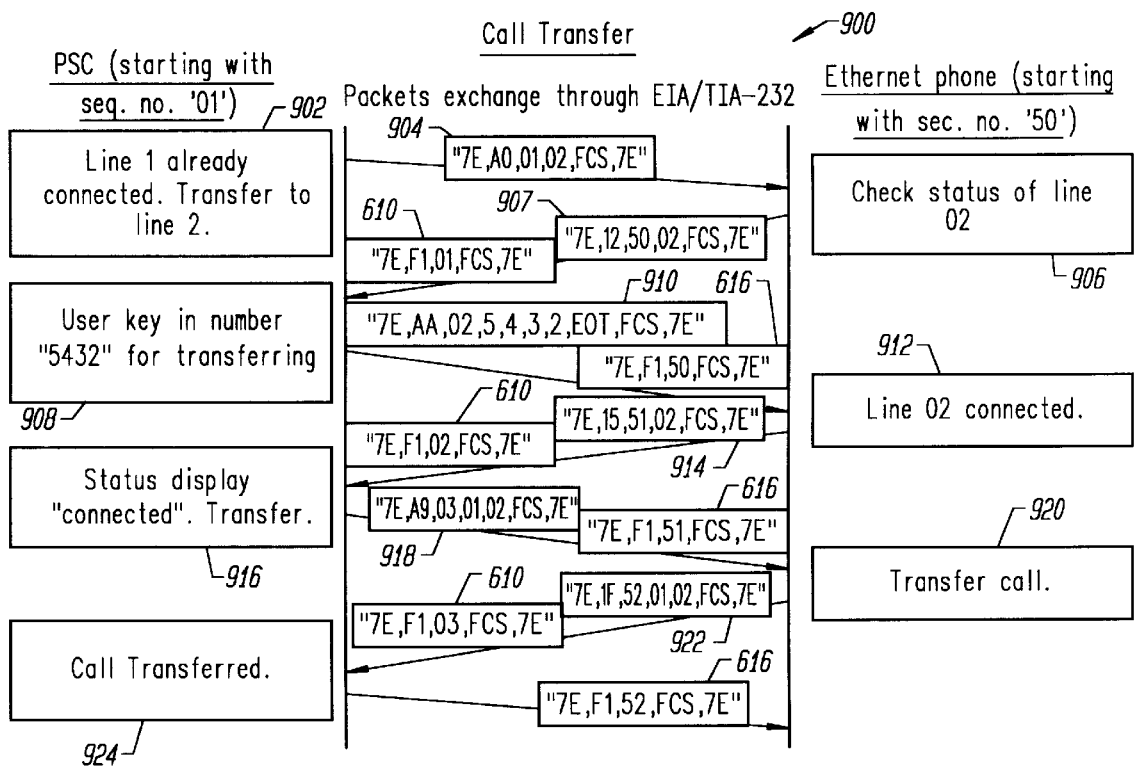
FIG. 9 provides a state diagram for call transfer according to one embodiment of the invention.

FIG. 9 provides a state diagram illustrating the DLLP 328 formatted packets of data exchanged between the telephone 240 and the information appliance 210 when the information appliance 210 requests the telephone 240 to transfer a call to another device connected to the LAN link 250.

The transfer begins when the user starts the transfer program 902 to transfer a call connected to line 01 to line 02. The steps required for the user to start the transfer program 902 are described in detail below in conjunction with FIGS. 16 through 19. As indicated in FIG. 9, line 01 is already connected when the user starts the transfer program 902.

The palm-sized computer 343 sends a new line/Status Query (A0) message for the second line 904 formatted according to FIG. 5C to the Ethernet telephone 310. The Ethernet telephone 310 checks the status of the second line 906 and finds that line 02 is idle. The Ethernet telephone 310 then sends a second line Idle (12) message 907 formatted according to FIG. 5C.

The user then keys in "5432" 908 as the number to which the call connected on line 01 will be transferred. The palm-sized computer 343 then sends a dial (A1) "5432" message 910 formatted according to FIG. 5D to the Ethernet telephone 310. The Ethernet telephone 310 then connects line 02 to the "5432" device 912 and sends a "5432" connected (15) to line 02 message 914 formatted according to FIG. 5C to the palm-sized computer 343.

The palm-sized computer 343 displays the connected status 916 and the user selects the "5432" device for transferring the call on line 01. The palm-sized computer 343, then sends a PSC call transfer (A9) message from the first 01 line to the second 02 line 918 formatted according to FIG. 5F to the Ethernet telephone 310.

The Ethernet telephone 310 then transfers the call from line 01 to the 5432 device 920, and sends an ET call transfer (1F) message 922 formatted according to FIG. 5F to the palm-sized computer 343. The palm-sized computer then displays the transferred status of the call 924.

The Portable Computer

The fourth aspect of the invention provides a portable computer 320 adapted for connection to a telephone 240. The portable computer 320 comprises a port for connecting to the telephone 240, a memory storing user information corresponding to a user, and processing resources adapted to exchange data with the telephone. The telephone 240 has capabilities. The data includes the user information and data corresponding to the telephone 240 capabilities. The exchange of the data enables the portable computer 320 to discover capabilities of the telephone 240, provide the user information to the telephone, and establish telephone operating parameters for telephone communications with devices connected to the telephone based on the user information and the telephone capabilities.

In some embodiments, the telephone 240 capabilities comprise network communication capabilities, and portable computer 320 companion capabilities.

In some embodiments, the portable computer 320 includes a display 1005 providing user interface 220 graphic elements corresponding to data exchanged with the telephone 240, and a user interface enabling the user to input data supplementing the user information provided to the telephone.

In some embodiments, the user information comprises an identification corresponding to the portable computer 320, user characteristics; and user access parameters.

In some embodiments, the portable computer 320 comprises a palm-sized computer 343.

In some embodiments, the data exchanged with the telephone 240 corresponding to portable computer 320 control of the execution of the telephony programs, the telephone capabilities, and the user information are formatted according to an applications layer protocol. The applications layer protocol having frame formats for telephony functions.

In some embodiments, the portable computer 320 is adapted to provide data processing and user interface 220 functions without connection to the telephone 240.

In some embodiments, the portable computer 320 includes processing resources for Internet access. For some of these embodiments, the processing resources for Internet access include Internet applications 367, transmission control 359 software, and Internet protocol 356 software. For some of these embodiments, the processing resources for Internet access include Internet display applications 375 and display/user input transfer 373 software.

In some embodiments, the portable computer includes processing resources for user interface 220 support of video data. For some of these embodiments, the processing resources for user interface 220 support of video data include video data decoding, and video display. For some of these embodiments, the processing resources for user interface 220 support of video data, video data decoding, video display, and video camera image data.

For some embodiments, the exchange of the data enables the portable computer 320 to control execution of telephony programs.

For some embodiments, the data exchanged with the telephone 240 includes data corresponding to portable computer control of telephony programs, and data corresponding to the status of the devices connected to the telephone.

For some embodiments, the telephone 240 has an identification, and the identification corresponding to the portable computer 320 is presented in place of the telephone identification to devices connected to and communicating with the telephone 240.

User Interface Graphical Elements and User Inputs

A user interface provided by the information appliance 210 enables users to control various telephone 240 features. These features include conferencing, transfer, and forwarding (diversion). A variety of screens provided for one embodiment of the invention including a palm-sized computer 343 and an Ethernet telephone 310 are described below. The screens provide user interface graphic elements that can be manipulated by the user through actions such as providing key strokes, tapping, clicking a mouse or comparable device, or providing voice entered data or commands. Similar screens could be provided on any other information appliance 210 display. The information could also be provided through user interface audio elements depending on the user's preferences.

As shown in FIG. 10, the palm-sized computer 343 displays user interface graphic elements on a display 1005. In the following user interface description, the displays provided at particular moments during a telephony operation are referred to as "screens".

When the user starts the telephone 240 control program on the palm-sized computer 343, the first screen that greets the user on the palm-sized computer display is the initialization in progress screen 1000 as shown in FIG. 10. During initialization, the palm-sized computer 343 queries the Ethernet telephone 310 and determines the Ethernet telephone's capabilities. The palm-sized computer 343 then establishes telephone 240 operating parameters based on the received capabilities. During initialization, information such as the number of lines and conferences supported, speaker, ringer and handset volume, transfer and forward feature support, Ethernet telephone 310 and Palm-sized computer 343 IDs, call restrictions for the user, and line status are exchanged.

Figure 11:
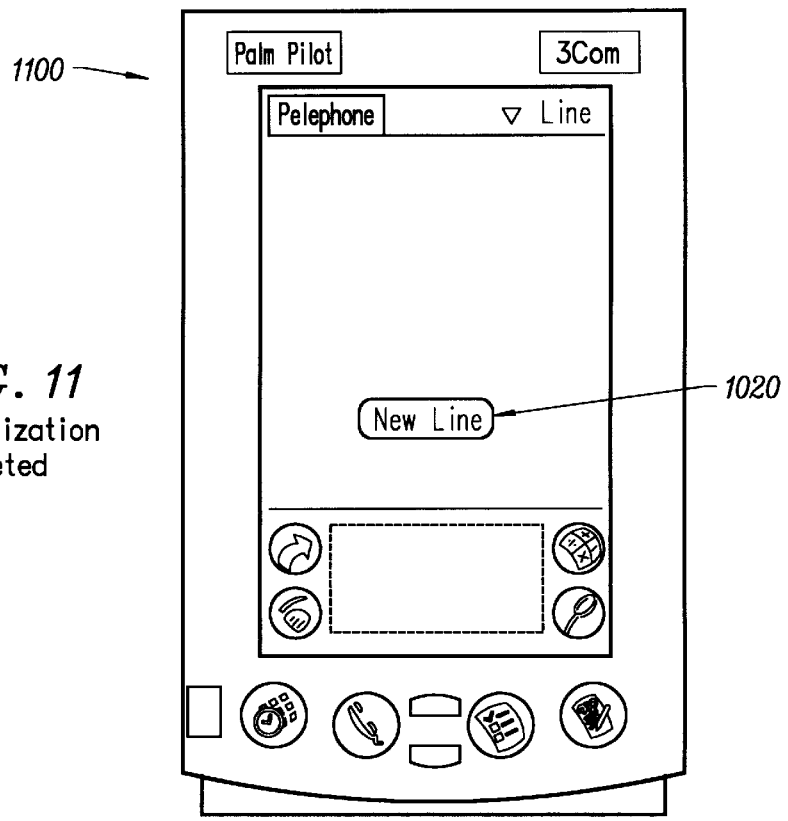
FIG. 11 shows an initialization completed screen for a palm-sized computer according to one embodiment of the invention.
Figure 12:
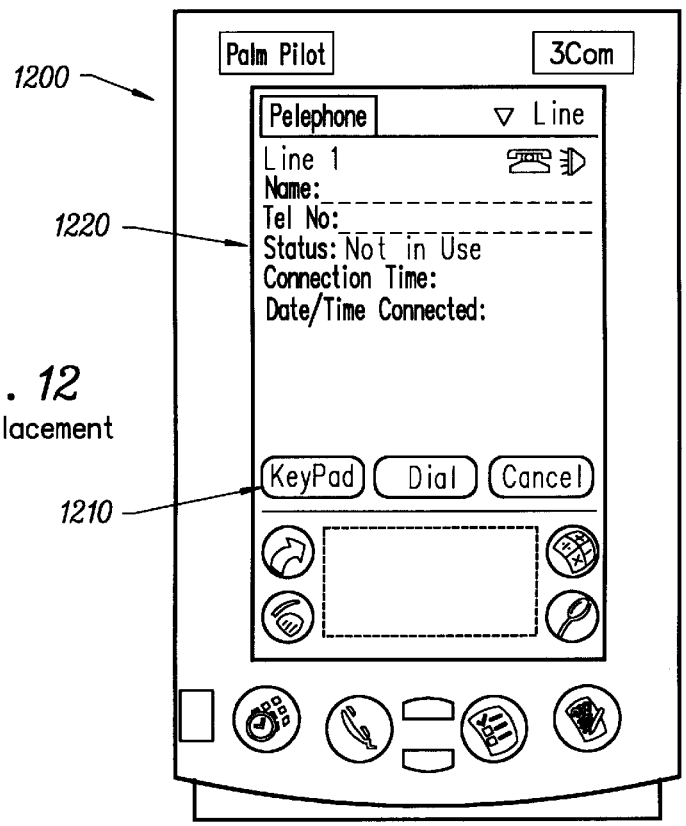
FIG. 12 shows a call placement screen for a palm-sized computer according to one embodiment of the invention.

The "Initializing" box 1010 disappears after the initialization is complete. The "New Line" button 1020 is also shown on the initialization in progress screen 1000. The initialization completed screen 1100 is shown in FIG. 11. The following description of the "New Line" button 1020 and placing a call feature includes references to messages described in the palm-sized computer 343 dialing state diagram section above.

When the user taps the "New Line" button 1020 on the initialization completed screen 1100, the palm-sized computer 343 sends a new line/status query message (such as the new line/status query message for the first 01 line 604) to the Ethernet telephone 310. If line 01 is idle, the Ethernet telephone 310 sends a line 01 idle message 608 to the palm-sized computer 343 which causes the display of the call placement screen 1200, including "not in use" at the status prompt 1220.

Figure 13:
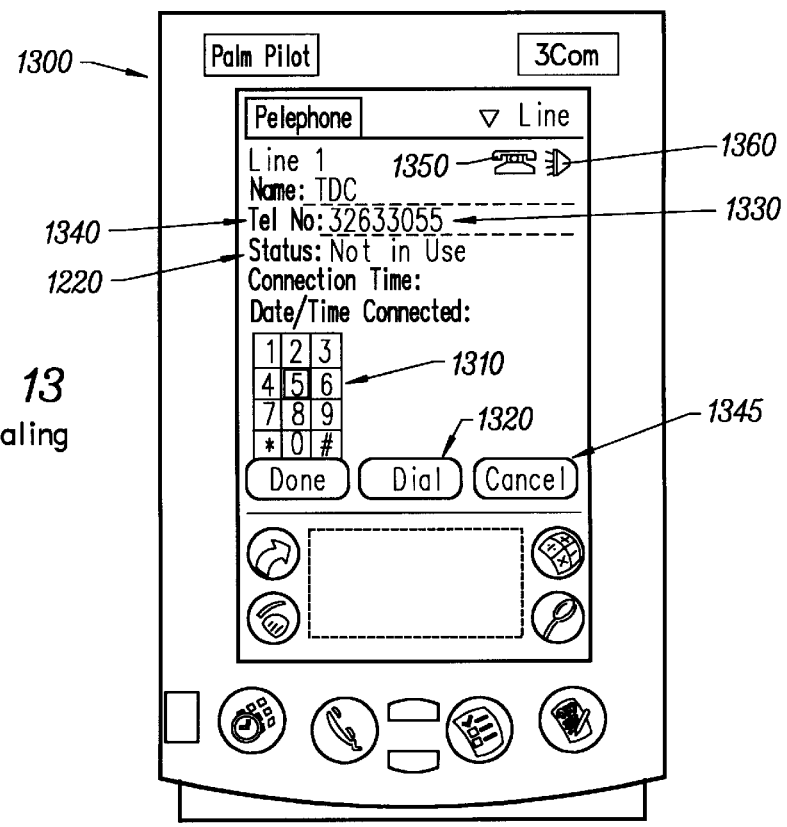
FIG. 13 shows a user dialing screen for a palm-sized computer according to one embodiment of the invention.
Figure 14:
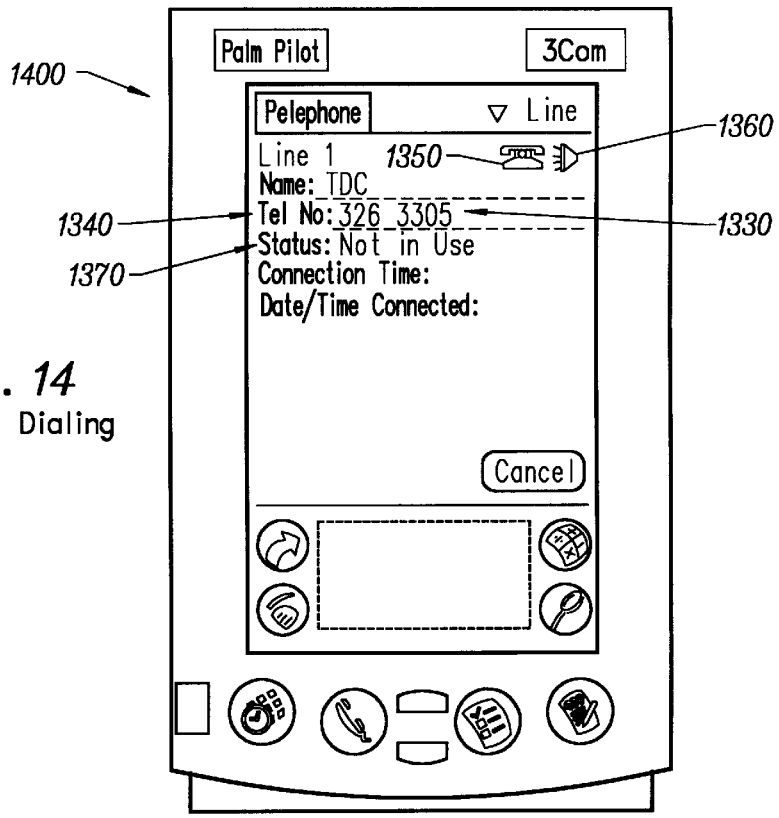
FIG. 14 shows a telephone dialing screen for a palm-sized computer according to one embodiment of the invention.

The user can either enter the phone number, or network address alias, by using a stylus in conjunction with a handwriting recognition application, such as "Graffiti" or by using the soft keypad after tapping on the "KeyPad" button 1210 so the keypad 1310 appears on the user dialing screen 1300 as shown in FIG. 13. The user can also provide the network address alias through the user address database in the palm-sized computer 343.

When the user taps the "Dial" button 1320 after entering the phone number 1330 in the "Tel. No." line 1340, the palm-sized computer 343 sends a dial message (such as the dial message corresponding to the 1234 network device 614). Note that alphabet entries in the "Tel. No." line 1340 will be converted by the palm-sized computer 343 to numbers before the dial message is sent to the Ethernet telephone 310.

If calls were made using the palm-sized computer 343 telephone application before, the "Last No." button (shown in FIG. 28 as reference number 2820) would also appear. In that case, the user can also dial the last number by tapping the "Last No." button 2820. Tapping the "Cancel" button 1345 in the user dialing screen 1300 returns the user to the call placement screen 1200.

A call status icon 1350 and a sound interface icon 1360 are disposed at the top right corner of the user dialing screen 1300. The call status icon 1350 indicates whether the call has been hung up. A "hang up" message will also be indicated at the status prompt 1220. The sound interface icon 1360 indicates whether the user is using a handset or a speaker.

In response to the dial message, the Ethernet telephone 310 dials the indicated number and sends a ringing message (such as the line 01 ringing message 620) to the palm-sized computer 343. The telephone 240 dialing screen 1400, shown in FIG. 14, appears after the "Dial" button 1320 or the "Last No." button 2820 is pressed by the user. After receiving the ringing message, the "ringing" status is provided on the display 1005, as shown in FIG. 14.

Figure 15:
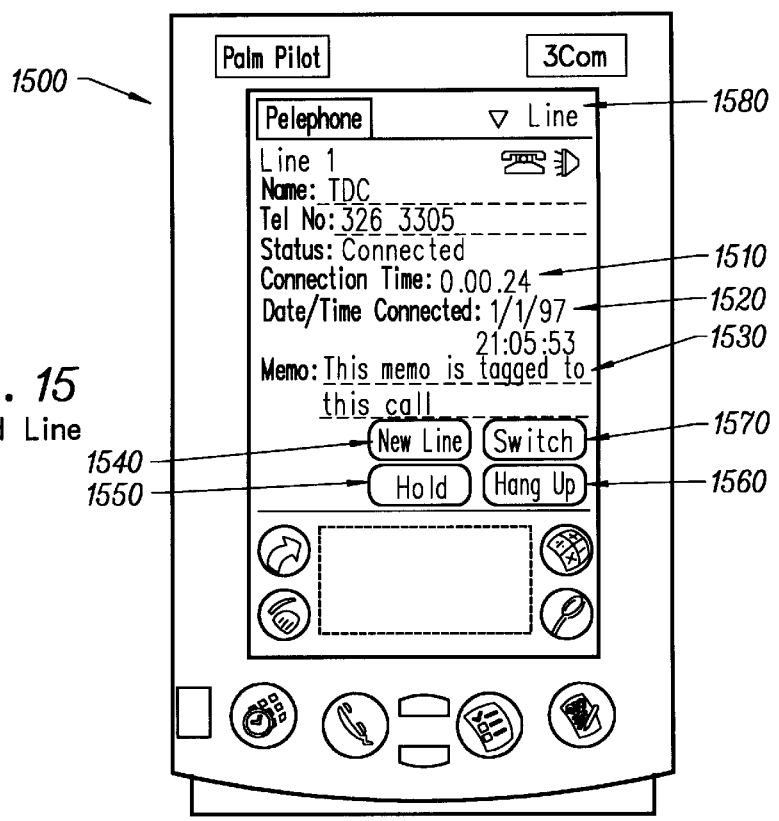
FIG. 15 shows a connected line screen for a palm-sized computer according to one embodiment of the invention.
Figure 16:
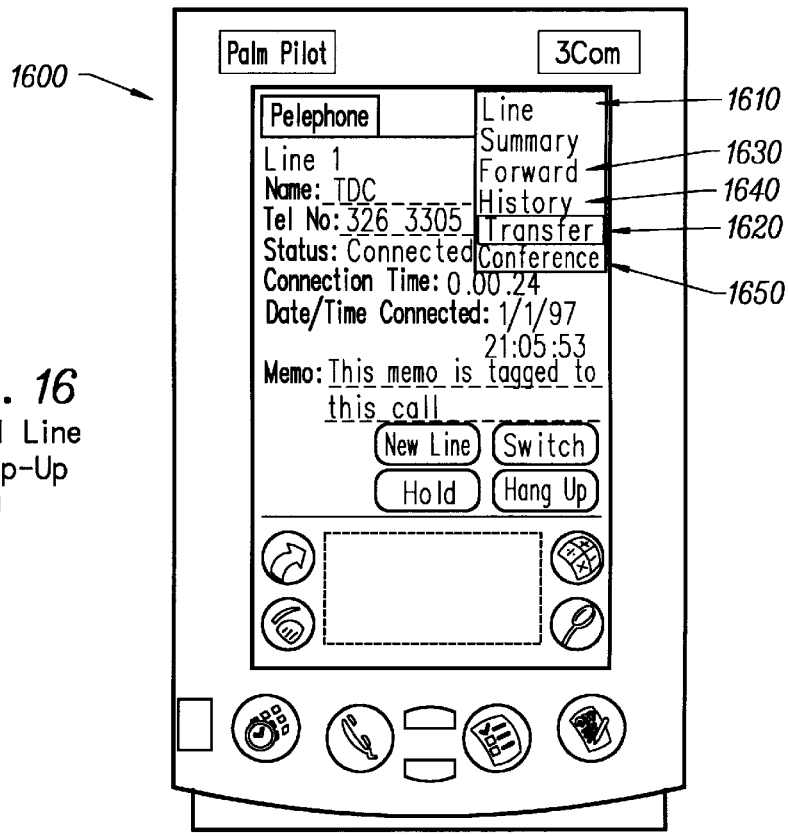
FIG. 16 shows a connected line screen with a line pop-up menu window for a palm-sized computer according to one embodiment of the invention.
Figure 17:
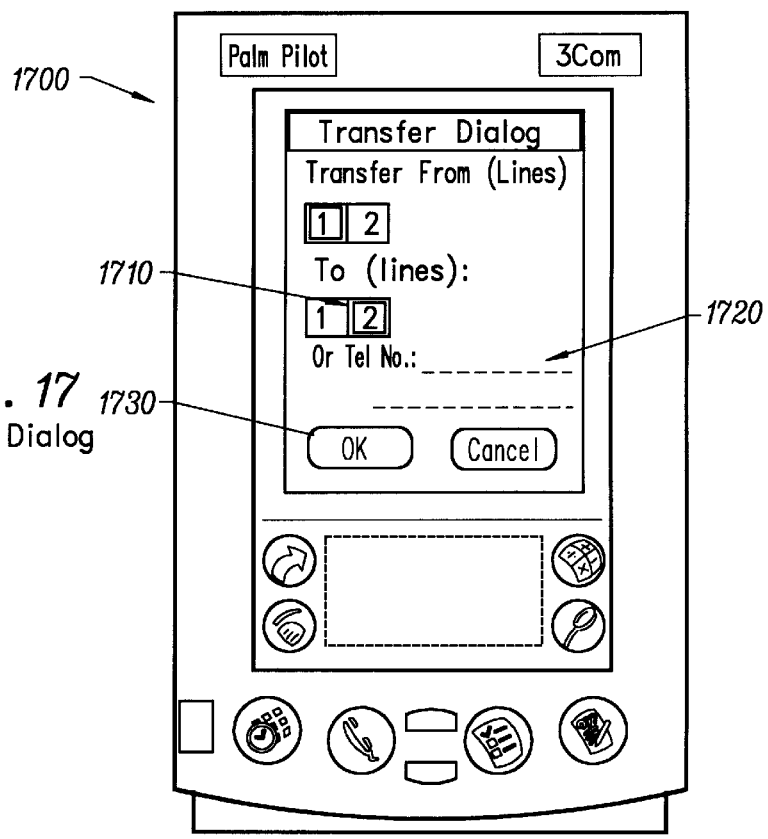
FIG. 17 shows a transfer dialog screen for a palm-sized computer according to one embodiment of the invention.
Figure 18:
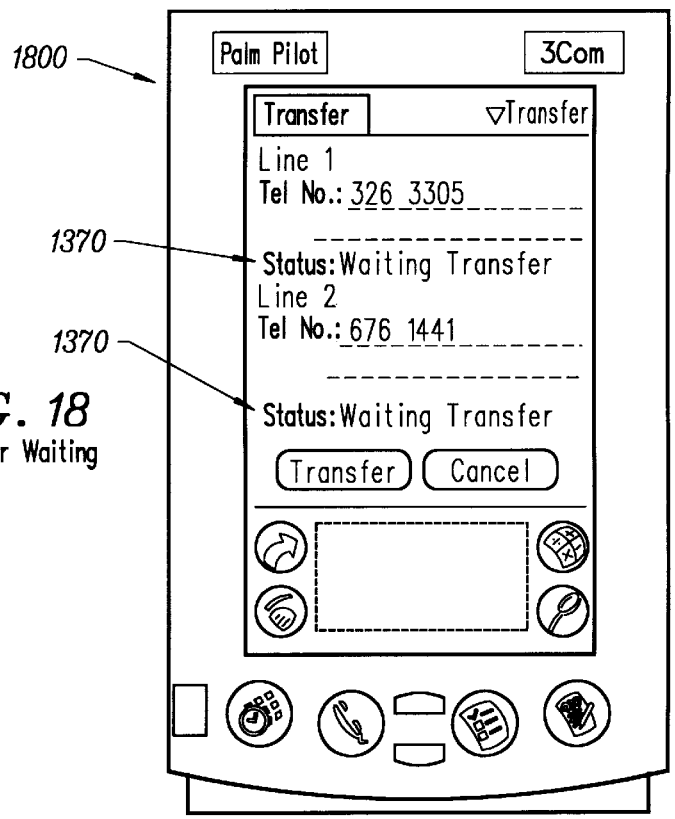
FIG. 18 shows a transfer waiting screen for a palm-sized computer according to one embodiment of the invention.
Figure 19:
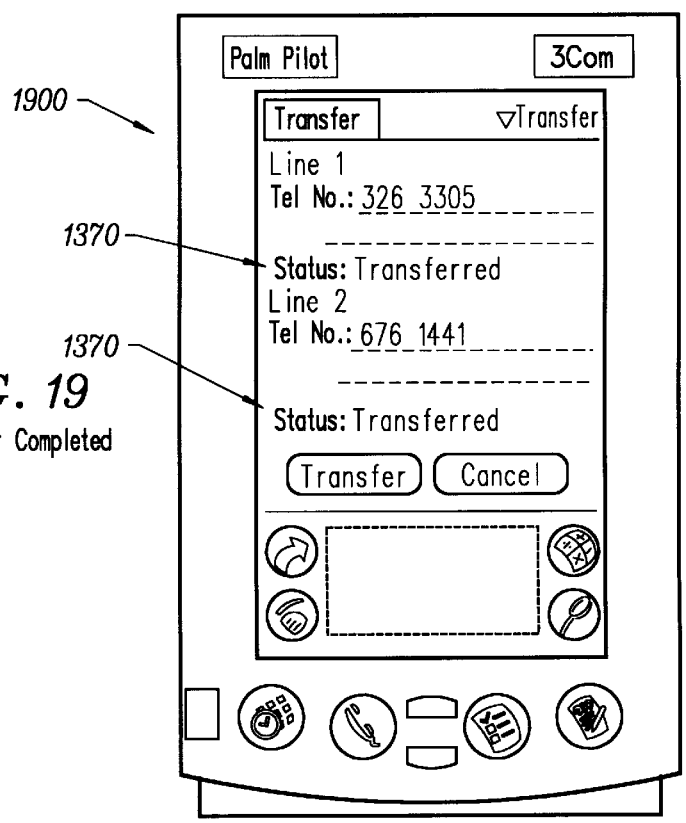
FIG. 19 shows a transfer completed screen for a palm-sized computer according to one embodiment of the invention.

When the other party answers, the Ethernet telephone 310 sends a line connected message (such as the line 01 connected message 626 for the 1234 network connected device) to the palm-sized computer 343, which responds by displaying the connected line screen 1500, shown in FIG. 15. The "Connection Time" line 1510 shows the time connected for the particular call, while the "Date/Time Connected" line 1520 shows the date and time that the call was connected. In addition, the user can write a short message down in the "Memo" field 1530 by means of "Graffiti" or by using a soft keyboard. This message can be retrieved when the user views the "Call History" details window (reference number 2410, in FIG. 24).

In the connected line screen 1500, the user can choose to place another call (thereby placing the current one on hold naturally) by tapping the "New Line" button 1540. The "Hold" button 1550 and the "Hang Up" button 1560 hold and hang up the call respectively. If there are two or more calls active at the same time, the "Switch" button 1570 will also appear on the connected line screen 1500 so that the user can switch from one active call to another active call.

The line pop-up menu button 1580 is disposed at the top right corner of the connected line screen 1500, and appears as a downward arrow next to and to the left of "Line". When the line pop-up menu button 1580 is tapped, a line pop-up menu 1610 list of choices appears, as shown in the connected line screen with line pop-up menu window 1600, shown in FIG. 16. User selection of the "transfer" prompt 1620 will result in the display of the transfer dialog screen 1700, shown in FIG. 17.

The transfer feature is described here while the other features are explained later in the document. In the transfer dialog screen 1700, the user is prompted to select the number corresponding to the line(s) to which the call is to be transferred in the "transfer to" prompts 1710. Alternatively, the line to which the call is to be transferred can be dialed by entering the entire phone number in the "transfer to" telephone number field 1720. The following description of the transfer feature user interface element interaction includes references to messages described in the call transfer state diagram section above.

If the user clicks the transfer dialog "OK" button 1730, the appropriate lines are connected and placed on hold per the dial message sent from the palm-sized computer 343 to the Ethernet telephone 310 (such as the dial 5432 message 910). When the appropriate line is connected to effect the transfer, the Ethernet telephone 310 sends a connected to message (such as the connected to second 02 line message 914). Upon receipt of the connected to message, the palm-sized computer 343 displays the transfer waiting screen 1800, shown in FIG. 18 with the status lines 1370 in the transfer waiting screen 1800 indicating that both line 1 and line 2 are waiting for their respective transfer to be completed. The palm-sized computer 343 then sends a call transfer message (such as the PSC 343 call transfer message from the first 01 line to the second 02 line 918) to the Ethernet telephone 310.

Once the transfer is complete, the Ethernet telephone 310 sends an ET call transfer message 922 to the palm-sized computer 343 and the transfer status display indication is updated. This is seen in the transfer completed screen 1900, shown in FIG. 19, where the status lines 1370 for both line 1 and line 2 indicate that their respective transfers have been completed.

Figure 20:
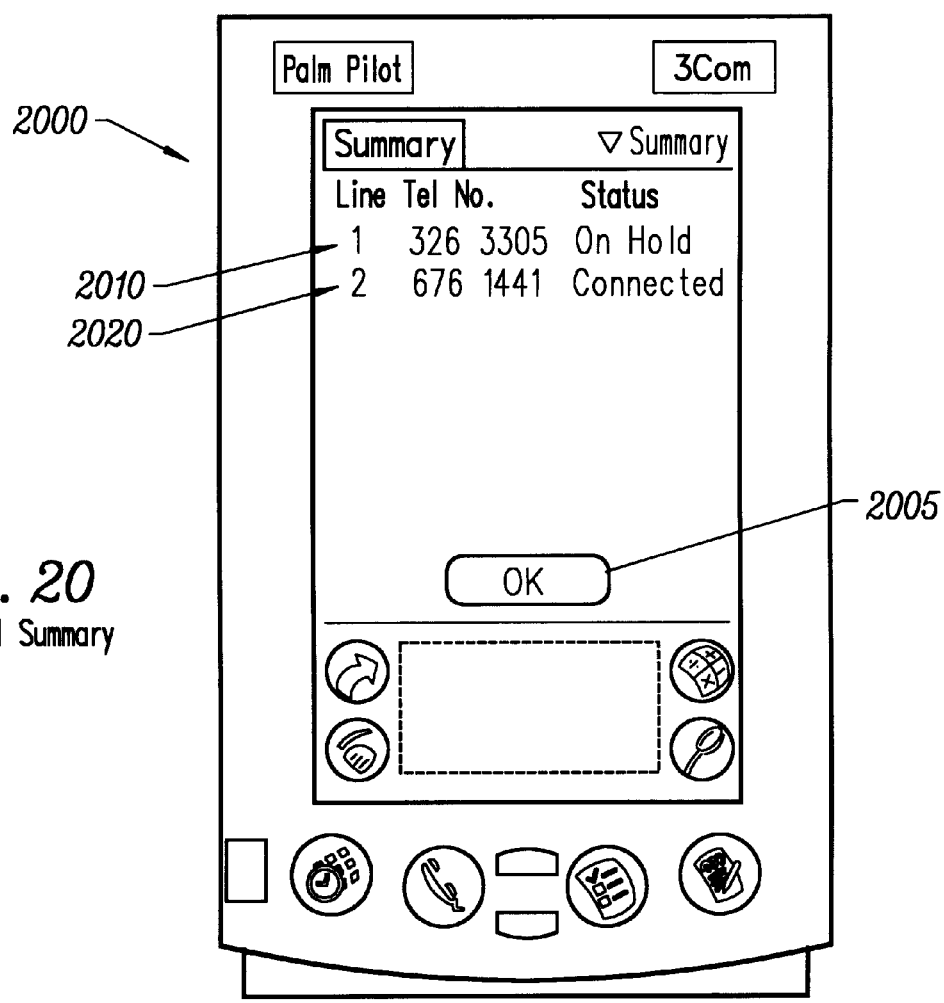
FIG. 20 shows an active call summary list screen for a palm-sized computer according to one embodiment of the invention.

An active call summary list screen 2000, shown in FIG. 20, summarizes all the active calls for the information appliance 210 at a given moment. Tapping the active call summary "OK" button 2005 returns the user to the previous screen. Tapping on the record itself for a particular line will allow the user to browse the call information corresponding to the selected call. For example, a connected line screen 1500 for line 01 will appear in response to tapping the "line 1" record 2010, and a connected line screen 1500 for line 02 will appear in response to tapping the "line 2" record 2020.

Choosing the forward prompt 1630 from the connected line pop-up menu 1610 will lead the user into either the first forwarding screen 2100, shown in FIG. 21, if there are no calls being forwarded currently. If calls are already being forwarded when the user chooses the forward prompt 1630 from the connected line pop-up menu 1610, the second forwarding screen 2200 appears, as shown in FIG. 22.

To forward a call, the user enters the number and taps the "Forward" button 2110 on the first forwarding screen 2100 or the second forwarding screen 2200. An example of the call forwarding is shown in FIG. 8's DLLP call forwarding state diagram 800. In response to a user inputting a number of "9876" 810 as the number for the forwarded to network connected device, the palm-sized computer 343 sends a call forwarding message 812 to the Ethernet telephone 310. The Ethernet telephone 310 establishes the call forwarding feature with the gateway server 270. For this example, the gateway server 270 then indicates its acceptance of the forwarding request to the Ethernet telephone 310. The Ethernet telephone 310 responds by sending a call forward message 816 to the palm-sized computer 343. The palm-sized computer 343 then displays the call forwarded status 818, as shown in the currently forwarded line 2210. From the second forwarding screen 2200, the user can also choose to disable the feature by tapping the "Disable" button 2220. The "KeyPad" button 1210 performs essentially the same function as described in conjunction with the call placement screen 1200.

Figure 23:
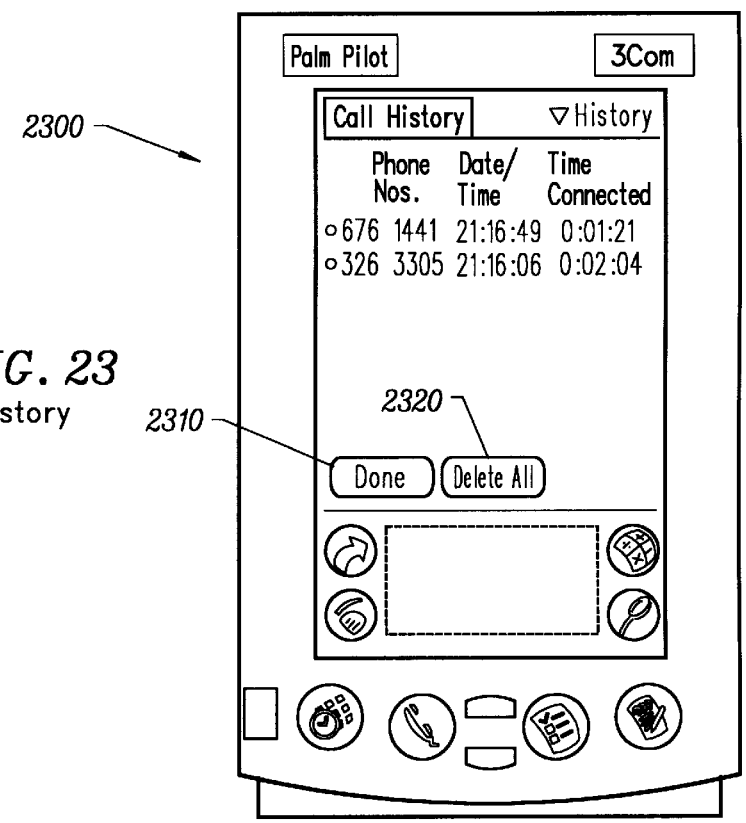
FIG. 23 shows a call history screen for a palm-sized computer according to one embodiment of the invention.

The call history screen 2300, shown in FIG. 23, appears when the user chooses the history prompt 1640 from the connected line pop-up menu 1610. Information about the calls made is summarized in the list provided on the call history screen 2300. In the first column, "O" indicates outgoing calls while "I" (not shown) indicates incoming calls. The second column displays the phone number for each call listed. The third column shows the time the corresponding call was made, or if the call was made more than a day before the history prompt 1640 was selected, the third column will show the date of the corresponding call instead. Finally, in the last column, the duration of each call is displayed.

Tapping the "Done" button 2310 returns the user to the previous screen, i.e., the screen having the connected line pop-up menu 1610. To delete all the records, the user taps the "Delete All" button 2320. A warning screen will appear first before the user is allowed to delete all the records.

Figure 24:
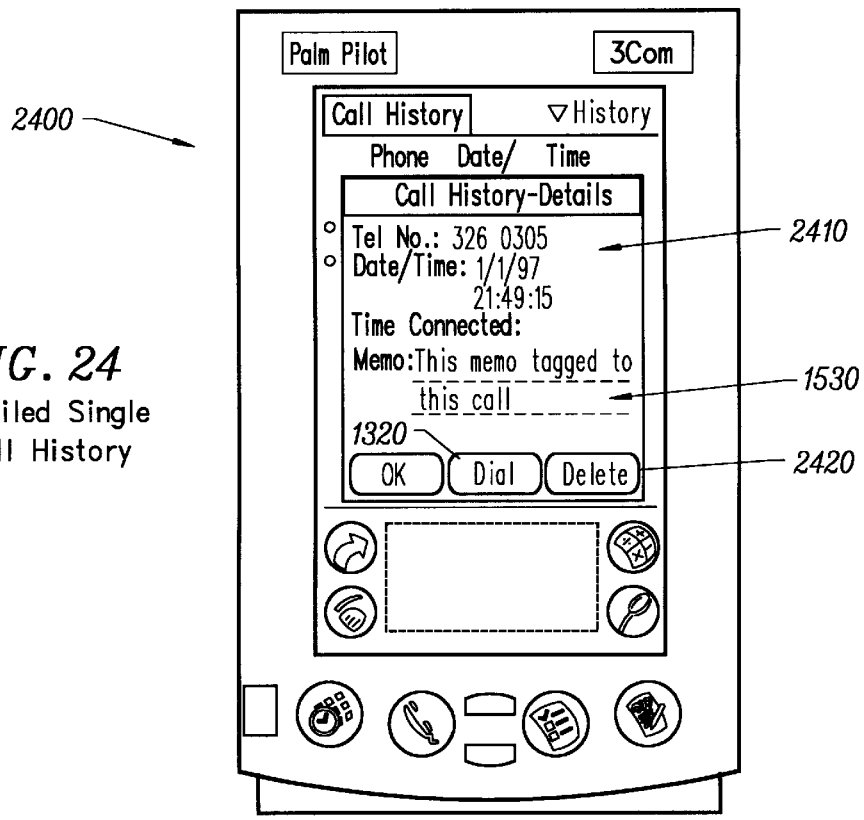
FIG. 24 shows a detailed single call history screen for a palm-sized computer according to one embodiment of the invention.

If the user taps on the record itself, a detailed single call history window 2410 corresponding to the tapped record will appear, as seen in the detailed single call history screen 2400, shown in FIG. 24. Detailed information, including the memo 1530 that had been written for the call, is displayed. The user can choose to dial the number by tapping the "Dial" button 1320, or delete the record by tapping the "Delete" button 2420.

Figure 25:
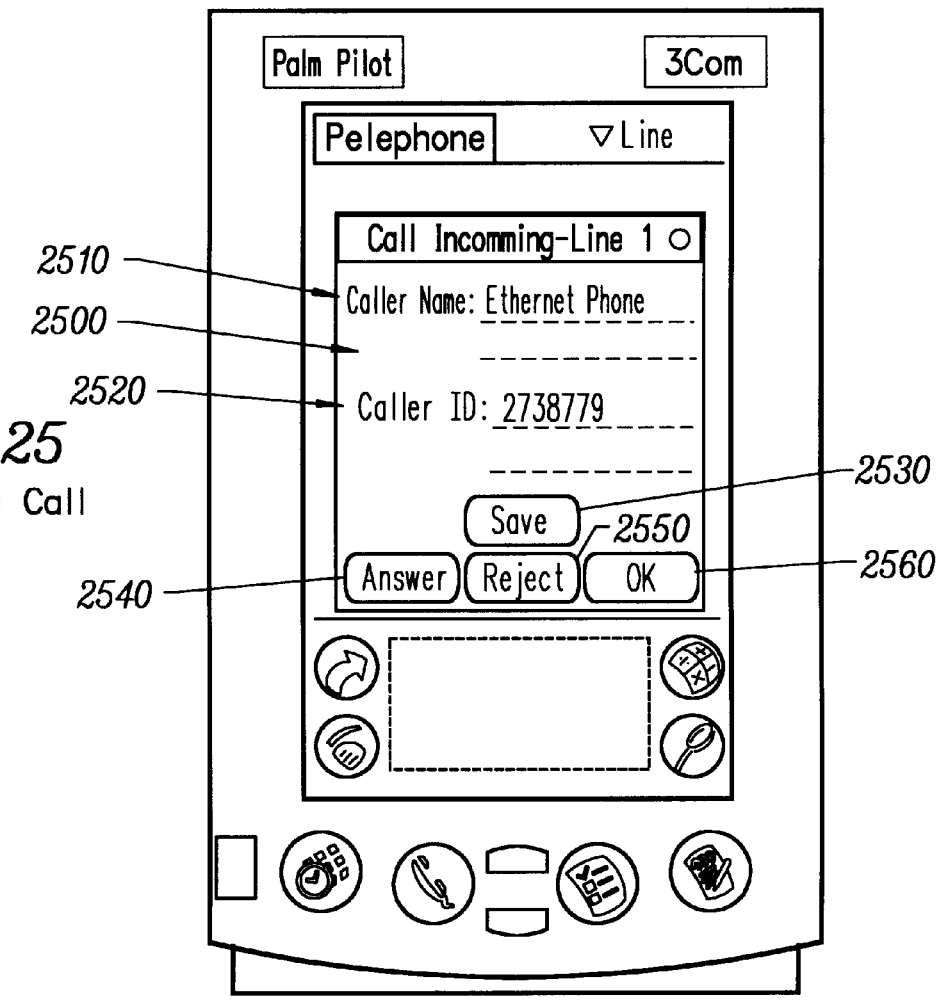
FIG. 25 shows an incoming call window for a palm-sized computer according to one embodiment of the invention.

Whenever there is an incoming call, the "Call Incoming" window 2500 will pop-up as shown in FIG. 25. One example of the incoming call process is shown in the DLLP palm-size computer 343 dialing state diagram 600 in FIG. 6. Upon receiving an incoming call from a network connected device on line 02, the Ethernet telephone 310 sends an incoming call message 632 for the second 02 line to the palm-sized computer 343. Upon receiving the incoming call message 632 for the second 02 line, the palm-sized computer 343 displays the "Caller Name" 2510 and "Caller ID" 2520. Tapping the "Save" button 2530 will save the record to the Address database. Tapping the "Answer" button 2540 or the "Reject" button 2550 answers or rejects the call respectively. For example, in response to the user tapping the "Answer" button 2540, the palm-sized computer sends an answer message 636 for the second 02 line to the Ethernet telephone 310, and the Ethernet telephone connects the network connected device to line 02. The call incoming "OK" button 2560 is used if the user decides to answer the call at a later and more convenient time.

A features menu bar 2600, shown in FIG. 26, is also available for several functions. The features menu bar 2600 provides most of the features that are available in the connected line pop-up menu 1610 list. These features are repeated to allow added convenience to the user. To access the features menu bar 2600, the user taps the silkscreen menu button 2605. The information appliance then displays a plurality of graphical user interfaces (not shown) including an image corresponding to the features menu bar 2600 on the screen. The user then taps the appropriate image to display the features menu bar 2600.

Figure 28:
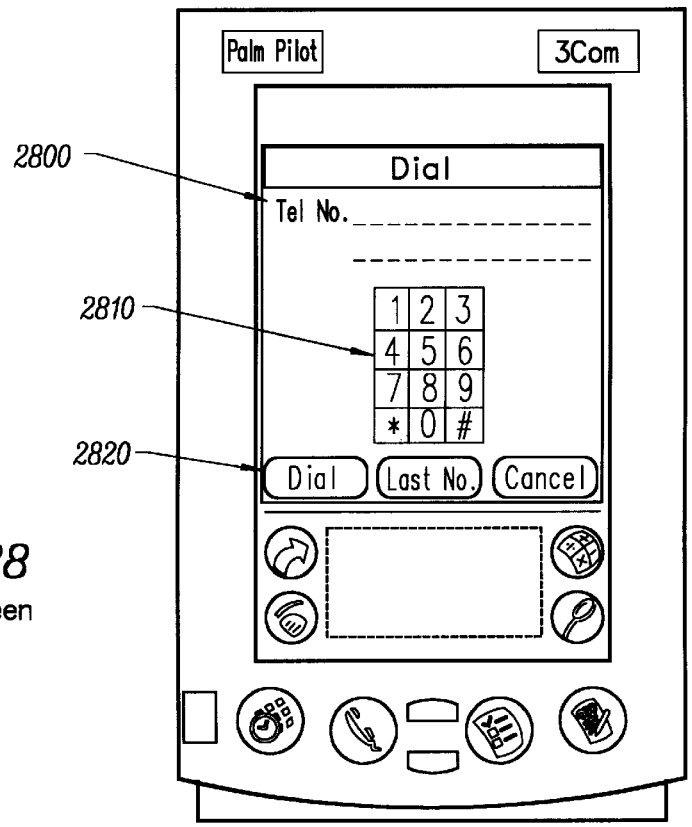
FIG. 28 shows a dial screen for a palm-sized computer according to one embodiment of the invention.
Figure 29:
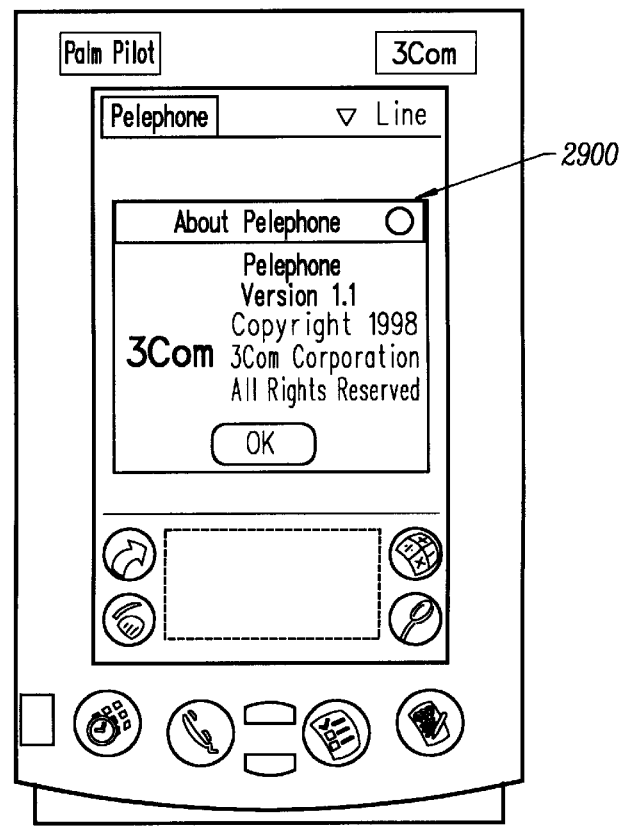
FIG. 29 shows a copyright information screen for a palm-sized computer according to one embodiment of the invention.

The "Dial" option 2610 displays a dial screen 2800 with a larger keypad 2810, but performs the same functions as described in conjunction with FIG. 13 for placing a call section. This dial screen 2800 is shown in FIG. 28. A "Reset" option 2620 is also available to reset the palm-sized computer 343 telephone program.

Figure 27:
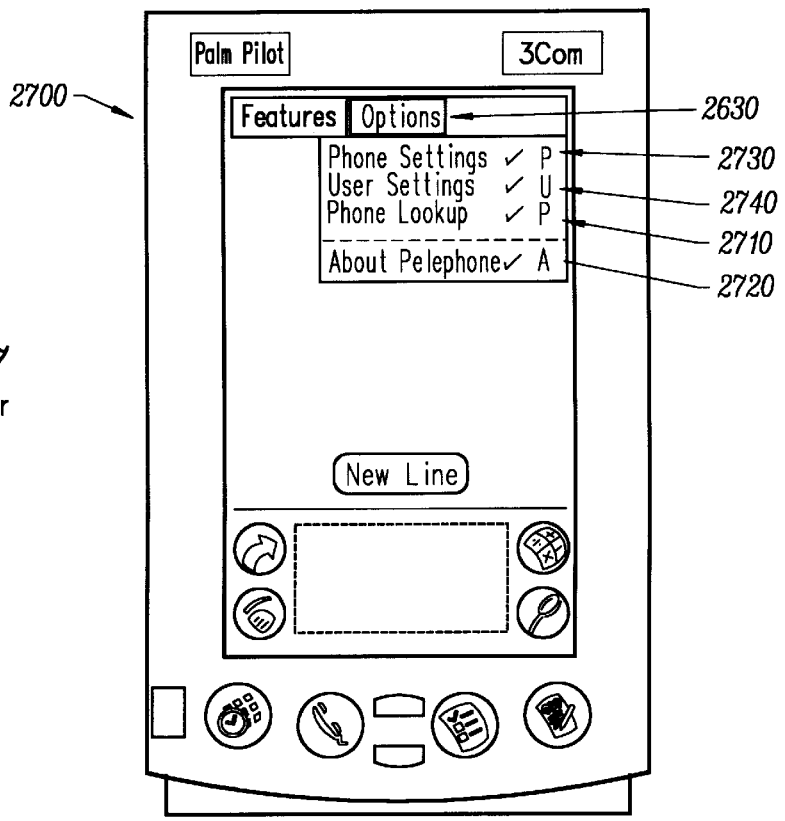
FIG. 27 shows an options menu bar for a palm-sized computer according to one embodiment of the invention.

Tapping the "Options" bar 2630 results in display of the options menu bar 2700 as shown in FIG. 27. A "Phone Lookup" option 2710 provided in the options menu bar 2700 listing, allows the user to look up a certain person from an Address application/database in the palm-sized computer 343. The phone lookup application performs the same function as phone lookup applications in many other standard palm-sized computer 343 applications, including the PalmPilot. The "About" option 2720 shows the Copyright information as shown in the copyright information screen 2900, in FIG. 29. The rest of the choices are further described later in this section.

Figure 30:
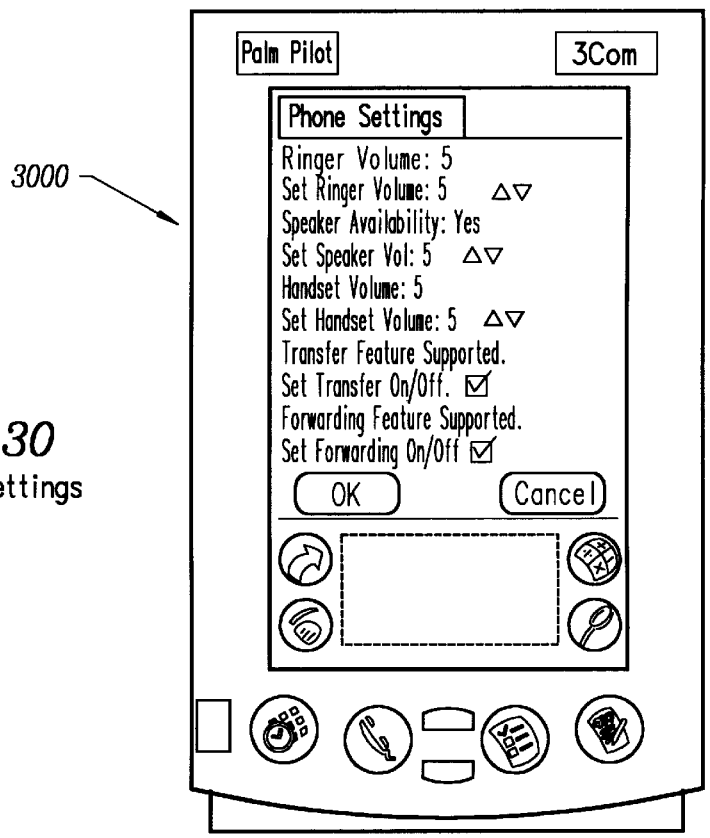
FIG. 30 shows a phone settings screen for a palm-sized computer according to one embodiment of the invention.
Figure 31:
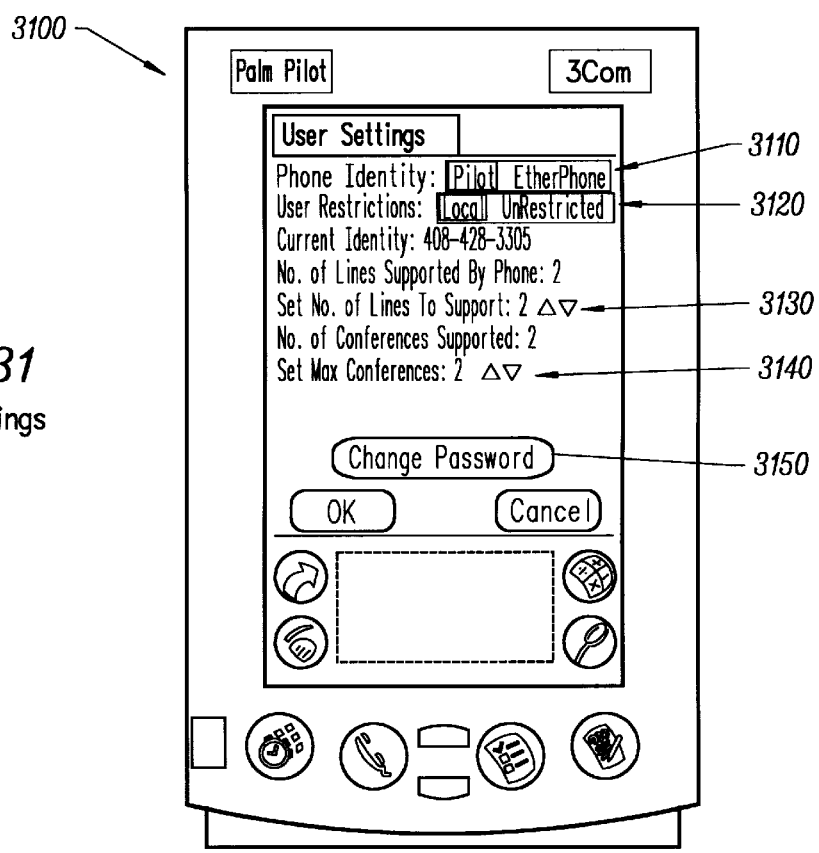
FIG. 31 shows a user settings screen for a palm-sized computer according to one embodiment of the invention.
Figure 32:
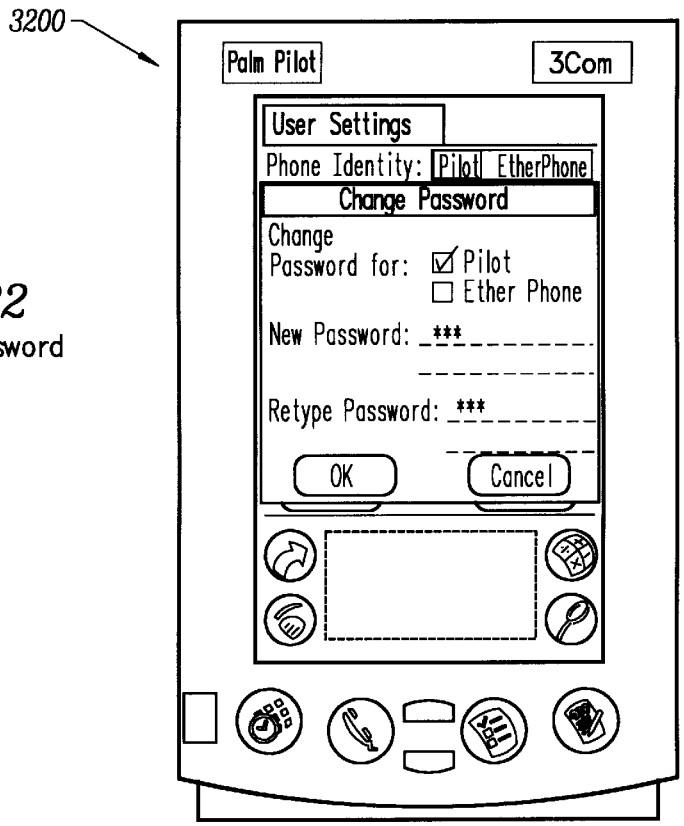
FIG. 32 shows a change password screen for a palm-sized computer according to one embodiment of the invention.
Figure 33:
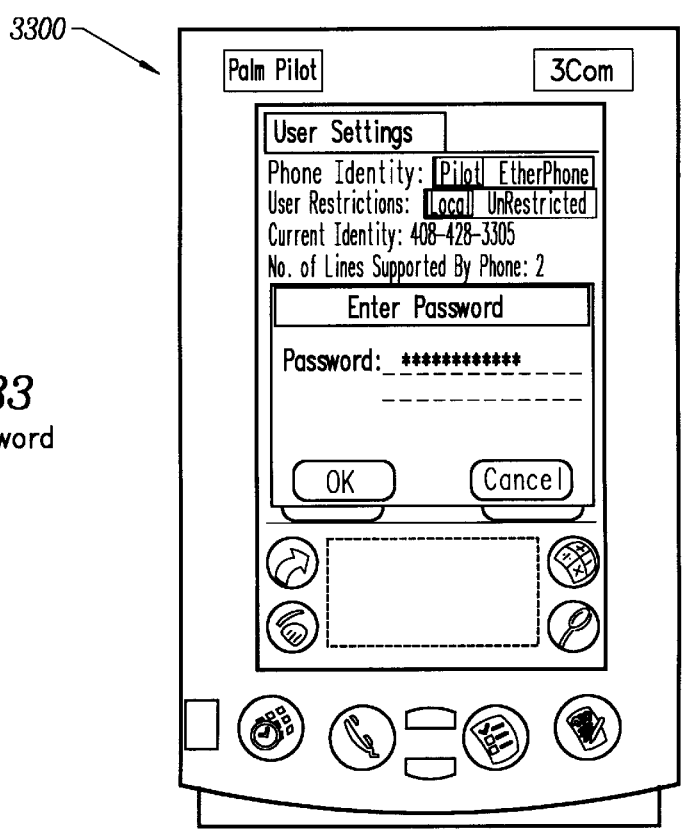
FIG. 33 shows an enter password screen for a palm-sized computer according to one embodiment of the invention.

After selecting the "Phone Settings" option 2730, the user is allowed to adjust the Ethernet telephone's 310 ringer volume, speaker volume (where applicable) and handset volume by means of tapping the up or down arrowhead displayed on the phone settings screen 3000, shown in FIG. 30. If the transfer and forwarding feature are available, the user can also choose to turn them on or off.

By selecting the "User Settings" option 2740, the user can "fine tune" the operation of the Ethernet telephone 310 beyond the settings established during initialization. The user can choose to use the telephone's 240 identity or the palm-sized computer's 343 identity (i.e. the user's mobile identity) by selecting the corresponding indication on the phone identity prompts 3110 as shown on the user settings screen 3100, shown in FIG. 31. The access level of the user can also be adjusted to local calls only or unrestricted calls by selecting the corresponding indication on the user restrictions prompts 3120. The number of lines to support for the user can be set by pressing up and/or down on the set number of lines to support arrows 3130. The number of conferences to support can be set up and/or down using the set max conferences arrows 3140. Since the maximum number of conferences and the number of lines to be supported settings are somewhat more sensitive to resource restraints, a password will be required and the user will be prompted to enter it in an enter password screen 3300, such as that shown in FIG. 33.

If the user decides to change the password, he/she can tap the "Change Password" button 3150. A change password screen 3200, shown in FIG. 32, then pops up asking the user for the new Password. The change is double confirmed by requiring the user to enter the new password twice.

Figure 34:
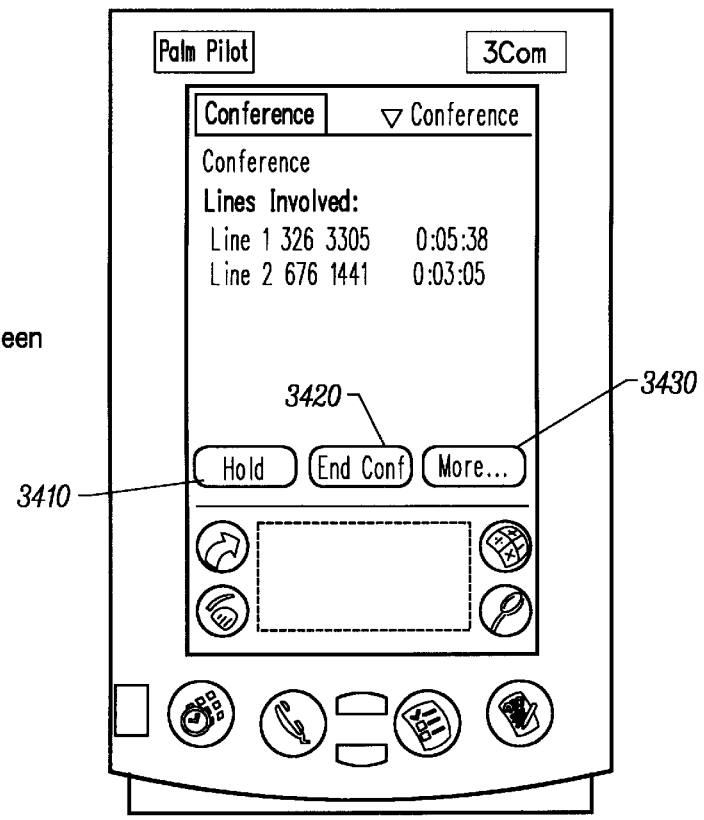
FIG. 34 shows a conferencing screen for a palm-sized computer according to one embodiment of the invention.
Figure 35:
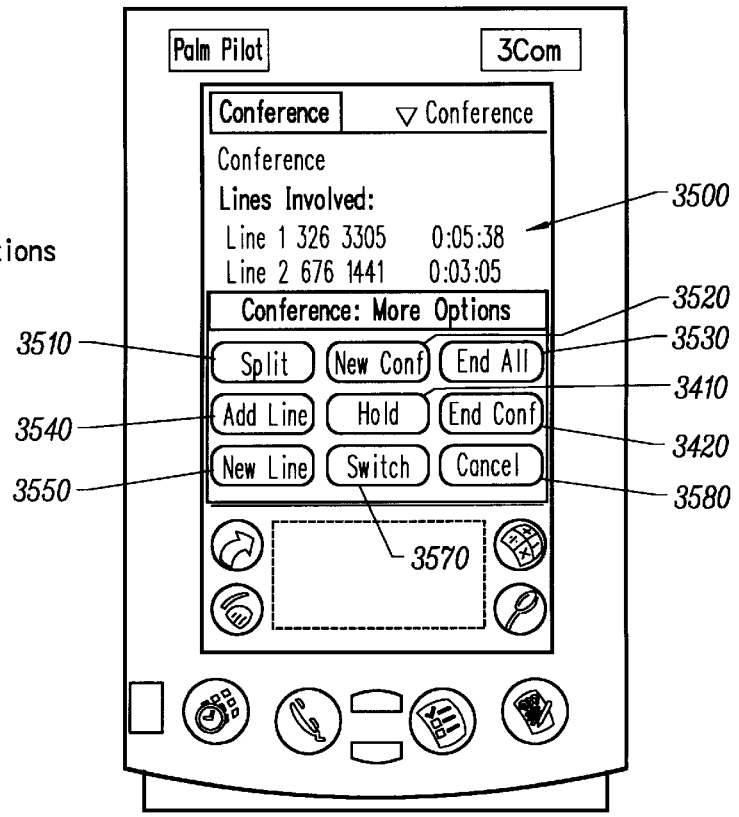
FIG. 35 shows a conference option window for a palm-sized computer according to one embodiment of the invention.

A conferencing screen 3400 is shown in FIG. 34. The "Hold" button 3410 is used to put the entire conference on hold, while the "End Conf" button 3420 ends the conference. The "More" button 3430 summons more commands from a conferencing options window 3500 as shown in FIG. 35. The options window 3500 enables the user to select commands corresponding to the following: a "Split" button 3510 (to split the conference), a "New Conf" button 3520 (to start a new conference), an "End All" button 3530 (to end all the current conferences), an "Add Line" button 3540 (to add another party to the conference), a "Hold" button 3410, an "End Conf" button 3550 (to end the conference), a "New Line" button 3560 (to make a new, separate call) and a "Switch" button 3570 (to switch to another active line or conference). Tapping the "Cancel" button 3580 returns the user to the previous screen.

The companion appliance telephone 240 program can be used in conjunction with voice mail messages, to allow the user to access voice mail with a touch of the screen. Voice mail information (user name, phone number and date/time called) can be viewed from the companion appliance telephone 240 program whereby users can sort or search for a particular message.

The companion appliance telephone 240 program can be used in conjunction with a Smart Card to access the user's billing or charging information stored and viewed in the palm-sized computer. Access to such information can require user access "tokens" and security information. The charging information can be updated on a per call basis.

Another reset option that resets the Ethernet telephone 310 as well as the companion appliance telephone 240 program can be provided.

A "dialog" window or a "white-board" window can be provided to share and transmit messages and drawings across the network.

A pop-up window to generate a Keypad entry screen can be provided.

The "Call History" information generated by the companion appliance telephone 240 program can be transmitted from the information appliance 210 to a personal computer for storage through a synchronization process such as the HotSync process for the PalmPilot.

The memo field text related to the call can be cut and pasted into a Memo application in the portable computer 320.

The Telephone

The fifth aspect of the invention provides a telephone 240 adapted for connection to a portable computer 320. The telephone 240 comprises a port for connecting to the portable computer 320, network communication capabilities including a communication port, portable computer companion capabilities, and processing resources adapted to exchange data with the portable computer. The portable computer 320 has user information corresponding to a user. The data includes the user information, data corresponding to the network communication capabilities, and the portable computer companion capabilities. The exchange of data enables the telephone 240 to discover user information and capabilities of the portable computer 320, provide the network communication capabilities and the portable computer companion capabilities to the portable computer 320, and indicate the network communication capabilities to devices connected to the telephone via a network.

In some embodiments, the portable computer 320 is adapted to control execution of telephony programs. The data exchanged with the portable computer 320 includes data corresponding to portable computer control of the telephony programs. Responsive to commands from the portable computer 320, the exchange of the data enables the telephone 240 to communicate with devices connected to the telephone.

In some embodiments, the network communication capabilities include a number of communications lines supported, a number of conferences supported, forwarding feature support, call transfer feature support, voice mail support, an identification corresponding to the telephone 240. The portable computer 320 companion capabilities comprise audible component volumes.

In some embodiments, the telephone 240 has an identification and the portable computer 320 has an identification. The portable computer 320 companion capabilities include the telephone 240 presenting the portable computer identification to the network connected devices in place of the telephone identification.

In some embodiments, the telephone 240 comprises an Ethernet telephone 310.

In some embodiments, the data exchanged with the portable computer 320 corresponding to the telephone 240 capabilities and the user information are formatted according to an applications layer protocol, the applications layer protocol having frame formats for telephony functions.

In some embodiments, the telephone 240 includes processing resources adapted to receive incoming call data from a gateway server 270 indicating that a first network connected device is waiting to start a call with a user. The telephone 240 also includes processing resources adapted to transform the incoming call data into an incoming call message formatted in a data link layer protocol 328 for transmission to the portable computer 320. The data link layer protocol 328 encapsulates frames formatted according to the application layer protocol.

In some embodiments, the telephone 240 provides the network communication capabilities to a user without connection to the portable computer 320.

In some embodiments, the telephone 240 includes processing resources for Internet access. For some of these embodiments, the processing resources for Internet access include Internet applications 367, display/user input transfer software 373, transmission control 359 software, Internet protocol 356 software, and carrier sense multiple access/collision detection 368 software. For some of these embodiments, the processing resources for Internet access include an Internet access application 369, transmission control 359 software, carrier sense multiple access/collision detection 368 software, and Internet protocol 356 software.

In some embodiments, the telephone 240 includes a display 1005, and processing resources for video display and capture.

The foregoing description of embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for transmitting data from a portable computer to a telephone comprising:

connecting the portable computer with the telephone, the telephone having operating capabilities, the telephone connected to network connected devices;

supplying the portable computer with telephone operating parameter data for a communications session between the telephone and one or more of the network connected devices, the communications session including an exchange of messages with the one or more of the network connected devices;

the portable computer exchanging the telephone operating parameter data and the operating capabilities with the telephone; and the portable computer establishing telephone operating parameters for the communications session based on the telephone operating parameter data and the operating capabilities, the telephone operating parameters providing options and features for the communications session.

2. The method of claim 1, wherein after the establishing telephone operating parameters step, the method includes a user placing a phone call, the placing including:

the user starting a dialing program;

the user inputting values to the portable computer, the values corresponding to a recipient network connected device;

the portable computer displaying the values and phone call status information;

the portable computer transforming the values into input data formatted according to a data link layer protocol, the data link layer protocol encapsulating frames formatted according to an application layer protocol, the application layer protocol adapted for telephony functions; and the portable computer transmitting the input data to the telephone.

3. The method of claim 2, wherein after the transmitting step the method includes:

the user entering text data to form a memo corresponding to the phone call;

the portable computer creating a data record corresponding to the phone call; and the portable computer attaching the memo to data record.

4. The method of claim 2, wherein the portable computer includes a user interface and a display, the inputting is accomplished through the user interface, and the portable computer displays a telephone number entry field in which the user inputs the values.

5. The method of claim 1, wherein:

the telephone connected by a local area network link to a router;

the router connected to at least one packet based network including an Internet source; and communications between the router and the telephone formatted according to packet based network application protocols.

6. The method of claim 5, wherein:

the portable computer includes processing resources for Internet access; and the telephone includes processing resources for Internet access.

7. The method of claim 5, wherein:

the portable computer includes processing resources for Internet access including Internet applications, transmission control software, and Internet protocol software; and the telephone includes an Internet access application, transmission control software, carrier sense multiple access/collision detection software, and Internet protocol software.

8. The method of claim 5, wherein:

the portable computer includes processing resources for Internet access including Internet display applications and display/user input transfer software; and the telephone includes processing resources for Internet access including Internet applications, display/user input transfer software, transmission control software, Internet protocol software, and carrier sense multiple access/collision detection software.

9. The method of claim 1, wherein after the establishing telephone operating parameters step, the method includes a user placing a conference call, the placing including:

the user starting a conferencing program;

the user inputting values to the portable computer, the values corresponding to a plurality of conference participant network connected devices;

the portable computer displaying the values and conference call status information;

the portable computer transforming the values into input data formatted according to a data link layer protocol, the data link layer protocol encapsulating frames formatted according to an application layer protocol, the application layer protocol adapted for telephony functions; and the portable computer transmitting the input data to the telephone.

10. The method of claim 9, wherein:

the portable computer includes a display;

the starting includes a user selection of a user interface element for a conferencing feature, the user interface element disposed on the display;

in response to the user selection, the portable computer displays a list of conference actions for subsequent user selection.

11. The method of claim 1, wherein:

the portable computer corresponds to a user and has a display; and after the establishing telephone operating parameters step, the method includes the portable computer receiving an incoming call, the receiving includes:

the portable computer receiving an incoming call message from the telephone, the incoming call message indicating that a first network connected device is waiting to start a call with the user; and the portable computer displaying an incoming call screen on the display.

12. The method of claim 11, wherein:

the portable computer includes an address database;

the incoming call message includes a caller name, and a caller identification;

the incoming call screen includes a user selection for saving the caller name and the caller identification to the address database.

13. The method of claim 1, wherein the method includes:

prior to connecting the portable computer with the telephone, the portable computer storing user information, the user information includes an identification corresponding to the portable computer, user access parameters, and user characteristics corresponding to the telephone operating parameter data; and establishing telephone operating parameters includes the user selecting user setting inputs, the user setting inputs corresponding to the portable computer identification, user access parameters, and user characteristics, the user selecting changing the corresponding telephone operating parameter data.

14. The method of claim 13, wherein the user setting inputs include the network address of the telephone.

15. The method of claim 1, wherein the exchange of messages includes simultaneous exchanges of voice and packet data messages.

16. The method of claim 1, wherein the method includes, prior to connecting the portable computer with the telephone, the portable computer storing user information, the user information includes user characteristics, the operating parameter data includes user information.

17. The method of claim 1, wherein the method includes, prior to connecting the portable computer with the telephone, the portable computer storing user information, the user information includes an identification corresponding to the portable computer and user access parameters.

18. The method of claim 1, wherein the operating parameter data comprises constructs formatted according to an applications layer protocol, the applications layer protocol having frame formats for telephony functions.

19. The method of claim 1, wherein the telephone comprises an Ethernet telephone.

20. The method of claim 1, wherein after the establishing telephone operating parameters step, the method includes a user forwarding a call, the forwarding including:
   the user starting a forwarding program; and
   the user inputting a number to the portable computer, the number corresponding to a forwarding destination network connected device;
   the portable computer displaying the number and forwarding status information;
   the portable computer transforming the number into input data formatted according to a data link layer protocol, the data link layer protocol encapsulating frames formatted according to an application layer protocol, the application layer protocol adapted for telephony functions; and
   the portable computer transmitting the input data to the telephone.

21. The method of claim 1, wherein after the establishing telephone operating parameters step, the method includes a user placing a phone call, the placing including:
   the telephone receiving input data from the portable computer, the input data formatted according to a data link layer protocol, the data link layer protocol encapsulating frames formatted according to an application layer protocol, the application layer protocol adapted for telephony functions; and
   the telephone transforming the input data into transport data formatted according to a transport protocol for a packet switched network; and
   the telephone transmitting the transport data to a gateway server, the gateway server connected to at least one switched circuit network including a public switched telephone network.

22. The method of claim 1, wherein after the establishing telephone operating parameters step, the method includes a user placing a conference call, the placing including:
   the telephone receiving input data from the portable computer, the input data formatted according to a data link layer protocol, the data link layer protocol encapsulating frames formatted according to an application layer protocol, the application layer protocol adapted for telephony functions; and
   the telephone transforming the input data into transport data formatted according to a transport protocol for a packet switched network; and
   the telephone transmitting the transport data to a gateway server, the gateway server connected to at least one switched circuit network including a public switched telephone network.

23. The method of claim 1, wherein after the establishing telephone operating parameters step, the method includes a user forwarding a call, the forwarding including:
   the telephone receiving input data from the portable computer, the input data formatted according to a data link layer protocol, the data link layer protocol encapsulating frames formatted according to an application layer protocol, the application layer protocol adapted for telephony functions; and
   the telephone transforming the input data into transport data formatted according to a transport protocol for a packet switched network; and
   the telephone transmitting the transport data to a gateway server, the gateway server connected to at least one switched circuit network including a public switched telephone network.

24. The method of claim 1, wherein after the connecting, the method includes:
   powering up the portable computer; and
   in response to the powering up of the portable computer, initializing the portable computer and the telephone, the initializing including the exchanging and establishing steps.

25. The method of claim 1, wherein:
   the portable computer includes a display;
   after the establishing step, the method includes a user starting a telephony program, the starting including:
      the portable computer displaying a user interface element corresponding to a first menu on the display, the first menu including a list of telephony programs available for a particular connected line;
      the user selecting the first menu user interface element;
      the portable computer displaying a first menu list, the first menu list including user interface elements corresponding to the telephony programs; and
      the user selecting a program from the list.

26. The method of claim 1, wherein establishing telephone operating parameters includes the user selecting phone setting inputs.

27. The method of claim 1, wherein the network connected devices include a gateway server, the gateway server providing access to a public switched telephone network.

28. The method of claim 1, wherein the method includes, prior to the connecting step, the telephone exchanging voice messages with at least one of the network connected devices.

29. The method of claim 1, wherein:
   the telephone connected to a gatekeeper, a directory server and a gateway server by a local area network link; and
   communications between the telephone and the gatekeeper, gateway server, and directory server formatted according to a soft private branch exchange telephony application layer protocol.

30. The method of claim 1, wherein:
   the method includes the user starting a telephony program; and
   the portable computer controls execution of the telephony program.

31. A method for exchanging voice and data messages between a telephone and devices connected to a network, the telephone connected to the network, the method comprising:
   connecting the telephone with a portable computer;
   the portable computer exchanging telephone operating parameter data with the telephone, the operating parameter data providing options for communications between the telephone and the network connected devices; and
   responsive to a user indication of a desired communication, the portable computer exchanging call data with the telephone, the call data corresponding to the desired communication, the call data formatted according to an application layer protocol, and the underlying transport, network, and data link layer protocols, the application layer protocol having frame formats for telephony functions;
   the telephone exchanging messages with an addressed network connected device, the messages corresponding to the desired communication, the addressed network connected device having a network address, the message including data corresponding to the address of the addressed network connected device.

32. The method of claim 31, wherein, the method includes, prior to connecting the portable computer with the telephone, the portable computer storing user information, the operating parameter data comprises the user information, the user information comprises an identification corresponding to the portable computer and user access parameters.

33. The method of claim 32, wherein:

the telephone has an identification; and the method includes the telephone presenting the identification corresponding to the portable computer in place of the telephone identification to devices connected to and communicating with the telephone.

34. The method of claim 31, the method includes:

the telephone requesting a connection to a first network connected device; and the first network connected device responding to the connection request; wherein the message data comprise:

in response to a user input, a phone number corresponding to the first network connected device transmitted from the portable computer to the telephone; and upon receipt by the telephone of the first network connected device response to the connection request, a first connection made response transmitted from the telephone to the portable computer.

35. The method of claim 31, wherein the telephone comprises an Ethernet telephone, and the portable computer comprises a palm-sized computer.

36. The method of claim 31, wherein:

the telephone is connected to a gatekeeper, a directory server and a gateway server by a local area network link; and communications between the telephone and the gatekeeper, the gateway server, and the directory server formatted according to a soft private branch exchange telephony application layer protocol.

37. The method of claim 31, wherein:

the telephone connected by a local area network link to a router;

the router connected to at least one packet based network including an Internet source; and communications between the router and the telephone formatted according to packet based network application protocols.

38. The method of claim 31, wherein the exchange of messages includes simultaneous exchanges of voice and packet data messages.

39. A portable computer adapted for connection to a telephone, the portable computer comprising:

a port for connecting to the telephone, the telephone having capabilities;

a memory storing user information corresponding to a user; and processing resources adapted to exchange data with the telephone, the data including the user information and data corresponding to the telephone capabilities;

the exchange of the data enabling the portable computer to:

discover capabilities of the telephone;

provide the user information to the telephone; and establish telephone operating parameters for telephone communications with devices connected to the telephone based on the user information and the telephone capabilities.

40. The portable computer of claim 39 including:

a display providing user interface graphic elements corresponding to data exchanged with the telephone; and a user interface enabling the user to input data supplementing the user information provided to the telephone.

41. The portable computer of claim 40, wherein the data exchanged with the telephone includes:

data corresponding to portable computer control of telephony programs; and data corresponding to the status of the devices connected to the telephone.

42. The portable computer of claim 39, wherein the user information comprises:

an identification corresponding to the portable computer;

user characteristics; and user access parameters.

43. The portable computer of claim 42, wherein:

the telephone has an identification, and the identification corresponding to the portable computer presented by the telephone in place of the telephone identification to devices connected to and communicating with the telephone.

44. The portable computer of claim 39, wherein the portable computer comprises a palm-sized computer.

45. The portable computer of claim 39, wherein the data exchanged with the telephone corresponding to portable computer control of the execution of the telephony programs, the telephone capabilities, and the user information formatted according to an applications layer protocol, the applications layer protocol having frame formats for telephony functions.

46. The portable computer of claim 39, wherein the portable computer adapted to provide data processing and user interface functions without connection to the telephone.

47. The portable computer of claim 39 includes processing resources for Internet access.

48. The portable computer of claim 39 including processing resources for Internet access including Internet applications, transmission control software, and Internet protocol software.

49. The portable computer of claim 39 including processing resources for Internet access including Internet display applications and display/user input transfer software.

50. The portable computer of claim 39 including processing resources for user interface support of video data.

51. The portable computer of claim 39 including processing resources for user interface support of video data including video data decoding, and video display.

52. The portable computer of claim 39 including processing resources for user interface support of video data, video data decoding, video display, and video camera image data.

53. The portable computer of claim 39, wherein the exchange of the data enables the portable computer to control execution of telephony programs.

54. A telephone adapted for connection to a portable computer, the telephone comprising:

a port for connecting to the portable computer, the portable computer having user information corresponding to a user;

network communication capabilities including a communication port;

portable computer companion capabilities;

processing resources adapted to exchange data with the portable computer, the data including:

the user information, data corresponding to the network communication capabilities; and the portable computer companion capabilities;

the exchange of data enabling the telephone to:

discover user information and capabilities of the portable computer;

provide the network communication capabilities and the portable computer companion capabilities to the portable computer; and indicate the network communication capabilities to devices connected to the telephone via a network.

55. The telephone of claim 54, wherein:

the portable computer adapted to control execution of telephony programs;

the data exchanged with the portable computer includes data corresponding to portable computer control of the telephony programs; and responsive to commands from the portable computer, the exchange of the data enabling the telephone to communicate with devices connected to the telephone.

56. The telephone of claim 54, wherein:

the telephone has an identification;

the portable computer has an identification; and the portable computer identification presented by the telephone in place of the telephone identification to devices connected to and communicating with the telephone.

57. The telephone of claim 54, wherein the telephone comprises an Ethernet telephone.

58. The telephone of claim 54, wherein the data exchanged with the portable computer corresponding to the telephone capabilities and the user information formatted according to an applications layer protocol, the applications layer protocol having frame formats for telephony functions.

59. The telephone of claim 54, including processing resources adapted to:

receive incoming call data from a gateway server indicating that a first network connected device is waiting to start a call with a user;

transform the incoming call data into an incoming call message formatted in a data link layer protocol for transmission to the portable computer, the data link layer protocol encapsulating frames formatted according to the application layer protocol.

60. The telephone of claim 54, wherein the telephone provides the network communication capabilities to a user without connection to the portable computer.

61. The telephone of claim 54 including processing resources for Internet access.

62. The telephone of claim 54, including processing resources for Internet access including Internet applications, display/user input transfer software, transmission control software, Internet protocol software, and Carrier Sense Multiple Access/Collision Detection software.

63. The telephone of claim 54, including processing resources for Internet access including an Internet access application, transmission control software, Carrier Sense Multiple Access/Collision Detection software, and Internet protocol software.

64. The telephone of claim 54, including:

a display; and processing resources for video display and capture.

65. A communications system comprising:

a telephone having capabilities;

a portable computer connected to the telephone, the portable computer including:

a port for connecting to the telephone;

a memory storing user information corresponding to a user; and processing resources adapted to exchange data with the telephone, the data including the user information and data corresponding to the telephone capabilities;

the exchange of the data enabling the portable computer to:

discover capabilities of the telephone;

provide the user information to the telephone; and establish telephone operating parameters for telephone communications with devices connected to the telephone based on the user information and the telephone capabilities; and a network link connecting the telephone to network connected devices.

66. The communications system of claim 65 including a router connected to the network link, and packet based network devices connected to the router.

67. The communications system of claim 66, wherein:

the portable computer includes processing resources for Internet access; and the telephone includes processing resources for Internet access.

68. The communications system of claim 66, wherein:

the portable computer includes processing resources for Internet access including Internet applications, transmission control software, and Internet protocol software; and the telephone includes processing resources for Internet access including an Internet access application, transmission control software, Carrier Sense Multiple Access/Collision Detection software, and Internet protocol software.

69. The communications system of claim 65, wherein:

the portable computer comprises a palm-sized computer; and the telephone comprises an Ethernet telephone.

70. The communications system of claim 69, wherein:

the portable computer includes processing resources for Internet access including Internet display applications and display/user input transfer software; and the telephone includes processing resources for Internet access including Internet applications, display/user input transfer software, transmission control software, Internet protocol software, and Carrier Sense Multiple Access/Collision Detection software.

71. The communications system of claim 65 including a gateway server connected to the network link, and switched circuit network devices connected to the gateway server.

72. The communications system of claim 65, wherein the data exchanged with the telephone corresponding to the telephone capabilities and the user information formatted according to an applications layer protocol, the applications layer protocol having frame formats for telephony functions.

73. The communications system of claim 65, wherein:

the portable computer includes processing resources for user interface support of video data; and the telephone includes:

a video display; and processing resources for video display and capture.

74. The communications system of claim 65, wherein the portable computer includes processing resources for user interface support of video data, video data decoding, and video display.

75. The communications system of claim 65, wherein the portable computer includes processing resources for user interface support of video data, video data decoding, video display, and video camera image data.

* * * * *